United States Patent
Asano et al.

(10) Patent No.: US 6,222,559 B1
(45) Date of Patent: Apr. 24, 2001

(54) METHOD AND APPARATUS FOR DISPLAY OF HIERARCHICAL STRUCTURES

(75) Inventors: Yoko Asano; Tetsuo Okazaki; Yoshinobu Tonomura; Hiroshi Hamada, all of Yokohama (JP)

(73) Assignee: Nippon Telegraph and Telephone Corporation (JP)

( * ) Notice: Subject to any disclaimer, the term of this patent is extended or adjusted under 35 U.S.C. 154(b) by 0 days.

(21) Appl. No.: 09/077,776

(22) PCT Filed: Oct. 2, 1997

(86) PCT No.: PCT/JP97/03520

§ 371 Date: Jun. 3, 1998

§ 102(e) Date: Jun. 3, 1998

(87) PCT Pub. No.: WO98/14906

PCT Pub. Date: Apr. 9, 1998

(30) Foreign Application Priority Data

| Oct. 2, 1996 | (JP) | 8-262173 |
| Oct. 25, 1996 | (JP) | 8-284327 |
| Oct. 28, 1996 | (JP) | 8-284826 |
| Feb. 19, 1997 | (JP) | 9-035320 |
| Jun. 18, 1997 | (JP) | 9-161224 |
| Jul. 9, 1997 | (JP) | 9-183689 |

(51) Int. Cl.[7] .................................................. G06T 1/00
(52) U.S. Cl. ........................................ 345/440; 345/115
(58) Field of Search .................................. 345/440, 115

(56) References Cited

U.S. PATENT DOCUMENTS

| 5,276,789 | 1/1994 | Besaw et al. |
| 5,394,522 | 2/1995 | Sanchez-Frank et al. |
| 5,559,527 | * 9/1996 | Quinn .................................. 345/115 |
| 5,590,250 | * 12/1996 | Lamping et al. .................. 345/427 |

FOREIGN PATENT DOCUMENTS

| 4-11286 | 1/1992 | (JP) . |
| 5-216850 | 8/1993 | (JP) . |
| 7-105257 | 4/1995 | (JP) . |
| 8-50540 | 2/1996 | (JP) . |

OTHER PUBLICATIONS

Asano et al., "A Presentation Method for Large–scale Telecommunication Networks," Proceeding of the 1997 IEICE (The Institute of Electronics, Information and Communication Engineers) General Conference, Mar. 1997.

Kawano et al., "Evaluation of Hierarchical Large–scale Telecommunication Networks Visualization," Proceeding of the 1997 IEICE (The Institute of Electronics, Information and Communication Engineers) General Conference, Mar. 1997.

Okazaki et al., "Snow Crystal Method for Visualizing Hierarchical Large–Scale Telecommunication Networks," IEICE (The Institute of Electronics, Information and Communication Engineers) Transactions on Communications, vol. E80–B, No. 6, Jun. 1997.

* cited by examiner

Primary Examiner—Mark Zimmerman
Assistant Examiner—Lance W. Sealey
(74) Attorney, Agent, or Firm—Pennie & Edmonds LLP

(57) ABSTRACT

The present invention relates to a method for displaying hierarchical structures. The method of the present invention can display graphically hierarchical structures of nodes from the nodes that are branch points, relay points or end points corresponding to apparatuses or functions and the connection relationships between the nodes. The display method of the present invention has the steps of arranging the nodes of the same layer subordinate to the same node on the same ellipse, arranging the subordinate ellipse of the same layer concentrically on an ellipse larger than the ellipse of the upper layer, and displaying the arranged hierarchical structure of nodes.

62 Claims, 56 Drawing Sheets

2:3 ORDINATE TO ABSCISSA RATIO

α1·α2 : MINOR AXIS AND MAJOR AXIS OF
         THE ELLIPSE OF THE FIRST LAYER

β1·β2 : MINOR AXIS AND MAJOR AXIS OF
         THE ELLIPSE OF THE SECOND LAYER

γ1·γ2 : MINOR AXIS AND MAJOR AXIS OF
         THE ELLIPSE OF THE THIRD LAYER

A: ELLIPSE OF THE FIRST LAYER b : LOCUS FOR THE CENTER OF THE
    ELLIPSES OF THE SECOND LAYER

```
    0       : CENTER OF ELLIPSE A
 i1 ~ i4   : CENTERS OF THE ELLIPSES OF THE SECOND LAYER
 B1 ~ B4   : ELLIPSES OF THE SECOND LAYER
``` c1 : LOCUS (BOLD LINE) FOR THE CENTERS
OF THE ELLIPSES OF THE THIRD LAYER j1 ~ j9 : CENTERS OF THE ELLIPSES OF THE THIRD LAYER

C11 ~ C19 : ELLIPSES OF THE THIRD LAYER $\alpha 3 \cdot \alpha 4$ : MINOR AXIS AND MAJOR AXIS OF THE ELLIPSE OF THE FIRST LAYER $\beta 3 \cdot \beta 4$ : MINOR AXIS AND MAJOR AXIS OF THE ELLIPSE OF THE SECOND LAYER $\gamma 3 \cdot \gamma 4$ : MINOR AXIS AND MAJOR AXIS OF THE ELLIPSE OF THE THIRD LAYER

D : ELLIPSE OF THE FIRST LAYER e : LOCUS FOR THE CENTERS OF THE ELLIPSES OF THE SECOND LAYER k1 ~ k4 : CENTERS OF THE ELLIPSES OF
             THE SECOND LAYER
E1 ~ E4 : ELLIPSES OF THE SECOND LAYER f1: LOCUS (BOLD LINE) FOR THE CENTERS OF
THE ELLIPSES OF THE THIRD LAYER q1 ~ q7 : CENTERS FOR THE ELLIPSES OF THE THIRD LAYER

F11~F18 : ELLIPSES OF THE THIRD LAYER

A : NODE ARRANGEMENT ELLIPSE
    (CIRCLE) OF THE HIGHEST LAYER

C : NODE ARRANGEMENT ELLIPSE
    (CIRCLE) OF THE LOWER LAYER

B : NODE ARRANGEMENT ELLIPSE
    (CIRCLE) OF THE MIDDLE LAYER
d : DUMMY NODE

| | |
|---:|:---|
| A | : NODE ARRANGEMENT ELLIPSE OF THE HIGHEST LAYER |
| a1 ~ a5 | : HIGHEST LAYER NODES |
| B | : NODE ARRANGEMENT ELLIPSE OF THE MIDDLE LAYER |
| b1 ~ b5 | : MIDDLE LAYER NODES |
| C | : NODE ARRANGEMENT ELLIPSE OF THE LOWER LAYER |
| c1 ~ c5 | : LOWER LAYER NODES |

PARTITION OF DISPLAY AREA

CONSTRUCTION OF ARRANGEMENT
CIRCLE FOR HIGHEST LAYER NODES

ARRANGEMENT OF HIGHEST LAYER
NODES AND CONSTRUCTION OF LINKS

DETERMINATION OF CENTER POINTS OF THE
SECOND LAYER NODE ARRANGEMENT CIRCLES

ARRANGEMENT OF SECOND LAYER NODES AND CONSTRUCTION OF LINKS (WITHOUT LOWER LAYER NODES)

CONSTRUCTION FOR ARRANGEMENT OF SECOND LAYER NODES (WITH LOWER LAYER NODES)

ARRANGEMENT OF SECOND LAYER NODES AND CONSTRUCTION OF LINKS (WITH LOWER LAYER NODES, AND WITH CONNECTIONS TO OTHER HIERARCHICAL STRUCTURES)

ARRANGEMENT OF SECOND LAYER NODES AND CONSTRUCTION OF LINKS (WITH LOWER LAYER NODES)

DETERMINATION OF CENTER POINTS FOR
THE THIRD LAYER NODE ARRANGEMENT CIRCLES

ARRANGEMENT OF THIRD LAYER NODES
AND CONSTRUCTION OF LINKS

ARRANGEMENT OF THIRD LAYER NODES AND
CONSTRUCTION OF LINKS (WITH CONNECTIONS
TO OTHER HIERARCHICAL STRUCTURES)

GRAPHICAL DISPLAY OF ONE SIDE
OF THE HIERARCHICAL STRUCTURE

GRAPHICAL DISPLAY OF EACH
HIERARCHICAL STRUCTURE

GRAPHICAL DISPLAY OF COMPLETE COMPOSITION
OF THE HIERARCHICAL STRUCTURES

● NODE      ——— LINK

● : NODE
—— : LINK

METHOD AND APPARATUS FOR DISPLAY OF HIERARCHICAL STRUCTURES

FIELD OF THE INVENTION

The present invention relates to a display method for hierarchical structures which show the hierarchical structure of a sequence of nodes using a node which shows the apparatus or function corresponding to a branch point, a junction point, or a nodal point, and a link showing the connection relationships between nodes, and in particular, relates to a method of display for a hierarchical structure with an improved operability and visual simplicity when displaying on one surface a large scale hierarchical structure composed of a plurality of nodes.

BACKGROUND OF THE INVENTION

Conventionally, as shown in FIG. 2, for this type of display method, a hierarchical structure is graphically displayed using what is termed a "tree display". That is, the higher layers are arranged on the upper part of the screen, and the lower layers are arranged on the lower part of the screen. For example, in a communication network, generally, when there are connection relationships between nodes on the same layer, as is shown in FIG. 3, the nodes are arranged on the screen using a plane to show the one layer, and by connecting the nodes with links, the hierarchical structure is displayed.

However, when displaying a hierarchical structure on the display screen of a computer using, for example, this kind of tree display, the problem arises that when the numerous lower layer nodes are arranged on the lower part of the screen, the number of nodes that can be displayed is restricted because of the limitation of the display area. In addition, the problem arises that when displaying, for example, a large scale hierarchical structure having hundreds or thousands of nodes, the lower nodes of the same layer in particular will frequently overlap, and it is difficult to distinguish the links connecting the nodes. Additionally, manipulating the nodes and links on the screen by direct command becomes difficult. In particular, in the case of a complex hierarchical structure having connection relationships between nodes on the same layer, or lower layer connection nodes having a connection relationship with a plurality of upper layer nodes, the ease of viewing and the operability are seriously degraded.

The object of the present invention is to resolve the above-described tree display problems by presenting a method and apparatus for graphic display of multi-layered structures which improves the ease of viewing and operability of large scale hierarchical structures comprising a plurality of nodes on the same screen by spatially arranging the nodes of the same layer using a circles generated according to preset rules.

DISCLOSURE OF THE INVENTION

In a method which graphically displays the hierarchical structure of nodes according to the connection relationships between nodes which are apparatuses or functions that correspond to a branch point, a junction pint, and a nodal point, the present invention arranges on one ellipse nodes of the same layer which are subordinate to the same node, and arranges the centers of subordinate ellipses of the same layer on a concentric ellipse larger then the ellipse of the upper layer. In this manner, the vertical layers of the ellipses place the lower ellipses on the outside of the upper ellipses, and the vertical relationships of a large scale hierarchical structure comprising a plurality of nodes can be displayed on the same screen in a manner which is easy to view. By arranging the nodes of the same layer on an ellipse, nodes can be spatially arranged within a limited display area efficiently while maintaining the regularity of the structural representation.

The present invention also may carry out the graphical display of the hierarchical structure using circles instead of the above-described ellipses. In this manner, by using a circle, the arithmetic processing is simplified, and even in a large scale hierarchical structure having from hundreds to about a thousand nodes, the spaces between the nodes and links are increased and are easy to see, in addition to being able to use direct commands easily to manipulate the nodes and links on the screen.

Further, the present invention calculates the radii of the circles on which the above-described nodes are arranged based on the number of lower layer nodes. In this manner, even in large scale hierarchical structures having hundreds or thousands of nodes, or structures having an asymmetrical number of layers or number of nodes, along with spreading the space between nodes and links to facilitate viewing, the nodes and links on the screen are easily manipulated by direct command.

Additionally, the present invention calculates the radii of the circles on which the above-described nodes are arranged based on the number of lower layers. In this manner, even in large scale hierarchical structures having hundreds or thousands of nodes, or structures having an asymmetrical number of layers or number of nodes, along with increasing the space between nodes and links to make them easy to view, the nodes and links on the screen are easily manipulated by direct command.

In addition, when a node and its two lower layer nodes are directly connected in the above-described graphical display of the hierarchical structure, the present invention arranges on one ellipse the nodes of the same layer subordinate to the same upper node, and arranges the middle layer nodes having a part in which the upper and lower layer nodes are directly connected but there is no node corresponding to that layer, on an ellipse generated within the ellipse arranging the lower layer nodes. In this manner, along with eliminating overlapping of the link display showing the connection relations between nodes, the relationships between the connections of the layers of nodes can be displayed so as to be easily discriminated.

Furthermore, in the graphical display of hierarchical structures described-above, when a plurality of hierarchical structures are connected, the present invention partitions the display area of the display according to the number of the multi-layered structures in units of the highest independent layer of nodes, and arranges the nodes included in the highest layer of each hierarchical structure on the circumference of an ellipse drawn in the center of each display area. The present invention arranges the centers of the ellipses on which the layers subordinated to the same node are arranged on concentric circles which are larger than the upper layers, and arranges the nodes of the part connected with different hierarchical structures at adjacent positions. In this manner, by making the nodes of the connected parts of two hierarchical structures adjacent to each other, the overlap of links can be avoided, and nodes and links on the screen can be easily manipulated by direct command.

Finally, in the graphic display of the above-described hierarchical structure, the present invention branches the links showing vertical relationships between nodes at a position which does not overlap with other links issuing from the highest layer nodes, and connects them to each node of the lower layer. In this manner, the present invention can branch links showing vertical relationships between nodes arranged radially corresponding with layers at a position where one line issuing from an upper layer node branches where it does not overlap with the display of another link, and connects them with each node of the lower layer. Even in a large scale hierarchical structure having from hundreds to about a thousand nodes, the space between the links can be spread out and displayed in an easily viewed manner, and the links can be easily manipulated by direct command on the screen.

PREFERRED EMBODIMENTS

Embodiments of the present invention will be explained below in detail with reference to the figures.

Figure 1:
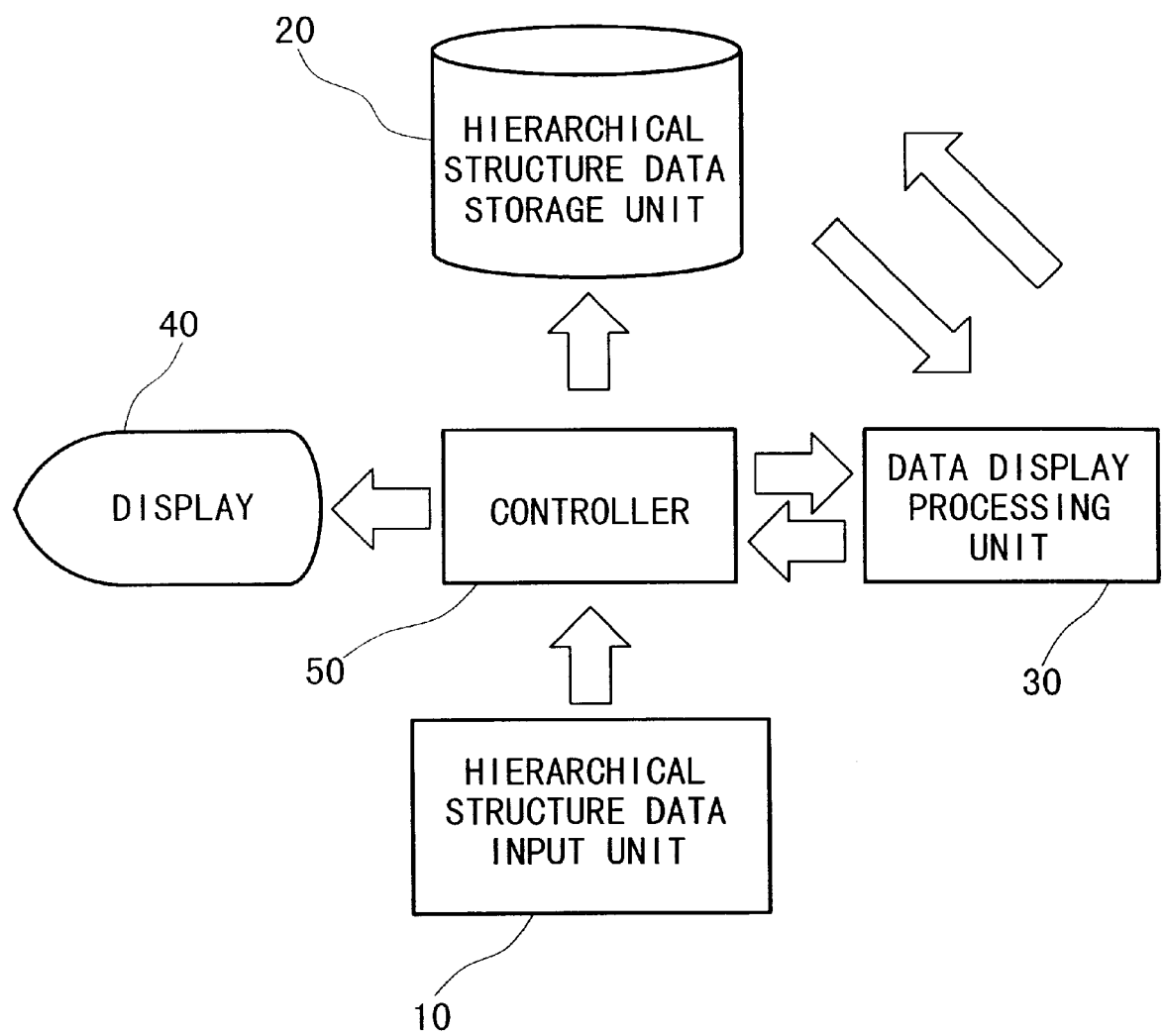
FIG. 1 is a block diagram showing an example of the construction of the apparatus used in the present invention.
Figure 2:
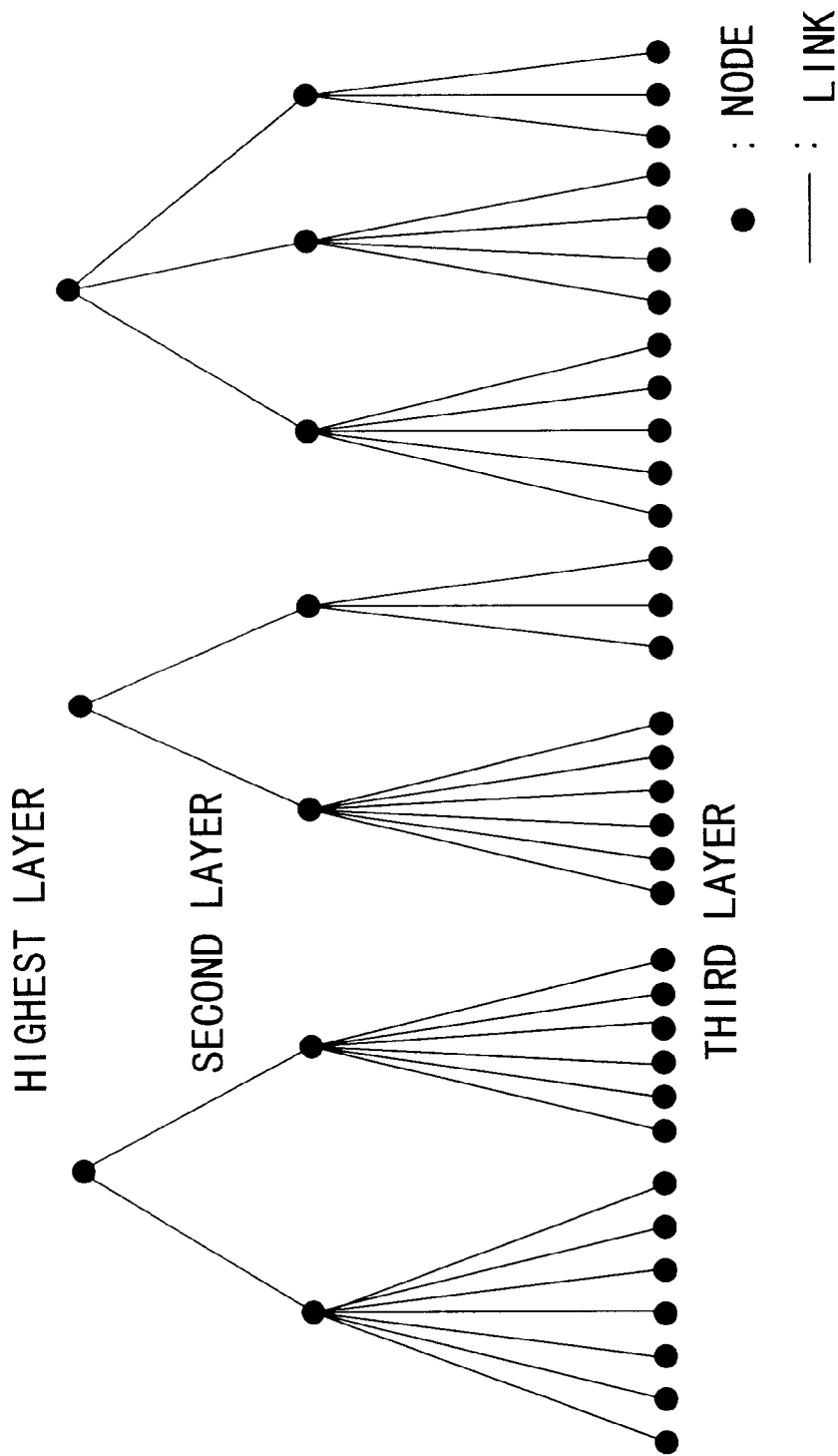
FIG. 2 is an example of a conventional display of a hierarchical structure by tree display.
Figure 3:
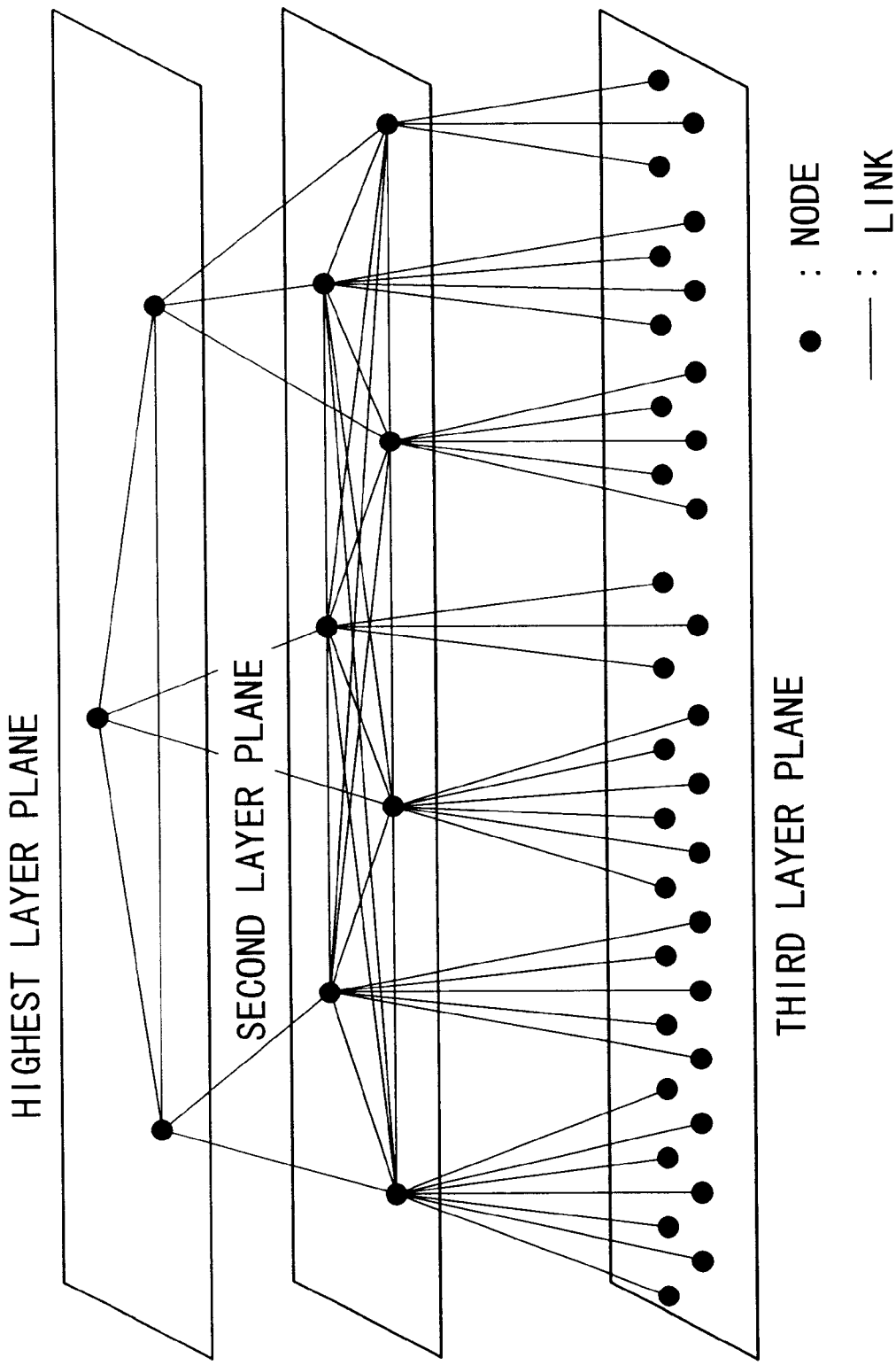
FIG. 3 is an example of a conventional display of a hierarchical structure showing trees using planes.

FIG. 1 is an example of an apparatus applying the present invention, comprising the input part 10 which inputs data related to the hierarchical structures, the hierarchical structure data storage unit 20 which stores the input hierarchical structure data, the data display processing unit 30 which converts the stored hierarchical structure data into the graphic display of the hierarchical structure image, the display 40 which shows the converted hierarchical structure image, and the controller 50 which controls each of these parts. Furthermore, in the hierarchical structure data storage unit 20, the data related to the display area of the display 40 is also stored, in addition to the hierarchical structure data. The present invention is characterized by the data display processing unit 30, and using the data stored in the multi-layer data storage unit, the processing for displaying in an easy-to-view manner on the same screen large scale multi-storage structures is carried out in this data display processing unit.

Below, the processing sequence in the data display processing unit 30 according to several embodiments will be explained in detail using the flowcharts and the explanatory figures.

First Embodiment

The first embodiment of the present invention will be specifically explained below using the figures.

Using data stored in the hierarchical structure data storage unit 20, the data display processing unit 30, which is the principle part of the present invention, calculates the positions and sizes of the ellipses for each layer on which the nodes will be arranged, carries out the replacing of nodes with, for example, circles and triangles, and the links which connect the nodes with straight lines, and displays the constructed multilayer image on the display 40 via the controller 50.

Figure 4:
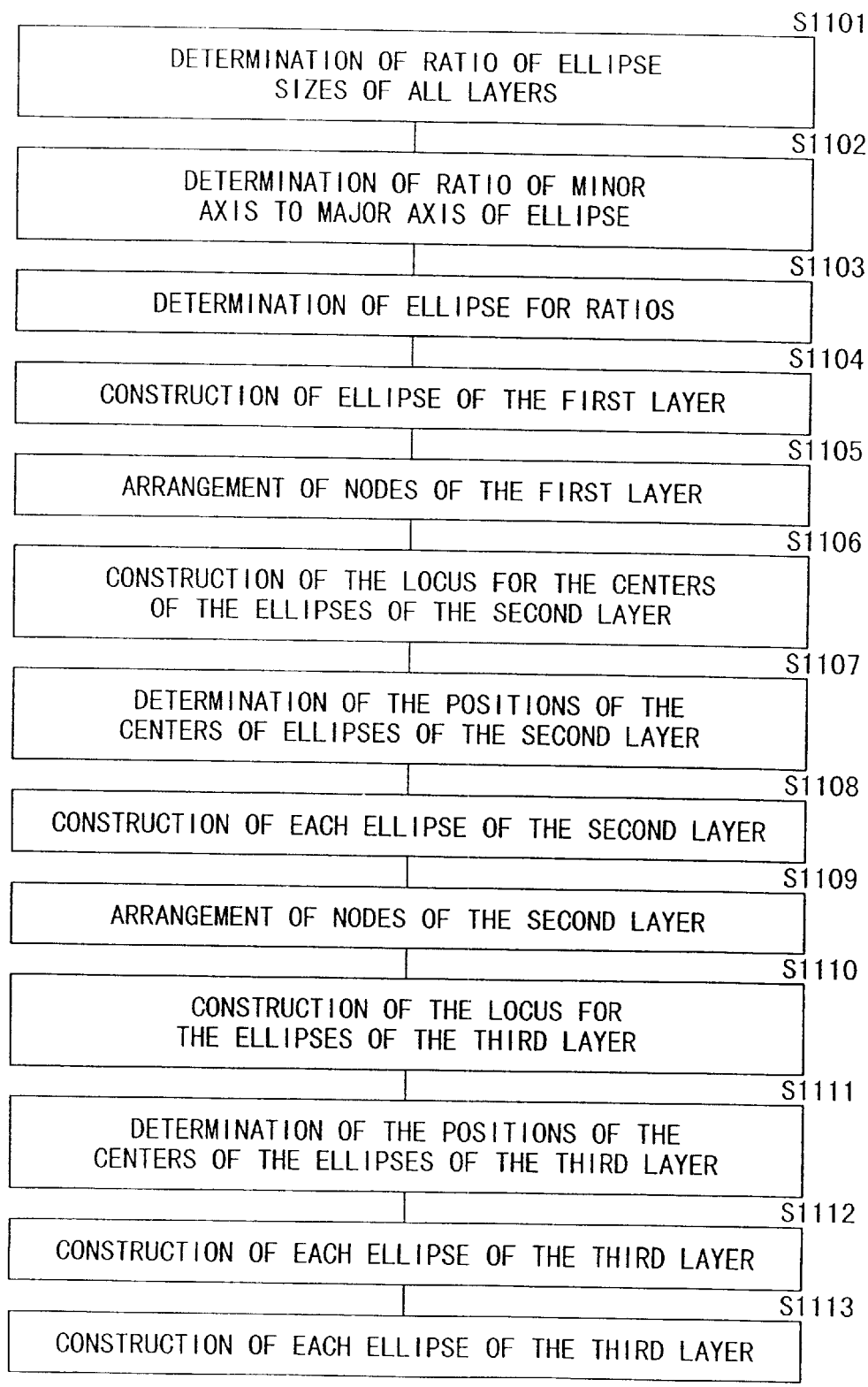
FIG. 4 is an example of a flowchart showing the processing in the data display processing unit of FIG. 1 in the first embodiment.

FIG. 4 is an example of a flowchart showing the processing sequence in the data display processing units. The processing sequence program in FIG. 4 can be preinstalled in the apparatus or recorded on a recording medium such as a floppy disk or CD-ROM, and then loaded from the recording medium.

Figure 5:
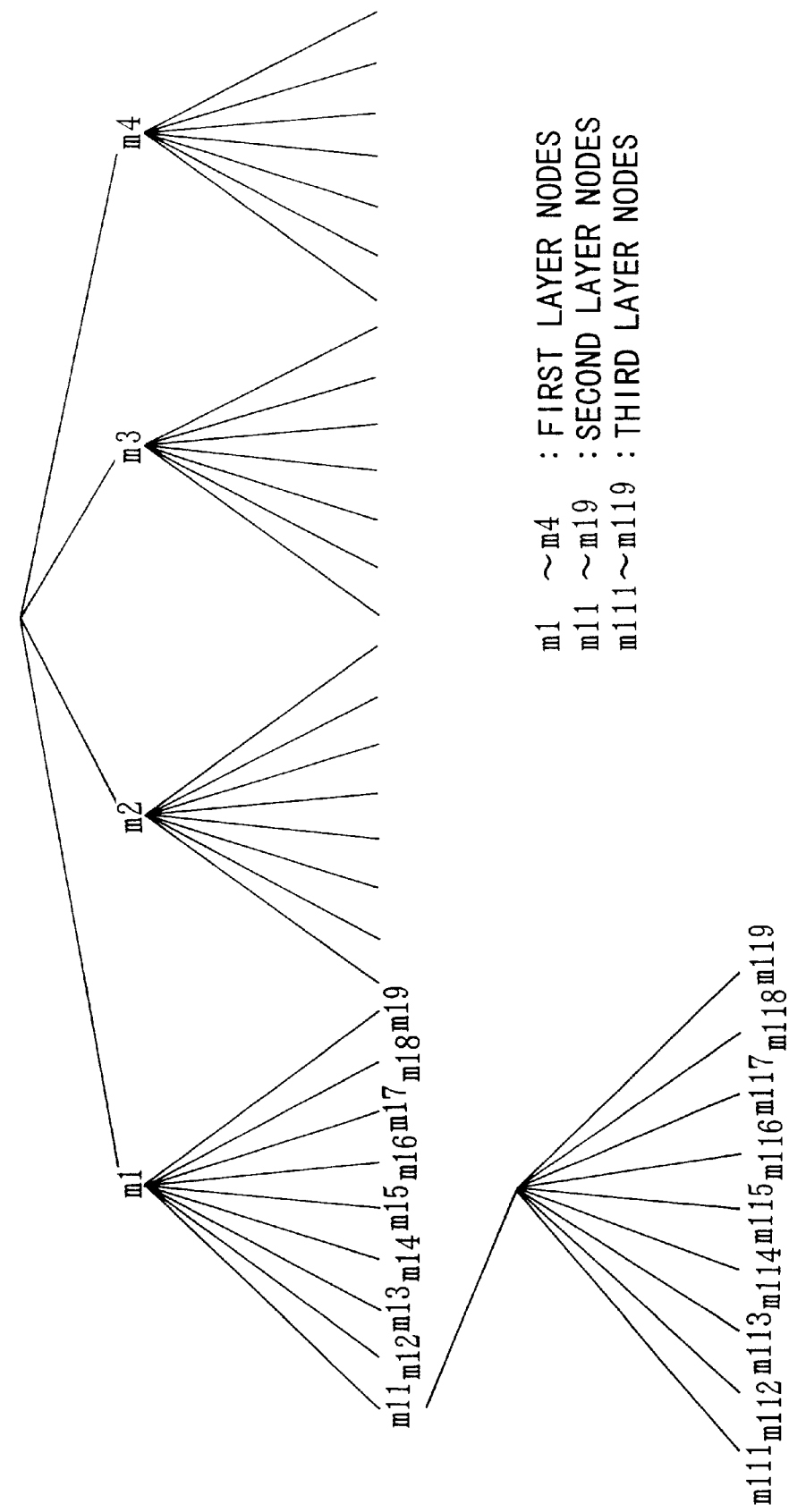
FIG. 5 is an example of a drawing showing a part of a hierarchical structure of data displayed with trees stored in the hierarchical structure data storage unit of FIG. 1 in the first embodiment.

First, the processing steps for the placement of ellipses for the hierarchical structure in the first embodiment will be explained. Moreover, the processing of the present invention is carried out maintaining the following settings:

(1) In the hierarchical structure data storage unit 20, the data of a three-layer hierarchical structure such as that shown in FIG. 5 is stored. For ease of understanding, FIG. 5 shows the hierarchical structure data stored with a tree display in the hierarchical structure data storage unit 20. Moreover, in addition to the hierarchical structure data, data related to the display area of display 40 is also stored in the hierarchical structure data storage unit 20.

(2) In the flowchart of FIG. 4, in the determination of the ratio of the sizes of the ellipses for each layer (step S 1101), the sizes of ellipses for each layer are all identical, and for the number of nodes which are arranged on the same ellipse, the ratios of the sizes of the ellipses of each layer are determined according to the mean value of each layer. Here (for example, FIG. 5), the mean value of the number of nodes for each layer is set to 4 for the first layer, 8 for the second, and 8 for the third. In the determination of the minor axis and major axis of each ellipse, the ratios of the minor and major axes are all made identical, and the ratios are set according to the ratios of the abscissa to the ordinate of each display area. Here, the ratio of the abscissa to ordinate is shown for a display area of 2:3; therefore, the ratio of the major axis to the minor axis is 2:3. In the determination of the ellipse ratios (step S 1103), the lengths of the abscissa and ordinate of the display area are distributed according to the ratios found in the determination of the ratio of the sizes of the ellipses (step S 1101) and the determination of the ratios of the minor and major axes of the ellipses (step S 1102).

(3) In the construction of the first layer ellipse (step S 1104), the first layer ellipse is drawn based on the previously found ellipse ratio. In the arrangement of the nodes of the first layer (step S 1105), the nodes are positioned on the circumference of the ellipse evenly spaced depending on the number of nodes in the first layer.

(4) In constructing the locus for the centers of the ellipses for the second layer (step S 1106), an ellipse is constructed concentric to the first layer ellipse and whose minor axis and major axis are:

ellipse minor axis and major axis of first layer+ellipse minor axis and major axis of second layer.

In determining the position of the centers of the ellipses of the second layer (step S 1107), the points at which the extensions of straight lines connecting the center of the ellipse of the first layer and the nodes of the first layer intersect the ellipse which is the previously found locus for the centers of the ellipses of the second layer comprise the centers for the ellipses of the second layer. In the arrangement of the nodes of the second layer (step S 1109), starting with the points where the lines extending from the center of the ellipse of the first layer and traversing each node of the first layer intersect the ellipses of the second layer, the circumferences of the ellipses are partitioned into equal parts, and excluding the starting point, the nodes are arranged on the partition points.

(5) In constructing the locus for the centers of the ellipses of the third layer (step S 1110), an ellipse is constructed concentric to the second layer ellipse and whose minor axis and major axis are:

minor axis and major axis of second layer+minor axis and major axis of third layer followed by the construction of an ellipse concentric to the first layer ellipse and whose minor axis and major axis are:

first layer minor axis and major axis+third layer minor axis and major axis and within the circumference of the ellipse concentric to the ellipse of the second layer constructed in the previous step, the lengthwise arc whose ends intersect with the two ellipses comprises the locus for the centers for the ellipses of the third layer. In determining the position of the centers of the ellipses of the third layer (step S 1111), the locus for the centers of the ellipses of the third layer found above is partitioned into equal parts, and the partition points, including the two end points, are made the centers of the ellipses of the third layer. In constructing each of the ellipses of the third layer (step 1112), using each of the previously found points as the centers, ellipses whose sizes are found by the determination of ellipse ratios (step S 1103) are constructed. In the arrangement of the nodes of the third layer (step S 1113), starting with the points where the lines extending from the center of the ellipse of the second layer and traversing each node of the second layer intersect the ellipses of the third layer, the circumferences of the ellipses are partitioned into equal parts, and excluding the starting point, the nodes are arranged on the partition points.

FIGS. 6 through 15 concretely explain the processing of the arrangement of ellipses of the hierarchical structure in the present embodiment. Processing will be explained below with reference thereto. Moreover, there are cases where the reference numerals used in FIGS. 5 through 15 for concretely explaining the flowchart in FIG. 4 are the same as the reference numerals used in other figures, and while the same reference numeral indicates the same item in FIG. 5 through FIG. 15, they are not related to items indicated by the same numbers in other figures.

Figure 6:
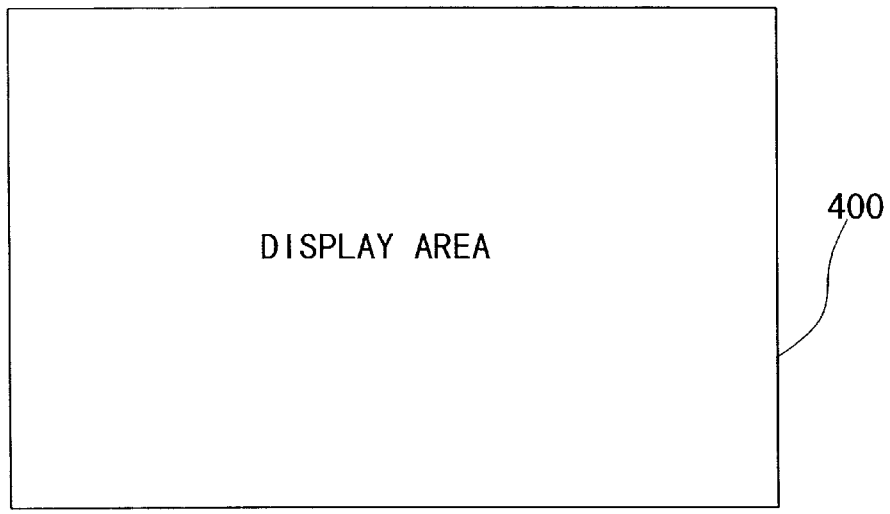
FIG. 6 is an example of the abscissa-ordinate ratio of the display area in the first embodiment.
Figure 7:
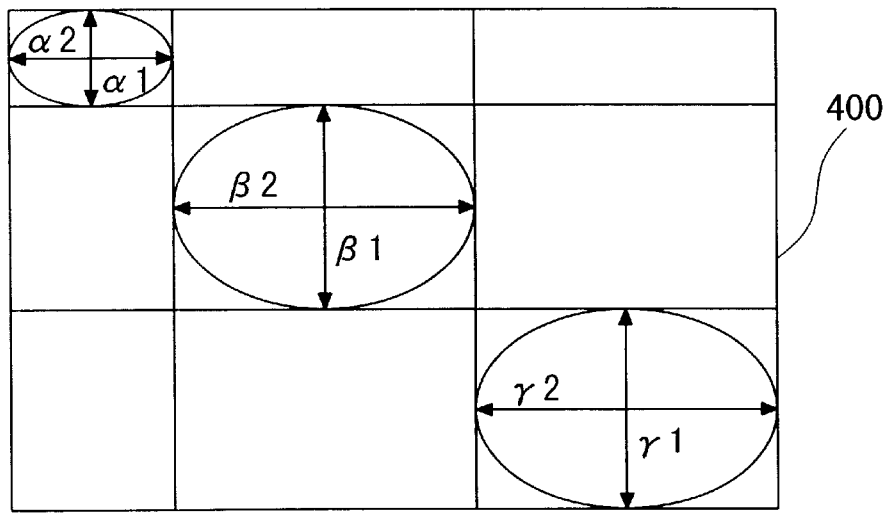
FIG. 7 is an example of the ratios of the ellipses of each layer in the first embodiment.

First, in the case of FIG. 5, when the data of the hierarchical structure is input and the average value of the number of nodes in each layer is found, the first layer is found to be 4, the second layer is 8, and the third layer is 8. Here, the ratio of the sizes of the ellipses for each layer is determined to be 1:2:2 (step S 1101). Then, as shown in FIG. 6, because the ordinate to abscissa ratio of the display area 400 is 2:3, the ratios of the minor axes to the major axes are determined to be 2:3 (step S 1102). Next, the lengths of the ordinate and abscissa of the display area 400 of FIG. 6 are partitioned so that the sizes of the ellipses of each layer have a ratio of 1:2:2, the ratio is found for the sizes of the ellipses, and as shown in FIG. 7, the minor axes and major axes of the ellipses of each layer are determined to be α1 and α2 for the first layer, β1 and β2 for the second layer, and γ1 and γ2 for the third layer (step S 1103). Subsequently, the ellipses are similarly constructed for each layer, and then their nodes are arranged.

Figure 8:
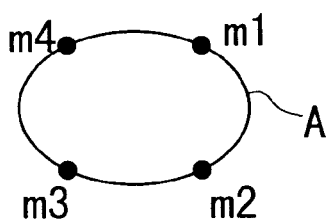
FIG. 8 is an example of the node arrangement of the first layer in the first embodiment.

First, ellipse A of the first layer with the minor axis and major axis being α1 and α2, respectively, is drawn (step S 1104). Then, the four nodes m1, m2, m3, and m4 of the first layer are arranged at positions separated equally on the circumference of ellipse A (step S 1105). This is shown in FIG. 8.

Figure 9:
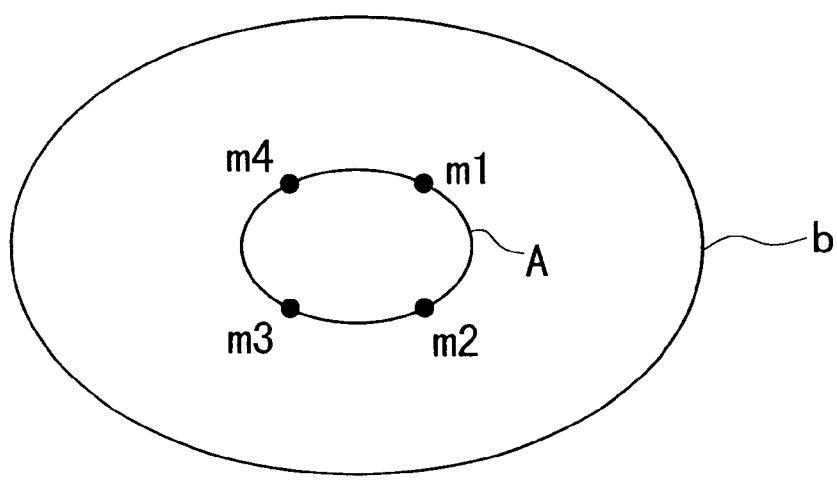
FIG. 9 is an example of the locus for the centers of the ellipses for the second layer in the first embodiment.
Figure 10:
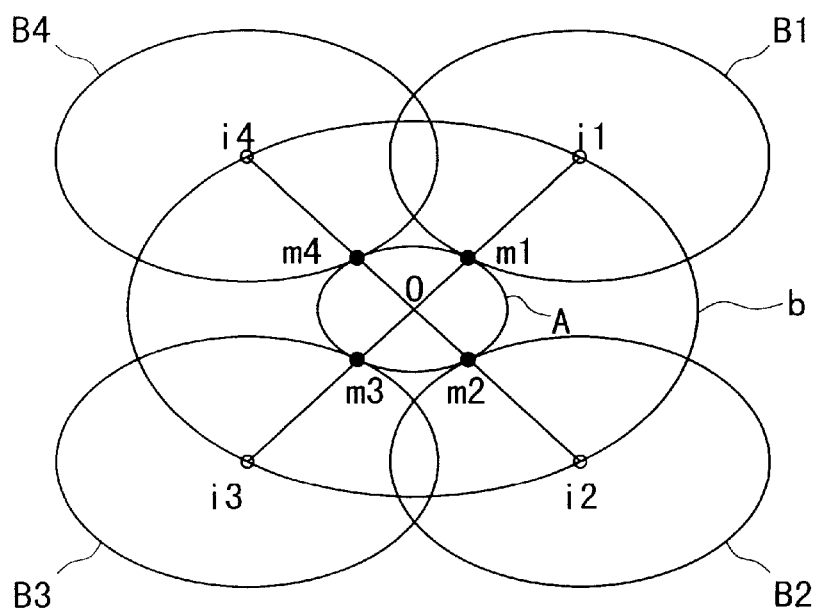
FIG. 10 is an example of ellipses of the second layer in the first embodiment.
Figure 11:
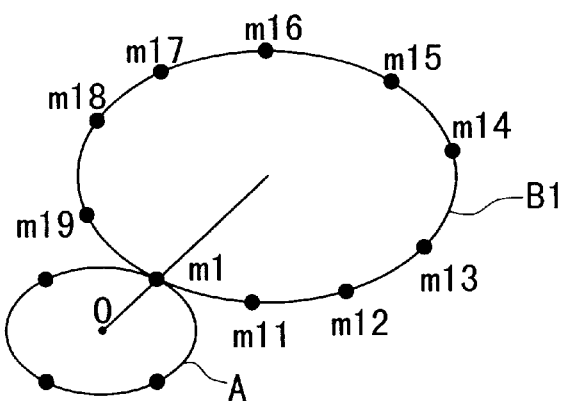
FIG. 11 is an example of the node arrangement of the second layer in the first embodiment.

Next, as the locus for the centers of the ellipses for the second layer, shown in FIG. 9, ellipse b whose minor axis and major axis are α1+α1 and α2+β2, respectively, is constructed on the center of ellipse A of the first layer (step S 1106). Next, as shown in FIG. 10, the extension of the straight lines joining the center O of ellipse A and each of the nodes m1, m2, m3, and m4 of the first layer intersects with points i1, i2, i3, and i4 on ellipse b, and the intersection points i1, i2, i3, and i4 are made the centers of the ellipses of the second layer (step S 1107), and each ellipse B1, B2, B3, and B4 of the second layer (step S 1108) with minor axes and major axes of β1 and β2, respectively, is constructed. In addition, for the nodes m11~m19 of the second layer subordinate to node m1 of the first layer, starting from the line extending from the center O of ellipse A and traversing node m1 and intersecting the ellipse B1, the circumference of ellipse B1 is partitioned into equal parts, and on ellipse B1, excluding the starting point, the nodes m11~m19 are arranged on the partition points (step S 1109). This is shown in FIG. 11. In FIG. 11, the intersection of the extension of the straight line joining the center O and node m1 and ellipse B1 is the same point as the node m1. Hereinbelow, this is the same for the arrangement of nodes of the second layer on ellipses B2~B4 subordinate to nodes m2, m3, and m4.

Figure 12:
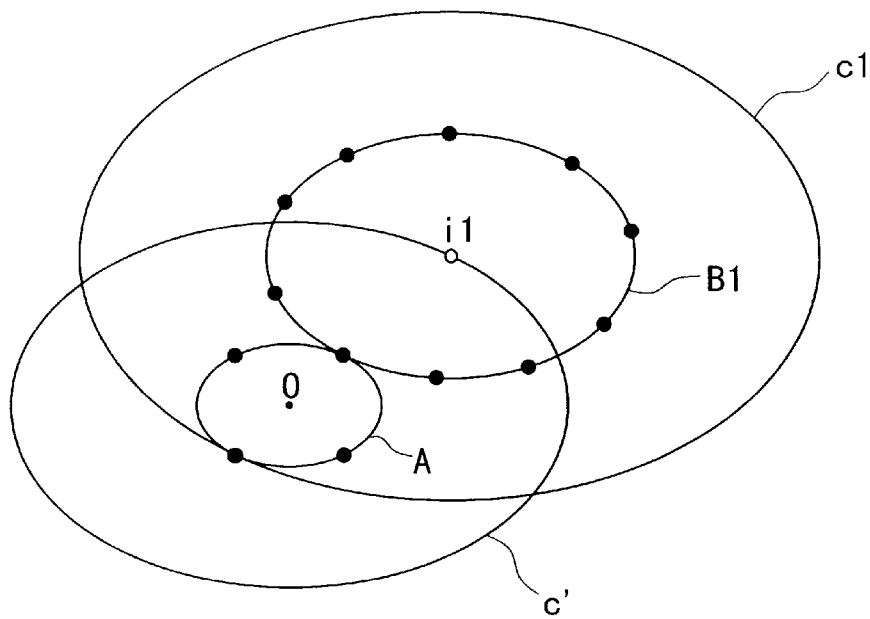
FIG. 12 is an example of the locus for the centers of the ellipses of the third layer in the first embodiment.
Figure 13:
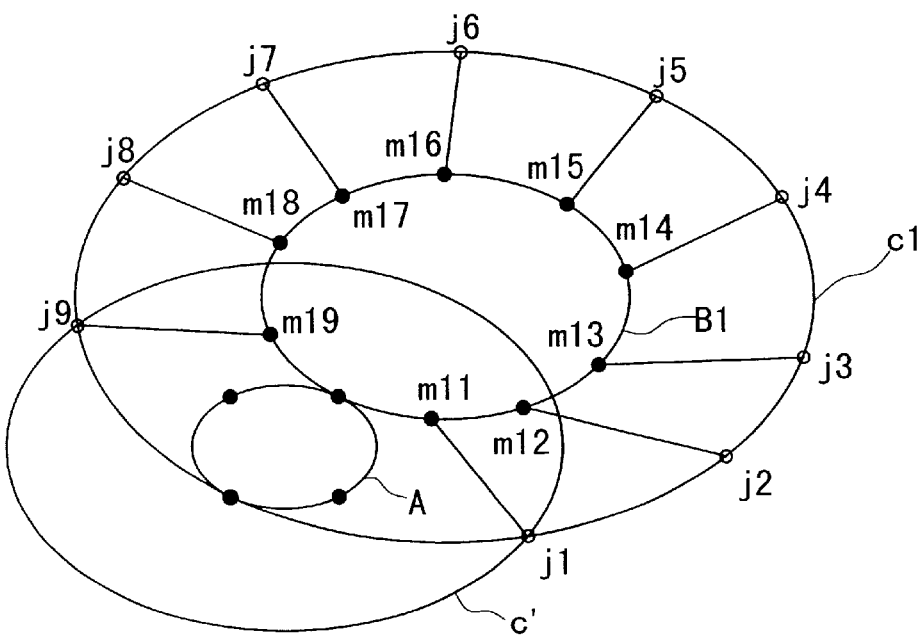
FIG. 13 is an example of the centers of the ellipses of the third layer in the first embodiment.
Figure 14:
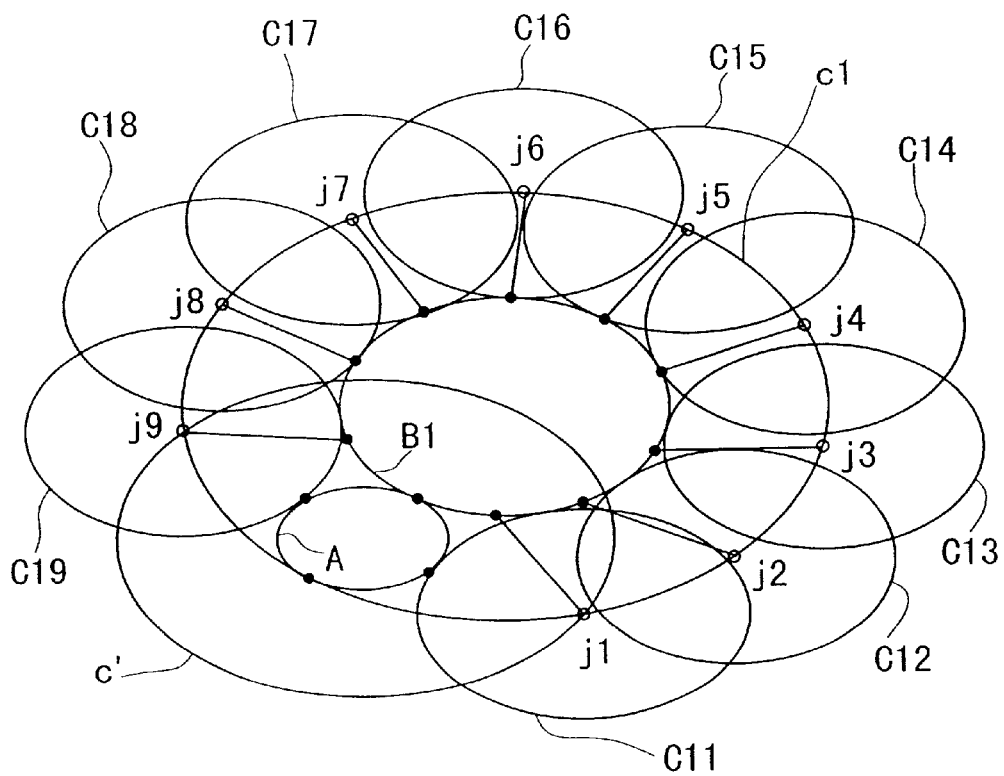
FIG. 14 is an example of the ellipses of the third layer in the first embodiment.
Figure 15:
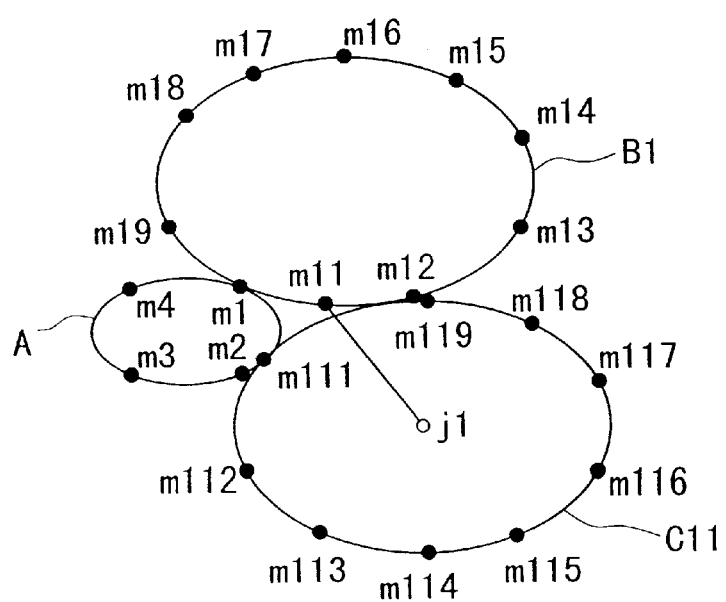
FIG. 15 is an example of the node arrangement of the third layer in the first embodiment.

Next, as shown in FIG. 12, an ellipse c1 whose minor axis and major axis are β1+γ1 and β2+γ2, respectively, concentric to ellipse c1 is constructed on center O of ellipse B1, and subsequently, an ellipse c' whose minor axis and major axis are α1+γ1 and α2+γ2, respectively, is constructed on the center O of ellipse A. Within the circumference of ellipse c1, the lengthwise arc whose ends are the intersections of ellipse c1 and ellipse c' (the segment with the bold line in FIG. 12) is made the locus for the centers of ellipses for the third layer subordinate to nodes m11~m19 included on ellipse B1 (step S 1110), and as shown in FIG. 13, it is partitioned into equal parts. The partition points j1~j9, including the two end points, are made the centers of ellipses of the third layer subordinate respectively to nodes m11~m19 (step 1111). Further, making the partition points j1~j9 the centers, as shown in FIG. 14, ellipses C11~C19 of the third layer subordinate to nodes m11~m19 and whose minor axis and major axis are γ1 and γ2, respectively, are constructed (step 1112). In addition, for the nodes m111~m119 of the third layer subordinate to ellipse C11, starting on the intersection of the extension of the straight line connecting the center j1 of ellipse C11 and node m11, the circumference of ellipse C11 is partitioned into equal parts, and excluding the starting point, nodes m111~m119 are arranged (step S 1113). This is shown in FIG. 15. Below, the arrangement of the nodes for ellipses C12~C19 is the same.

Subsequently, steps S 1110~S 1113 can be repeated for the arrangement of nodes of the third layer subordinate to ellipses B2~B4, if they exist.

In the above explanation of the first example, the hierarchical structure of the third layer shown in FIG. 5 is stored in the hierarchical structure data storage 20, but the number of layers and the hierarchical structure are arbitrary.

Also, in the flowchart of FIG. 4, in the determination of the ratios of the sizes of the ellipses of each layer (step S 1101), the size of the ellipses for each layer were identical, but the size can be changed as a function of the number of nodes. Additionally, the ratio of the sizes of the ellipses of each layer was determined as a function of the average value of the number of nodes for each layer, but this can be determined as a function of the largest value for the number of nodes for each layer, or the calculation of size can be weighted as a function of the layers. In the determination of the ratio of the minor axis to the major axis of the ellipses (step S 1102), the ratio of the minor axis to the major axis of the ellipses was identical, and a function of the ordinate to abscissa ratio of the display screen, but it need not depend in particular on the ordinate to abscissa ratio of the display area. Also, a display screen such as that shown in FIG. 6 was used, but the size of the display screen is arbitrary. In the determination of the ellipse ratios (step S 1103), the length of the ordinate and abscissa of the display area was divided according to the ratio found by determining the ratio of the size of the ellipse (step S 1101) and the ratio of the minor axis and the major axis of the ellipse (step S 1102), but if it is not necessary to display at one time ellipses of all layers on the display area, this length need not depend on the size of the display area.

In the arrangement of the nodes of the first layer (step S 1105), the nodes are arranged positioned on an equally divided circumference of an ellipse depending on the number of nodes in the first layer. The manner of the distribution, however, does not have to be equal, and can depend on the structure of the lower layers.

In constructing the locus for the centers of the ellipses of the second layer (step S 1106), the size of the ellipse on the center of the ellipse of the first layer had a minor axis and major axis of:

minor axis and major axis of first layer+minor axis and major axis of second layer.

However, when the sizes of the ellipses of each layer are not identical, they should be based on the size of the minor axis and the major axis of the largest ellipse. In the arrangement of the nodes of the second layer (step S 1109), starting with the point of intersection between the extension of the straight line connecting the center of the ellipse of the first layer and the nodes of the first layer and each ellipse of the second layer, the circumference of the ellipse is partitioned into equal parts, and except for the starting point, the nodes are arranged on these partition points. However, the manner of distribution does not have to be equal and can depend on the structure of the lower layers.

In constructing the locus for the centers of the ellipses of the third layer (step S 1110), the size of an ellipse on the center of the ellipse of the second layer had a minor axis and major axis of:

minor axis and major axis of second layer+minor axis and major axis of third layer.

Next, an ellipse is constructed on the center of the ellipse of the first layer had a minor axis and major axis of:

minor axis and major axis of first layer+minor axis and major axis of third layer and within the circumference of the ellipse concentric to the ellipse of the second layer just constructed, the lengthwise arc whose two ends intersect the two ellipses is made the locus for the centers of the ellipses of the third layer. However, if the sizes of the ellipses of each layer are not identical, they should be based on the size of the minor axis and major axis of the largest ellipse. In determining the positions for the centers of the ellipses of the third layer (step S 1111), the locus for the centers of the ellipses of the third layer found above are partitioned into equal parts, and the partition points, including the two end points, are made the centers of the ellipses of the third layer, but this manner of distribution does not have to be equal, and can depend on the number of nodes which are distributed over each of the ellipses of the third layer.

Next, a second example of the processing of the arrangement ellipses of the hierarchical structure of the first embodiment will be explained using the figures. Moreover, the reference numerals used in FIG. 6 and FIGS. 16 to 25 used in the explanation of the present example are sometimes the same as reference numerals used in other figures, but even if the same reference numeral indicates the same item in FIG. 6 and FIGS. 16 to 25, they have no relation with the same reference numeral in the other figures.

Figure 16:
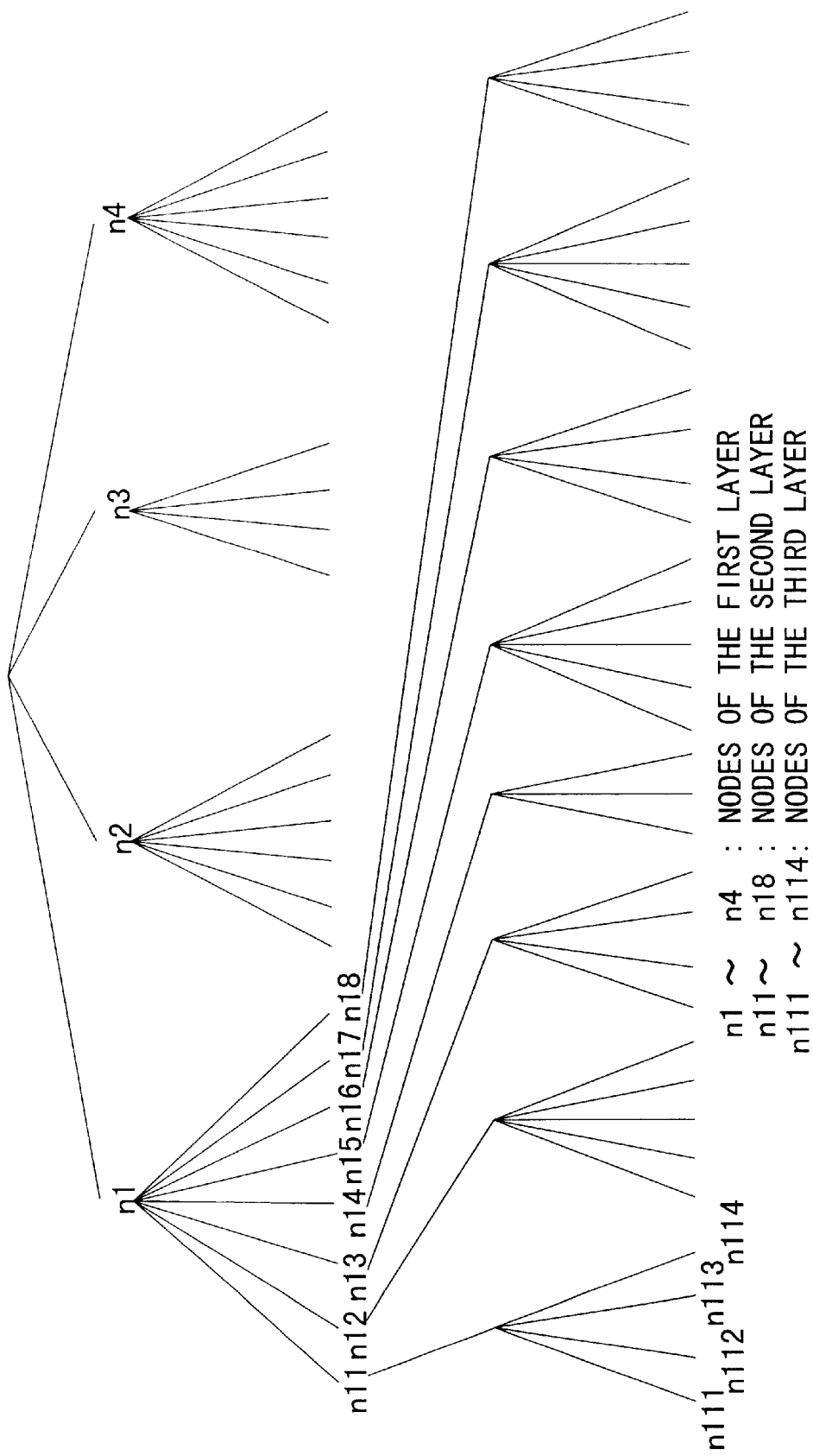
FIG. 16 is another example of a figure showing the data of part of a hierarchical structure stored in the hierarchical structure data unit of FIG. 1 displayed by trees displayed in the first embodiment.

Moreover, in the processing of the present example, the following settings are used:

(1) In the hierarchical structure data storage unit 20, the data for the hierarchical structure having three layers such as is shown in FIG. 16 is stored.

(2) In the flowchart of the data display processing unit 30 shown in FIG. 4, in the determination of the ratios of the sizes of each layer of the ellipses (step S 1101), the sizes of the ellipses depend on the number of arranged nodes, and the largest value for the number of nodes arranged on each layer of the same ellipse is chosen as the ratio of the axes of the layers of the ellipses. Here (in the case of FIG. 16), the largest value for the number of nodes is 4 for the first layer, 8 for the second, and 10 for the third. In determining the ratios of the minor axes to the major axes of the ellipses (step S 1102), the ratios of the minor axes and major axes are all the same, and their ratios depend on the ordinate to abscissa ratio of the display area. Here, as in a display area such as FIG. 6, the ratios of the minor axes to major axes of the ellipses are 2:3. In determining the ratios of the ellipses (step 1103), the lengths of the ordinates and abscissas of the display area are distributed according to the ratios found by the determination of the ratios of the sizes of the ellipses (step S 1101) and the determination of the ratios of the minor axes and major axes of the ellipses (step S 1102), and the ratios which give the sizes of the ellipses from the number of nodes are calculated.

(3) In constructing the ellipse of the first layer (step S 1104), the ellipse of the first layer, whose size is calculated by the determination of the ellipse ratios (step S 1103), is drawn. In the arrangement of the nodes of the first layer (step S 1105), the circumference of the ellipse is partitioned depending on the number of nodes of the second layer subordinate to each node of the first layer, and then the nodes are arranged.

(4) In constructing the locus for the centers of the ellipses of the second layer (step 1106), an ellipse is drawn on the center of the ellipse of the first layer and whose minor axis and major axis are:

minor axis and major axis of first layer+minor axis and major axis of second layer.

In determining the positions of the centers of the ellipses of the second layer (step S 1107), the intersections of the extensions of the straight lines connecting the center of the ellipse of the first layer and the nodes of the first layer and the ellipse which is the locus for centers of the previously found ellipses of the second layer become the centers of the ellipses of the second layer. In constructing each ellipse of the second layer (step S 1108), each of the previously found points is made a center, and ellipses whose sizes are based on the ratios calculated from the determination of the ellipse ratios (step S 1103) are constructed. In the arrangement of nodes of the second layer (step S 1109), starting with the intersection of the extensions of the straight lines joining the center of the ellipse of the first layer and each node of the first layer and each ellipse of the second layer, the circumference of the ellipse is partitioned into equal parts, and except for the starting node, each partition point is distributed according to the number of nodes in the third layer subordinate to each node, and each node is arranged.

(5) In constructing the locus for the centers of the ellipses of the third layer (step S 1110), an ellipse having a minor axis and major axis of:

minor axis and major axis of second layer+minor axis and major axis of largest ellipse of third layer, is constructed on each ellipse of the second layer, an ellipse having a minor axis and major axis of:

minor axis and major axis of ellipse of first layer+minor axis and major axis of largest ellipse of third layer, is constructed centered on the ellipse of the first layer, and finally within the circumference of the ellipse on the center of the ellipse of the second layer previously constructed, the lengthwise are whose ends are the intersections with the two ellipses becomes the locus for the centers of the ellipses of the third layer. In determining the positions of the centers of the ellipses of the third layer (step S 1111), the locus for centers of the ellipses of the third layer previously found is partitioned into, and the partition points, including the two end points, are distributed according to the number of nodes on the third layer subordinate to each node, and become the centers of the ellipses of the third layer. In constructing each ellipse of the third layer (step S 1112), the previously found points are each made a center, and ellipses whose size is found based on the ratios calculated with the determination of the ellipse ratios (step S 1103) are constructed. In the arrangement of the nodes of the third layer (step S 1113), starting at the intersection of the extension of the straight lines connecting the centers of the ellipses of the second layer and each node of the second layer and each ellipse of the third layer, the circumference of the ellipses is partitioned into equal parts, and except for the starting points, the nodes are arranged on the partition points.

FIGS. 17 to 25 are concrete explanatory drawings of the processing of the ellipse arragengeent of the hierarchical structure according to the present example. Below, the processing will be explained in reference to the figures.

Figure 17:
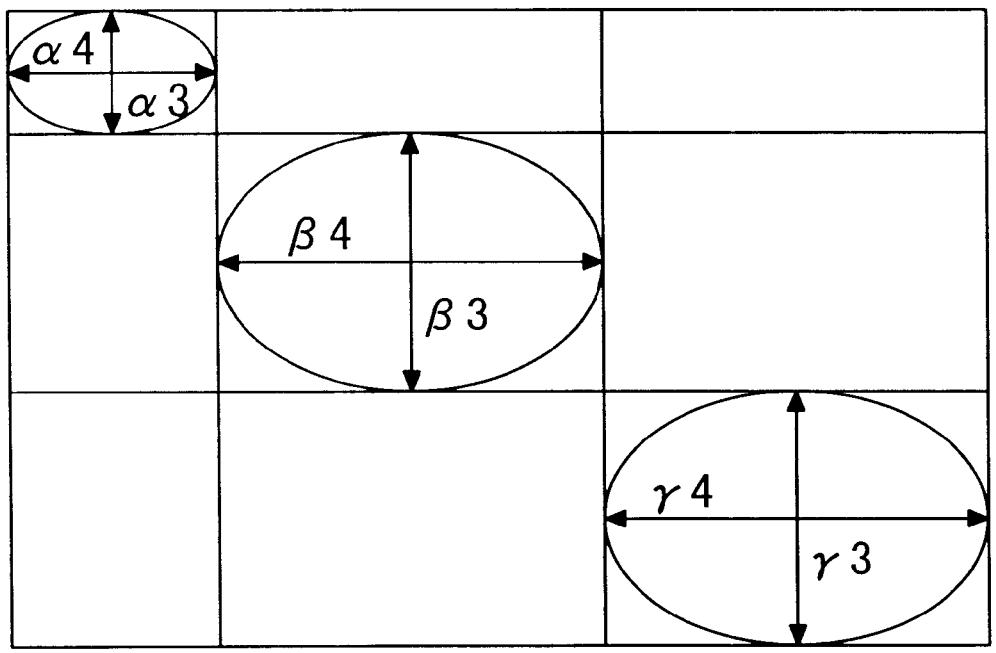
FIG. 17 is an example of the ellipse ratio of each layer in another example in the first embodiment.

First, when the largest value of the number of nodes of each layer is found, from FIG. 16, the first layer is found to be 4, the second layer is 8, and the third layer is 10. Here, the ratio of the sizes of the ellipses of each layer is 2:4:5 (step S 1101). Next, in the same manner shown in the above-cited FIG. 6, the ordinate to abscissa ratio of the display area is 2:3, and corresponding to this, the ratio of the minor axis to major axis of the ellipses is determined to he 2:3 (step S 1102). Next, the length of the ordinate and abscissa of the display area is divided according to the 2:4:5 ratio of the sizes of the ellipses of each layer, and the ratio found from the sizes of the ellipses is calculated, and the minor axis and major axis of the largest ellipse of each layer, as shown in FIG. 17, are determined to be $\alpha 3$ and $\alpha 4$ for the first layer, $\beta 3$ and $\beta 4$ for the second layer, and $\gamma 3$ and $\gamma 4$ for the third layer (step S 1103). Subsequently, the ellipses of each layer are constructed, and the arrangement of nodes is executed in sequence.

Figure 18:
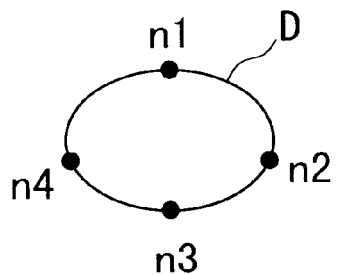
FIG. 18 is an example of the node arrangement of the first layer in another example in the first embodiment.

First, ellipse D of the first layer with a minor axis and major axis of $\alpha 3$ and $\alpha 4$ is drawn (step S 1104). In the case of FIG. 16, the number of nodes of the second layer subordinate to the four nodes n1, n2, n3, and n4 of the first layer are 8, 6, 4, and 6, respectively, so the circumference of ellipse D is partitioned according to this number of nodes, and the four nodes are arranged (step S 1105). This is shown in FIG. 18.

Figure 19:
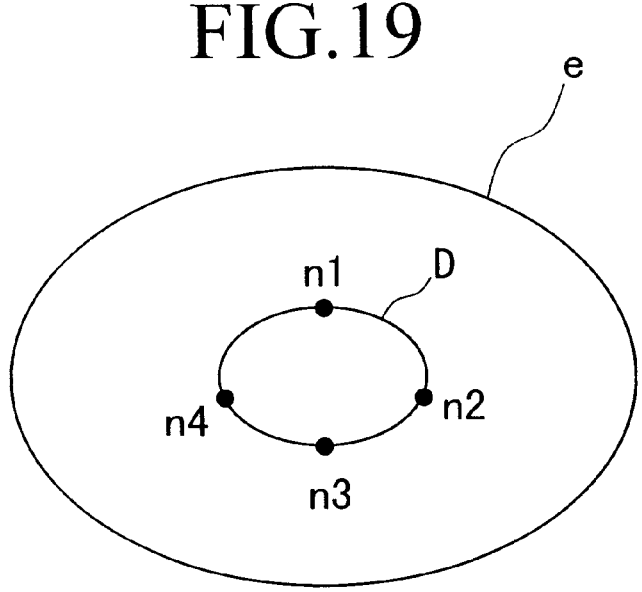
FIG. 19 is an example of the locus for the centers of the ellipses of the second layer in another example in the first embodiment.
Figure 20:
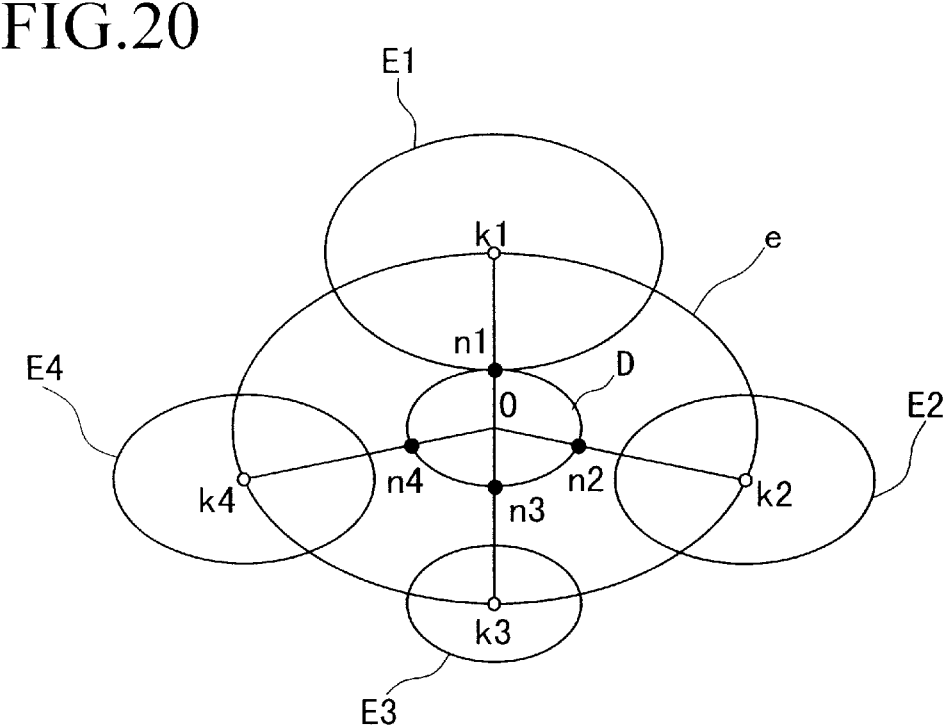
FIG. 20 is an example of the ellipses of the second layer in another example in the first embodiment.
Figure 21:
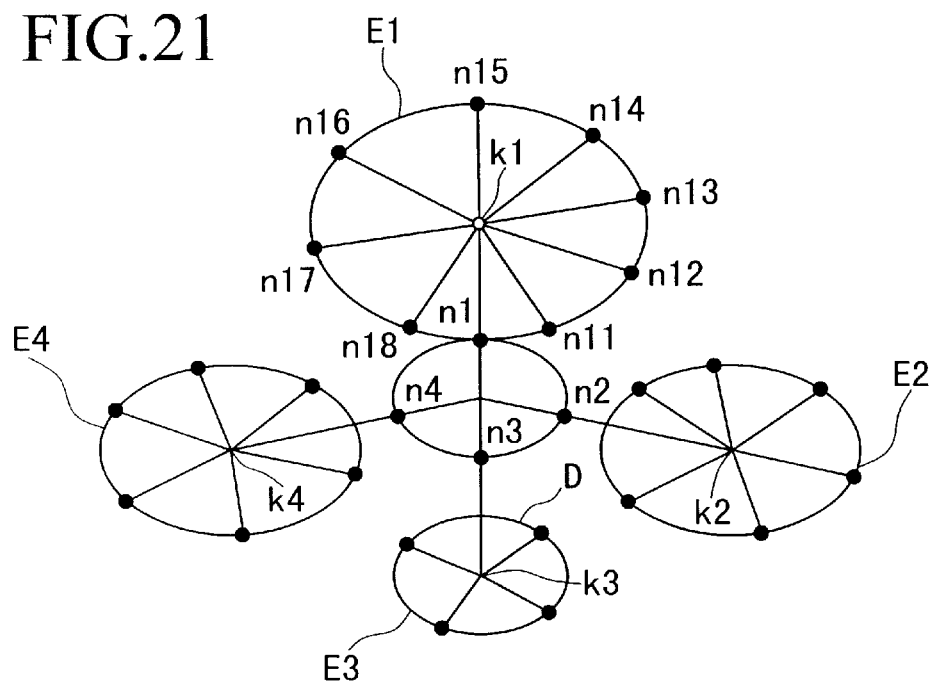
FIG. 21 is an example of the node arrangement of the second layer in another example in the first embodiment.

Next, as the locus for the centers of the ellipses of the second layer, as shown in FIG. 19, an ellipse E with a size having a minor axis and major axis of $\alpha 3+\beta 3$ and $\alpha 4+\beta 4$, respectively, is constructed (step S 1106) on the center of the ellipse D of the first layer. Next, as shown in FIG. 20, finding the intersections k1, k2, k3, and k4 where the extension of the straight lines connecting the center O of ellipse D and each node n1, n2, n3, and n4 of the first layer and the ellipse e, these intersections become the centers of each of the ellipses of the second layer (step S 1107), and each ellipse E1, E2, E3, and E4 of the second layer having a size depending on the number of arranged nodes is constructed (step S 1108). Then, first, the nodes n11~n18 on the second layer on ellipse E1 are arranged according to the number of nodes of the third layer (step S 1109). That is, as in FIG. 16, because the number of nodes of the third layer subordinate to each node n11~n18 are 4, 6, 4, 3, 6, 4, 7, and 5, respectively, starting from the intersection point of the extension of the straight line connecting the center of ellipse D and the node n1 and the ellipse E, the circumference of the ellipse E1 is partitioned into equal parts, and excluding the starting point, the partition points are distributed according to the number of nodes of the third layer subordinate to each node, and each of the nodes n11~n18 are arranged. Hereinbelow, the node arrangement of ellipses E2~E4 is the same. This is shown in FIG. 21.

Figure 22:
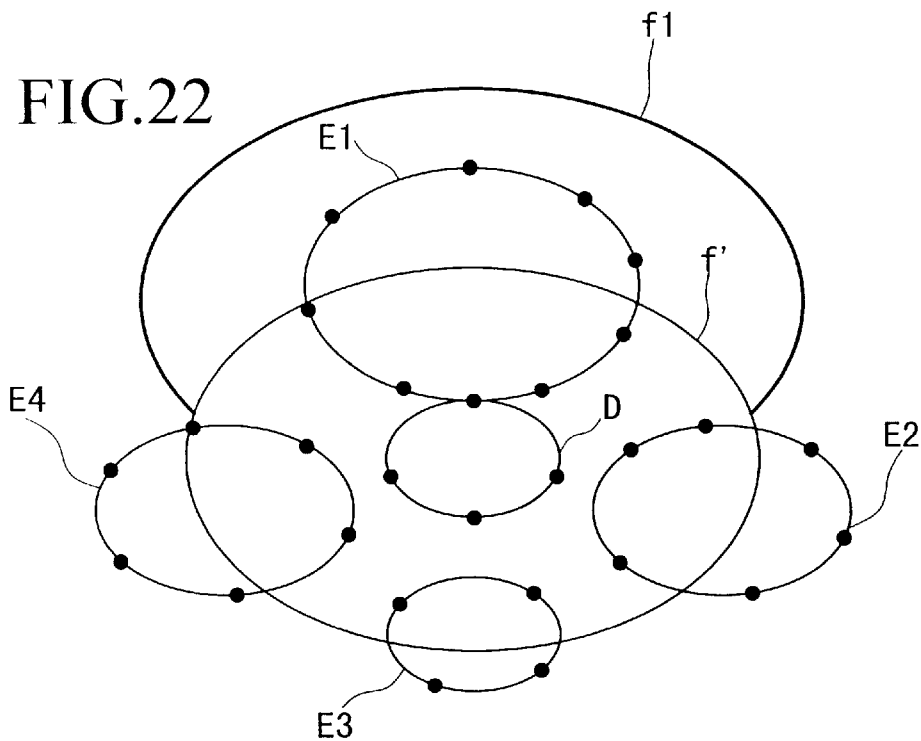
FIG. 22 is an example of the locus for the centers of the ellipses of the third layer in another example in the first embodiment.
Figure 23:
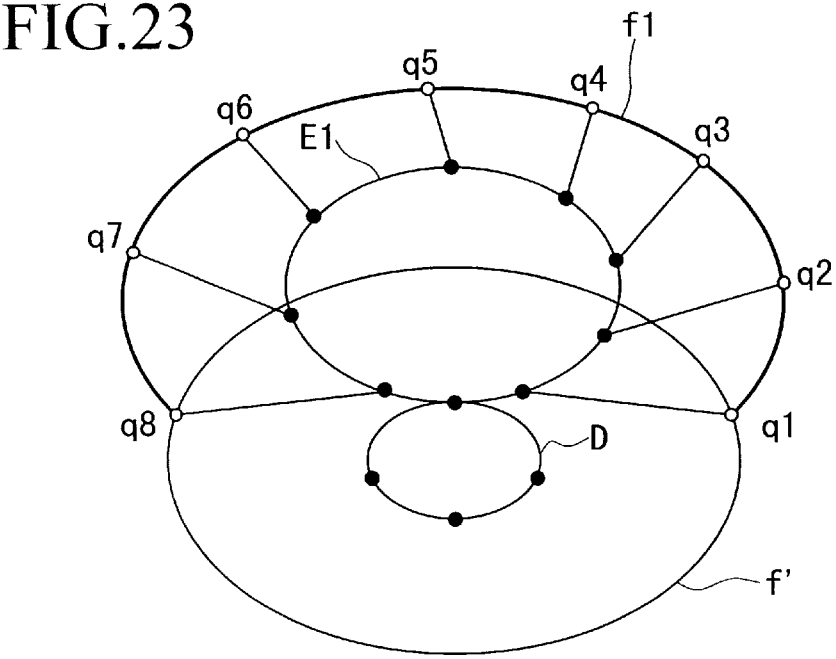
FIG. 23 is an example of the centers of the ellipses of the third layer in another example in the first embodiment.
Figure 24:
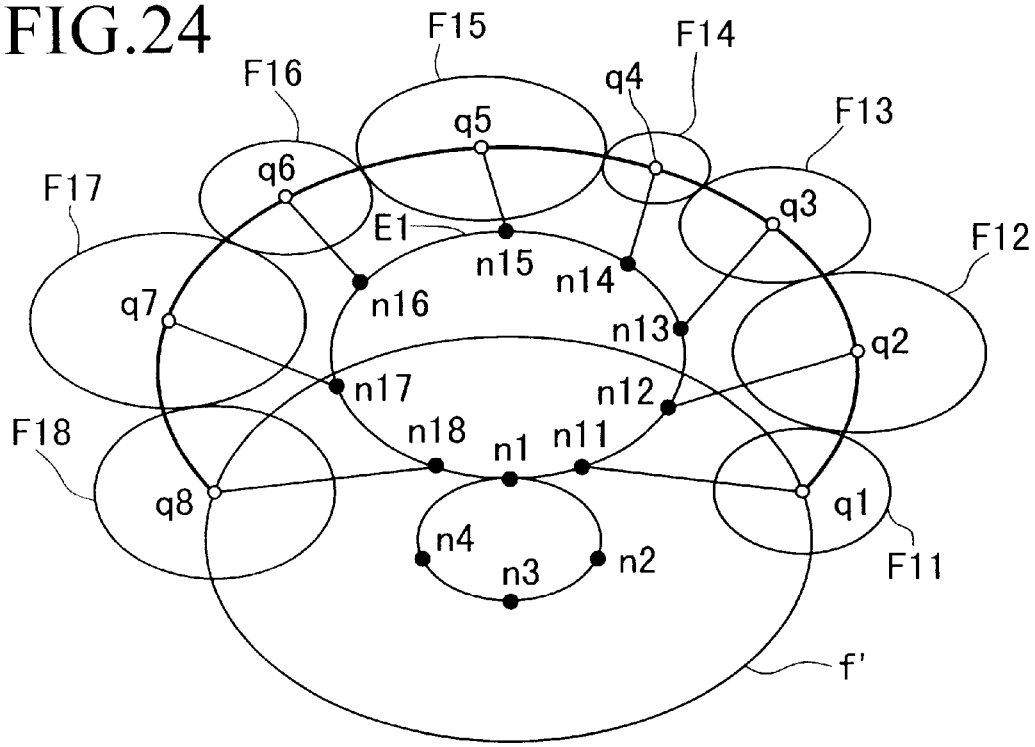
FIG. 24 is an example of the ellipses of the third layer in another example in the first embodiment.
Figure 25:
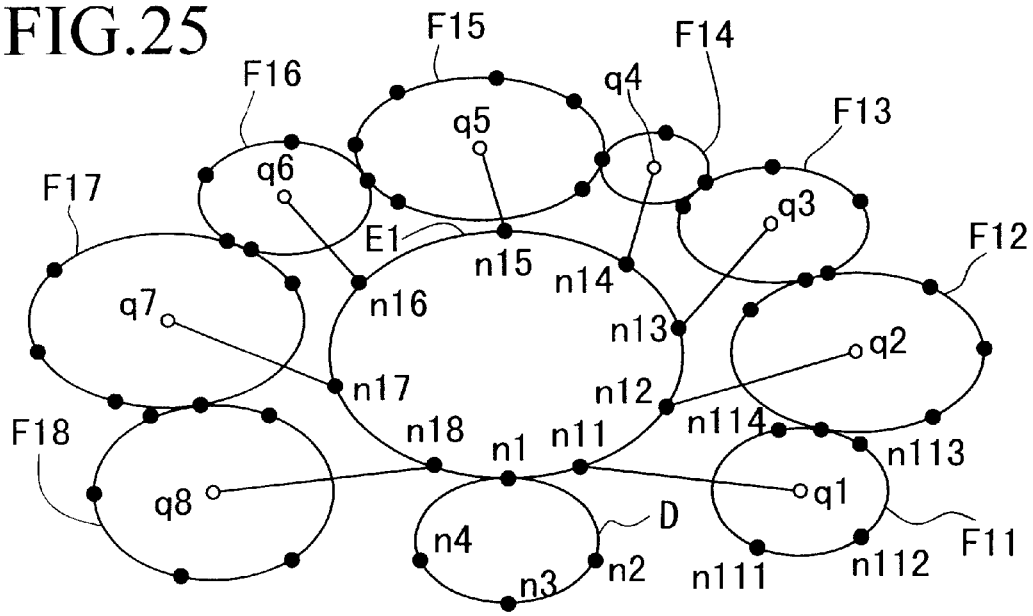
FIG. 25 is an example of the node arrangement in the third layer in another example in the first embodiment.

Next, as shown in FIG. 22, an ellipse f1 is constructed on the center of ellipse E1 having a minor axis and major axis of $\beta 3+\gamma 3$ to $\beta 4+\gamma 4$, respectively, and further, an ellipse f' is constructed on the center of ellipse D having a minor axis and major axis of $\alpha 3+\gamma 3$ to $\alpha 4+\gamma 4$, respectively, and within the circumference of ellipse f1, the lengthwise arc (bolded in FIG. 22) having as ends the intersection points of ellipse f1 and ellipse f' is made the locus for the ellipses of the third layer subordinate to the nodes n11~n18 included in ellipse E1 (step S 1110). Next, this locus for the centers is partitioned into equal parts, and the partition points, including the two end points, are distributed according to the number of nodes for the third layer subordinate to each of the nodes n11~n18, and like q1~q8 in FIG. 23, they become the centers of the ellipses of the third layer (step S1111). Further, making the partition points q1~q8 the centers, as shown in FIG. 24, the ellipses F11~F18 of the third layer subordinate to nodes n11~n18 having a minor axis and major axis of $\gamma 3$ and $\gamma 4$ (step S 1112) are constructed. Then, first, for nodes n111~n114 of the third layer arranged on ellipse F11, starting at the intersection point of the extension of the straight line connecting the center q1 of ellipse F11 and the node n11 and the ellipse F11, the circumference of ellipse F11 is partitioned into equal parts, and except for the starting point, the nodes n111~n114 are arranged on the partition points (step S 1113). The arrangement of nodes of ellipses F12~F18 is carried out in the same manner. This is shown in FIG. 25.

Subsequently, for the arrangement of the nodes of the third layer subordinate to ellipses E2~E4, if they exist, steps S 1110 to S 1113 are repeated in the same manner.

In the explanation of the second example of the above-described first embodiment, in the hierarchical structure data storage unit 20, as shown in FIG. 16, the data for a hierarchical structure of three layers is stored, but the number of layers and the structure of the layers is arbitrary.

Additionally, in the flowchart in FIG. 4 for the data display processing unit 30, in the determination of the ratio of the sizes of the ellipses of each layer (step S 1101), the size of the ellipses depends on the number of nodes to be arranged on it, but the calculation of the size can also be weighted depending on the layers. In the determination of the ratios of the minor axis to major axis of the ellipses (step S 1102), the ratios of the minor axis to major axis were all the same, depending on the ratio of the ordinate to abscissa of the display area, but the ratio need not be dependent on the ratio of the ordinate to abscissa of the display area. In addition, here as well, the ratio of the ordinate to abscissa of the display area was set to 2:3, but the size of the display area is arbitrary. In the determination of the ratios of the ellipses (step S 1103), the ratios are distributed by the determination of the length of the ordinate and abscissa of the display area (S 1101) and the determination of the ratio of the minor axis to major axis of the ellipses (step S 1102), and are calculated as ratios which find the size of the ellipse from the number of nodes. However, if it is not important that all layers be displayed in the display area all at once, it is not necessary to depend on the size of the display area.

In the arrangement of the nodes of the first layer (step S 1105), the circumference of the ellipse is partitioned according to the number of nodes of the second layer subordinate to each node of the first layer, but it can also be based on all the nodes of the subordinate layers. In addition, rather than partition the length of the ellipses, partitioning can be carried out according to central angles.

In determining the position of the centers of the ellipses of the second layer (step S 1107), the intersections where the extensions of the straight lines connecting the center of the ellipse of the first layer and the node of the first layer crosses the ellipse that is the locus for the centers of the ellipses of the second layer previously found become the centers of the ellipses of the second layer. However, depending on the size of the ellipses, the distance from the center of the ellipse of the first layer can be changed. In arranging the nodes of the second layer (step S 1109), starting from the point where the extensions of the straight lines connecting the center of the ellipse of the first layer and each node of the first layer intersects each ellipse of the second layer, the circumference is partitioned into equal parts, and excluding the starting point, the partition points are distributed according to the number of nodes of the third layer subordinate to each node, and each node is arranged. However, the manner of the arrangement of nodes is arbitrary, and the partition be carried out by a central angle rather then a length of the circumference.

In drawing the locus for the centers of the ellipses of the third layer (step S 1110), an ellipse having a size whose minor axis and major axis are:

minor axis and major axis of each ellipse of second layer+minor axis and major axis of the largest ellipse of the third layer.

is constructed on the center of each ellipse of the second layer. However, with respect to the "minor axis and major axis of the largest ellipse of the third layer," this can be based on the minor axis and major axis of the largest ellipse among the ellipses of the third layer subordinate to the nodes of the nodes disposed on the second layer rather than all the ellipses of the third layer. In addition, an ellipse on the center of the ellipse of the first layer of a size whose minor axis and major axis is constructed. However, similarly with respect to the "minor axis and major axis of the largest ellipse of the third layer," using the minor axis and major axis of the largest ellipse among the ellipses of the third layer subordinate to the nodes disposed on each ellipse of the second layer is also satisfactory. In deciding the position of the center of the ellipses of the third layer (step S 1111), the locus of the center of the ellipses of the third layer previously found are partitioned into equal parts, and the partition points, including the end points, are distributed according to the number of nodes on the third layer subordinate to each node, and these were made the centers of the ellipses of the third layer. However, it is not necessary to divide them according to the length of the arc, but rather dividing them by a central angle is satisfactory. In constructing each ellipse of the third layer (step S 1112), the previously decided points are each made a center, and the ellipses are constructed with a size found based on the ratios calculated in the determination of the ellipse ratios (step S 1103). However, depending on the size of the ellipses, the distance from the center of the ellipses of the second layer can be changed. In the determination of the arrangement of the nodes of the third layer (step S 1113), starting with the point where the extension of the straight line connecting the centers of the ellipses of the second layer and each node of the second layer intersects each ellipse of the third layer, the circumference of the ellipses are partitioned into equal parts, and the nodes of the partition points excluding the starting point, are arranged. However, the manner of arrangement is arbitrary, and can be based on the arrangement relationships with other ellipses. In addition, in the case in which there are further subordinate layers, it can depend on the structure of the subordinate layers.

As explained above, according to the present invention shown in the first embodiment, a hierarchical structure is graphically displayed, and the when showing the vertical layer relationships between particular nodes, the nodes included in the same layer are arranged on the same ellipse, and in order to emphasize understanding the relationships between nodes of vertical layers for particular nodes, by arranging the lower ellipses on the outside of the higher ellipses so that the upper and lower layer ellipses do not overlap, it is possible to display on one screen in an easily viewed manner the vertical relationships of a large scale hierarchical structure constructed from a plurality of nodes, and by arranging nodes of the same layer elliptically, the advantage is obtained that it is possible to arrange nodes within a limited display area while preserving the regularity of the representation of the structure.

In addition, by changing the size of the ellipses according to the number of nodes arranged on the same ellipse, it is possible to make the extent of overlapping of ellipses of the same layer uniform. Furthermore, by changing the arrangement of nodes on the ellipses of the higher layers according to the arrangement of ellipses of the lower layers, the advantage is obtained that the positional relationships between the ellipses of the lower layers can arrange the nodes of the upper layers in a most appropriate position.

Second Embodiment

In this embodiment, the data display processing unit 30 uses data stored in the hierarchical structure data storage unit 20 to calculate for each layer the positions and sizes of the circles upon which the nodes are arranged, and further, using an equally partitioned angle, calculates for each layer the position on which the nodes on the circumference of the circle are arranged. It interchanges circles and triangles, for example, for the nodes and straight lines for the links which connect the nodes. In this way, the generated hierarchical structure figure is displayed on the display screen via the controller 50.

This present embodiment, as just described, relates in particular to the graphical display of a multi-layered structure which defines the ellipses as circles, calculates for each layer the position and size of the circles upon which the nodes will be arranged, and further, using an equally partitioned angle, calculates for each layer the position on which the nodes are arranged on the circumference of the circle.

Figure 26:
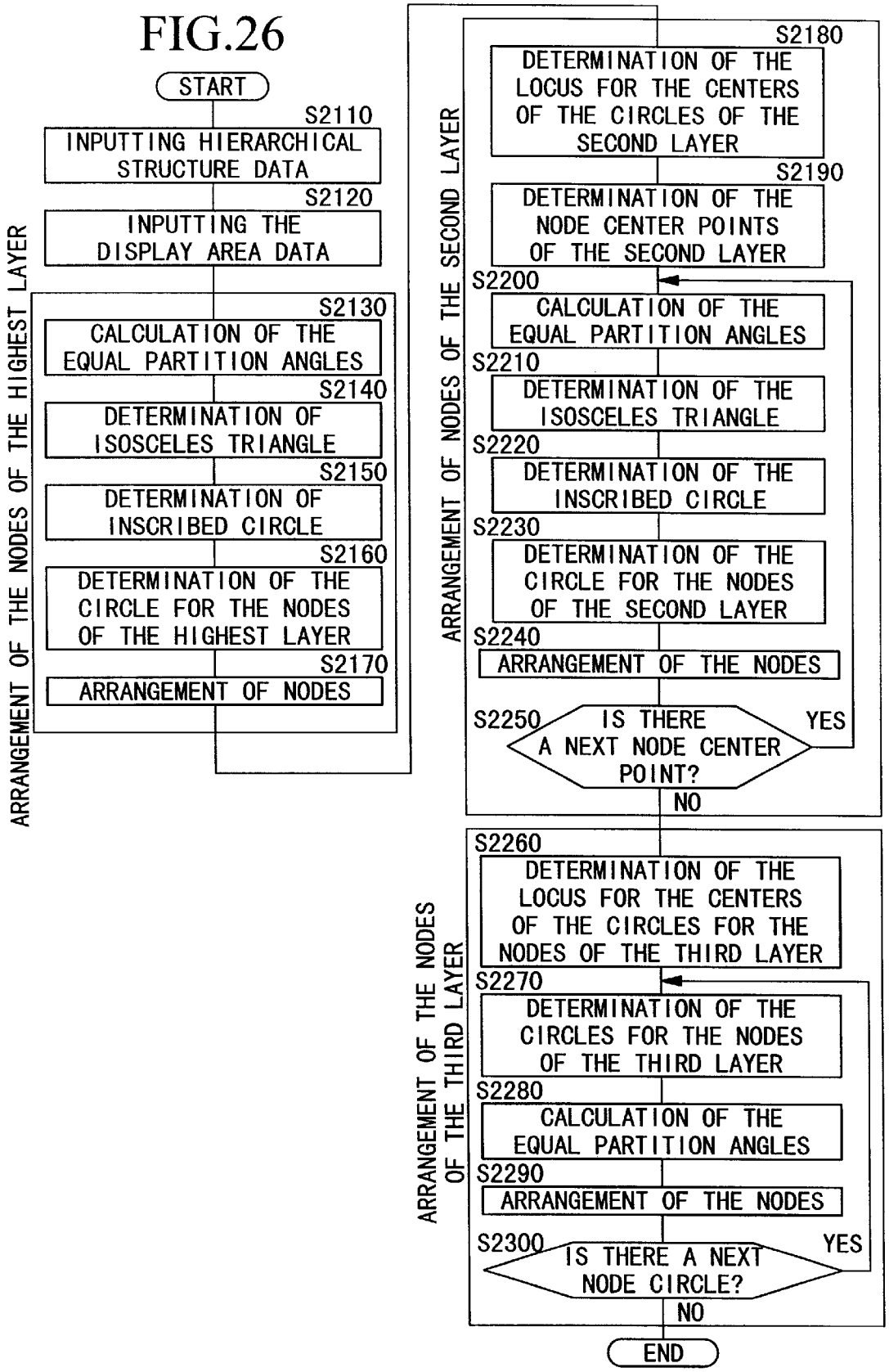
FIG. 26 is an example of the processing flowchart in the data processing unit in FIG. 1.

FIG. 26 is a flowchart showing an embodiment of the processing sequence in the data display processing unit 30. Here, based on FIG. 26, the display of a hierarchical structure image having a hierarchical structure with three layers will be explained.

Moreover, even when the reference numerals used in FIGS. 27 to 31 used in explaining the example of concrete processing of the present embodiment are the same as the reference numerals used in other figures, they only express identical items in the range of FIGS. 27 to 31, and have no relationship to identical reference numerals in other figures.

<Preprocessing:>

In order to construct the hierarchical structure image, data related to the hierarchical structure and data related to the display area of the display 40 which displays the hierarchical structure image are input from the hierarchical structure data storage unit 20 (steps S 2110, S 2120).

<Arranging nodes of the highest layer:>

Figure 27:
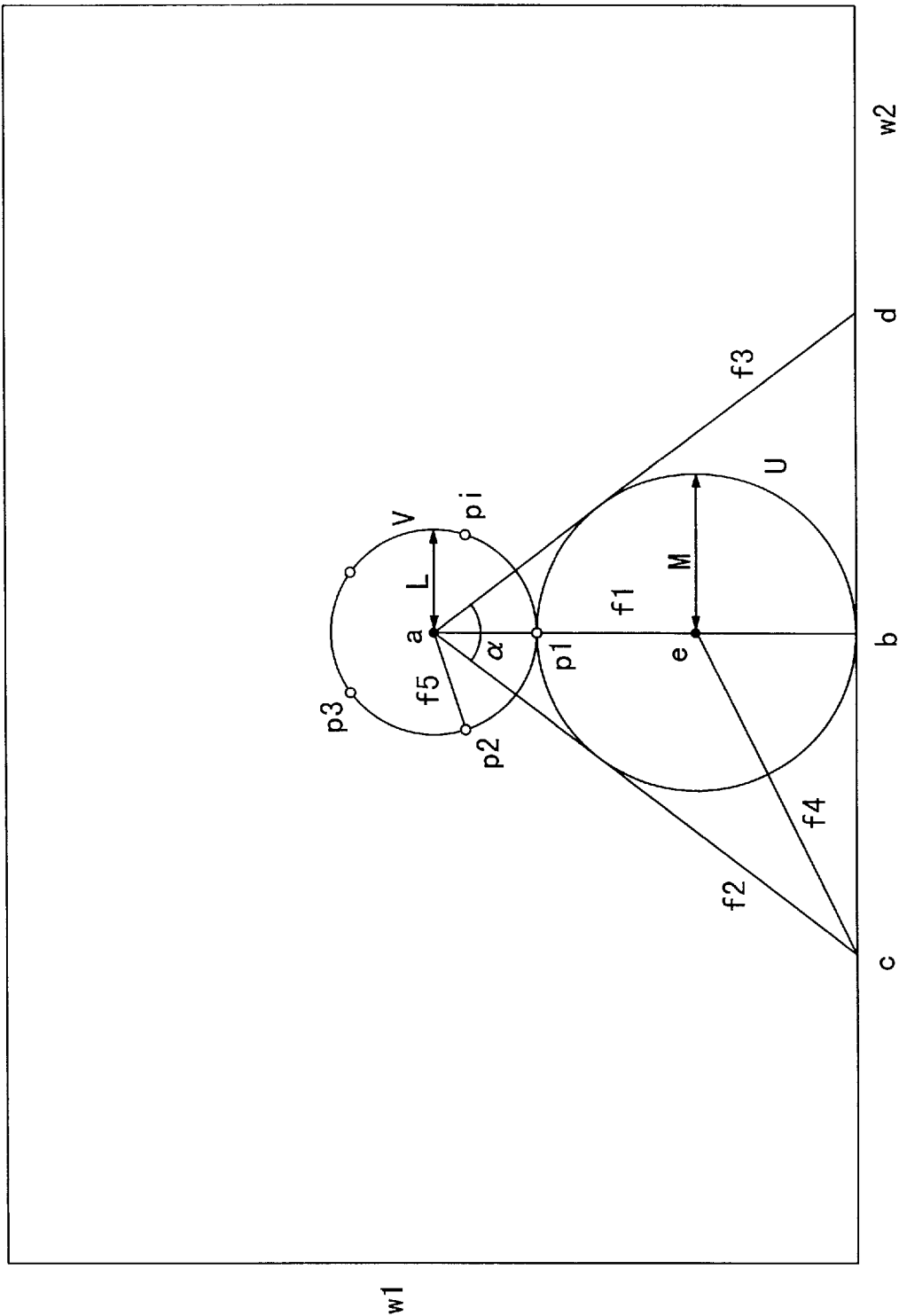
FIG. 27 is an explanatory drawing of the nodes in the highest layer in the second embodiment.

FIG. 27 is an explanatory drawing of the arrangement of nodes in the highest layer. Here, w1 and w2 are the edge of the ordinate and abscissa of the display area, and here, w1<w2. For the highest layer, first, the equipartition angle $\alpha$ is calculated as $\alpha=360°/i$ (i=number of nodes included in the highest layer; $i \geq 2$) (step S 2130). Next, in the manner shown in FIG. 27, from the center point a of the display area, a perpendicular line is dropped, its intersection with edge w2 made point b. From a, straight lines f2 and f3 are drawn so that f1 bisects the equipartition angle $\alpha$, the intersections with w2 are made c and d, determining the isosceles triangle $\Delta$ acd (step S 2140). Next, from c, the bisector f4 of $\angle$acd is drawn, and its intersection with f1 being e, with e as the center point, the circle of radius M inscribed in the triangle $\Delta$ acd is found, and the inscribed circle U is determined (step S 2150). Next, as the circle on which the nodes of the highest layer are arranged, with a as the center point, the circle V of radius L (L=0.5 w1−2M) is drawn (step S 2160). Using the equipartition angle $\alpha$, the nodes p1, p2, . . . pi (i is the number of nodes) included in the first layer are arranged equally spaced on the circumference of circle V (step S 2170). In this case, p1 is arranged on the intersection of f1 and the circumference of said circle V, and p2, for example, is arranged clockwise on the intersection with the circumference of straight line f1, drawn such that from $\alpha$, $\angle$f1·a·f5= $\alpha$, and in the same manner, p3, . . . , pi are arranged in sequence. Moreover, when the number of nodes of the highest layer is 1, the node can be arranged at the central point a of the display area.

<Arrangement of nodes of the second layer:>

Figure 28:
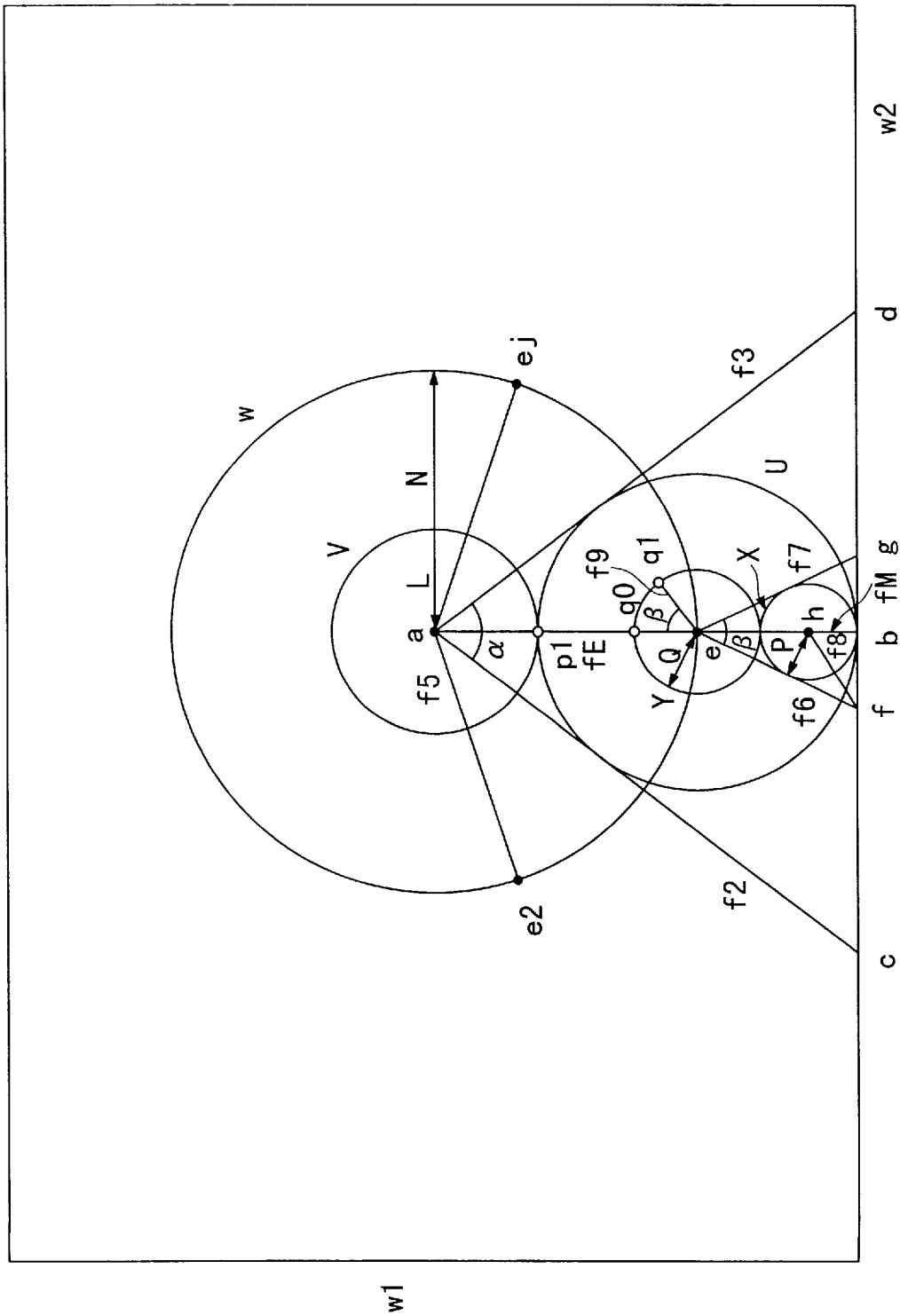
FIG. 28 is an explanatory drawing of the arrangement of nodes in the second layer in the second embodiment.

FIG. 28 is an explanatory diagram of the arrangement of nodes in the second layer. In the manner shown in FIG. 28, first, as a central circle for arrangement of the group of central points for the nodes of the second layer, a is the center point, and the circle W with radius N=L+M (that is, the length of a straight line connecting a and e) is drawn (step S 2180). Next, the point C found in step S 2150 is made the first center point of the group of center points of the nodes of the second layer, and below, finding the intersections e2 of f5 and circle W, they are made the second central point. In the same manner, center points e3, . . . , ej are found (step S 2190).

Next, paying attention to center point e, from the number of nodes of the second layer subordinate to p1, the bisecting angle $\beta$ is calculated as $\beta=360°/m+1$ (m is the number of nodes included in the second layer subordinate to p1; $m \geq 2$) (step S 2200). Next, straight lines f6 and f7 are drawn such that the perpendicular line fM dropped from e to w2 forms the bisector of equipartition angle $\beta$, and with f and g being their respective intersections with w2, the isosceles triangle $\Delta$ efg is found (step S 2210). Next, the bisector f8 of angle $\angle$ efg is drawn from f, and h being the intersection with fM, a circle is found with radius P inscribed in triangle $\Delta$ efg, with h is the center point, and the inscribed circle X is found (step S 2220). Next, as a circle for arranging nodes, a circle Y of radius Q (Q=M−2P) with center point e is drawn (step S 22230). And using the equipartition angle $\beta$, on the circumference of circle Y, nodes q1, q2, . . . , qm (m being the number of nodes) included in the second layer subordinate to p1 are arranged equally spaced (step S 2240). Here, q0 is the intersection of straight line fE connecting a and e and the circle Y. This q0 becomes the locus for the link connecting the highest node p1 and the nodes of the relevant second layer, so this q0 has no nodes arranged on it, and clockwise from e straight line f9 is drawn so that ∠fE·e·f9= β, and q1 is arranged on the intersection with the circumference. In the same manner, q2, . . . , qm are arranged. Moreover, when there is one node, it can be arranged on the above mentioned center point e.

Below, for each center point e2, e3, . . . , ej of the nodes of the second layer, the operations from steps S 2200 to S 2240 are repeated, and all the nodes included in the second layer are arranged (step S 2250).

<Arrangement of the nodes of the third layer:>

Figure 29:
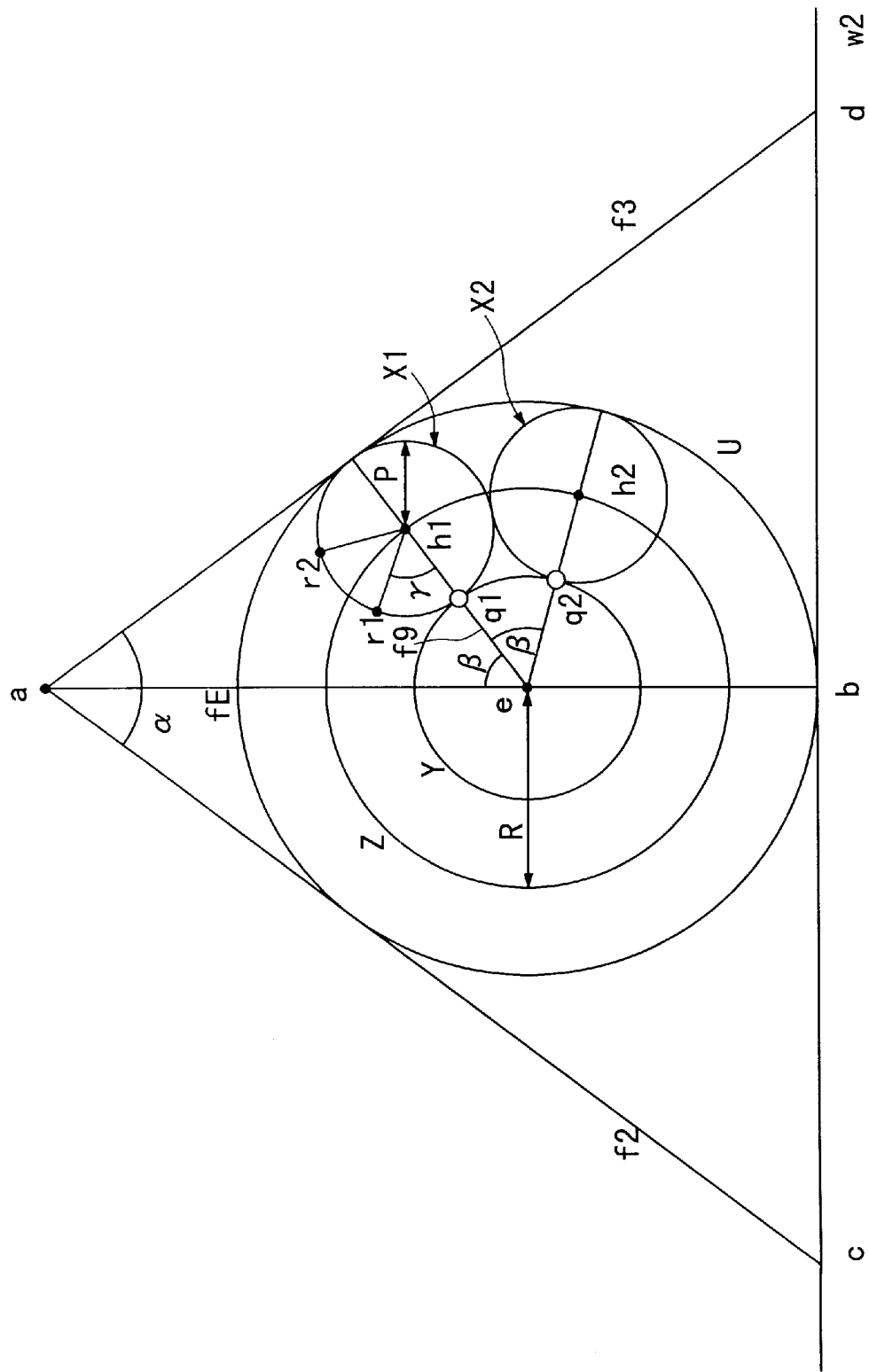
FIG. 29 is an explanatory drawing of the arrangement of nodes in the third layer in the second embodiment.

FIG. 29 is an explanatory figure for the arrangement of nodes on the third layer. Here, for the sake of convenience, we will explain the placement of the nodes of the third layer subordinate to p1 of the highest layer As shown in FIG. 29, first, as a central circle for arranging the group of center points for the nodes of the third layer subordinate to p1, e being the center point, circle Z of radius R (R=P+Q) is drawn (step S 2260). Next, as a center point for the nodes of the third layer subordinate to node q1 of the second layer, h1 being the intersection between f9 and circle Z, a circle X1 having a radius P and said h1 being the center point is drawn (step S 2270). Next, from the number of nodes, the equipartition angle γ is calculated as γ=360°/n+1 (n being the number of nodes included in the third layer subordinate to q1; n≧2) (step S 2280). And the nodes r1, r2, . . . , rn included in the third layer subordinate to q1 are arranged equally spaced on the circumference of circle X1 (step 2290). Here, r1 is arranged clockwise from h1 on the circumference of circle X1 such that ∠e·h1·r1=γ. In the same way, r2, . . . , rn are arranged in sequence. Moreover, when the number of nodes is 1, it can be arranged on the above-mentioned center point h1.

In the same manner, intersection points h1, . . . , hm with circle Z in relation to q2, . . . , qm are found, circles X2, . . . , Xm are drawn, the operations of steps S 2280 and S 2290 are repeated, and the nodes included on layer three subordinate to q2, . . . , qm are arranged on the circumference of circles X2, . . . , Xm (step S 2230).

The flowchart for FIG. 26 has been omitted, but when the multi-structure figure constructed in this manner is displayed on the display 40, based on the input hierarchical structure data, nodes can be displayed as connected with, for example, straight lines.

Figure 30:
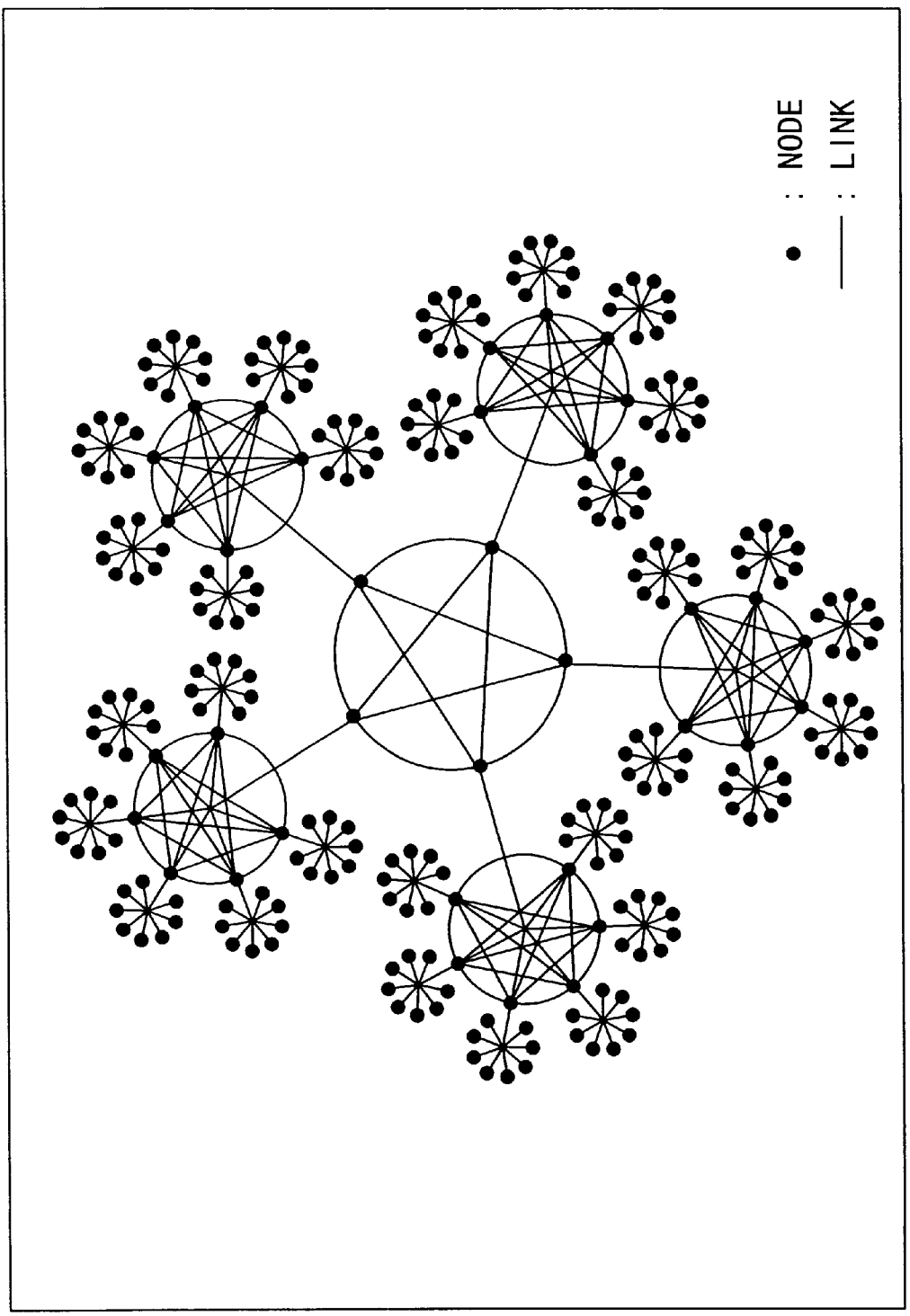
FIG. 30 is a display example in the second embodiment.

FIG. 30 is a display example when the present embodiment is applied to a three layer structure. The number of nodes of the highest layer is 5, the second layer is 30, and the third layer is 260, but the space between nodes and links is sufficiently guaranteed.

Figure 31:
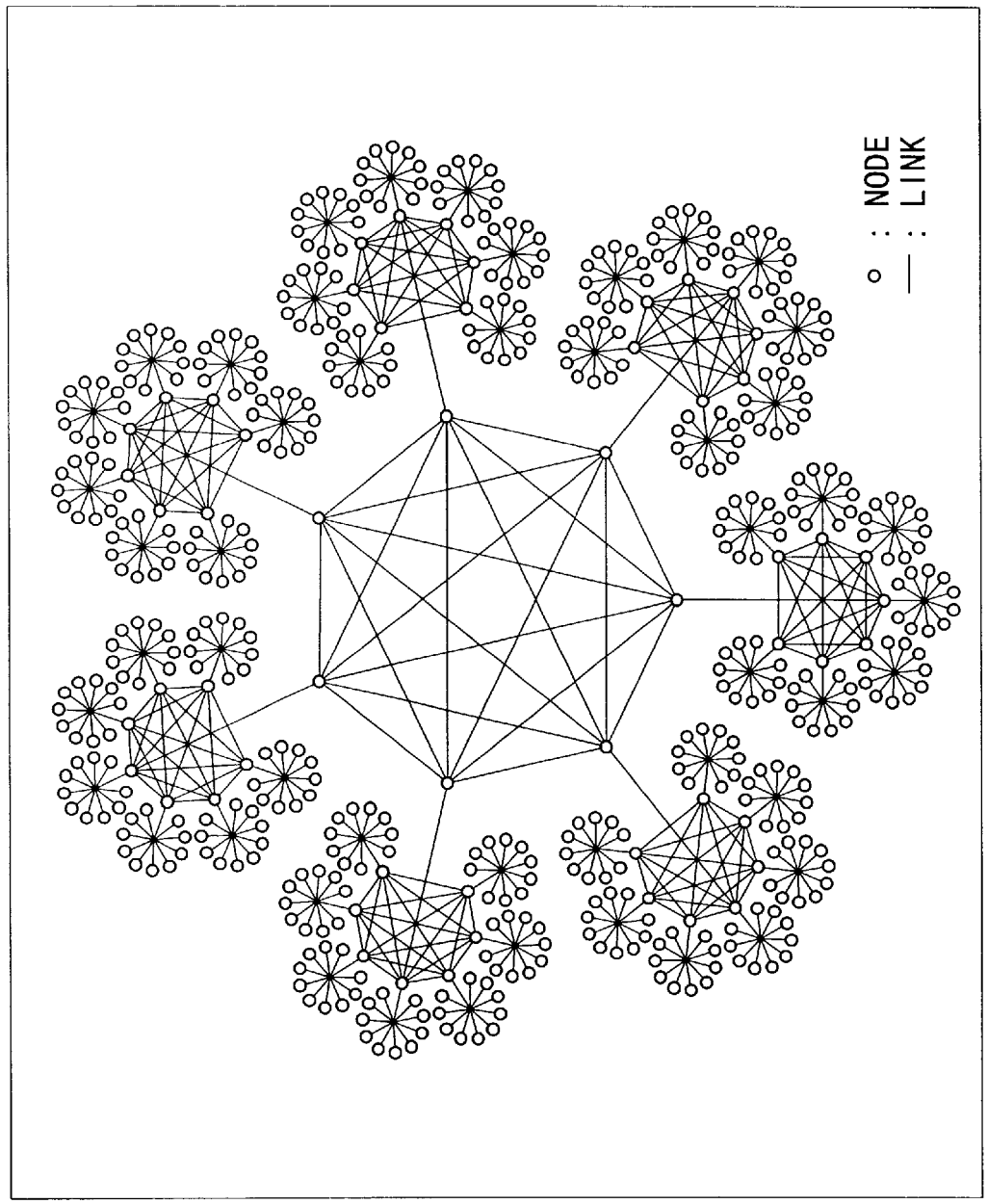
FIG. 31 is another display example in the second embodiment.

FIG. 31 is an example of the application of another data display processing unit of the present embodiment, and in the three layer structure, the number of nodes of the highest layer is 7, the second layer is 49, and the third layer is 490, but the space between nodes and links is sufficiently guaranteed.

As explained above, according to the invention of the second embodiment, when the hierarchical structure is displayed graphically, for the nodes included in the highest layer using the center point of the display area of the display, on the circumference of a drawn circle, using a equipartition angle calculated from the number of nodes included in the respective layer, the nodes are arranged equally spaced, and the nodes of the second layer and below are arranged on the circumference of circles whose size is calculated so that the size as a function of the layers and the number will be the maximum covering the entire peripheral area of the display area outside the center on which the highest nodes are arranged. In this way, even in a very large scale hierarchical structure whose number of nodes reaches from hundreds to about a thousand, the space between the nodes and links is wide and easy to view, and the nodes and links can be easily manipulated by direct command on the screen. This is advantageous.

The Third Embodiment

The data display processing unit 30 in the present embodiment uses data stored in the hierarchical structure data storage unit 20 to calculate the position and size of the circles of each layer upon which nodes will be arranged, replaces the nodes with, for example, circles or triangles, links with straight lines, and via controller 50, displays on display 40 the hierarchical structure image generated in this manner.

Below, the graphical display of the hierarchical structure in the third embodiment will be concretely explained.

The present embodiment repeats the display processing of nodes of the highest layer and the display processing of the nodes of the lower layers in the same processing sequence, but in particular, this embodiment calculates the size of the node arrangement circles and the arrangement of the nodes based on "the number of nodes of the lower layers."

Figure 32:
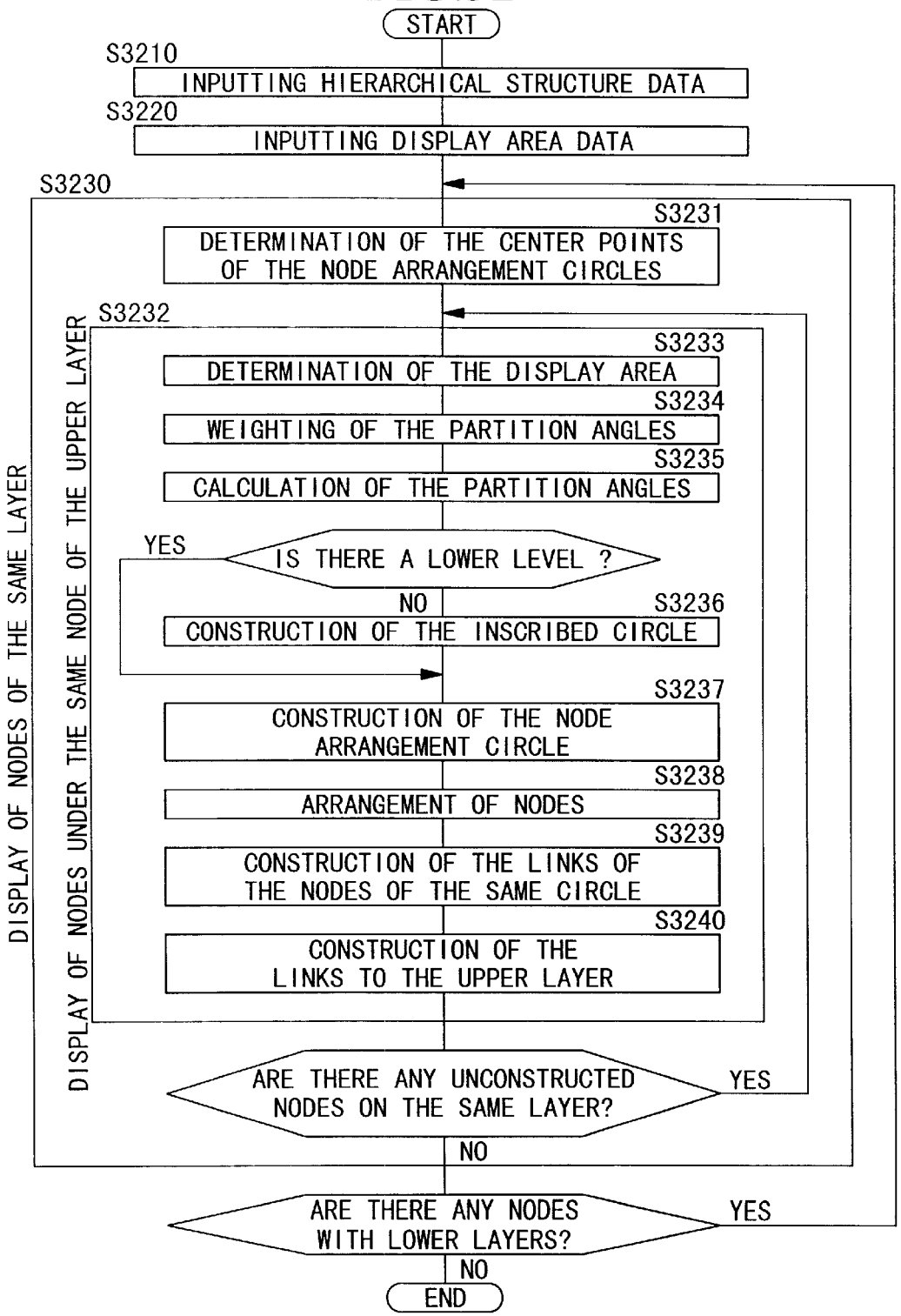
FIG. 32 is an example of a processing flowchart in the data display processing unit of FIG. 1 in the third embodiment.

FIG. 32 is an example of a flowchart expressing the processing sequence of the present example in the data display processing unit 30 of FIG. 1. The display processing S 3230 of the nodes of the same layer is roughly divided into the determination processing S 3231 of the center circle of the node arrangement circle and the display processing S 3232 of the nodes included in the same layer. Here, the display processing S 3232 repeats only for the number of nodes of the upper layer, and further, the determination processing S 3231 of the center point of the node arrangement circles and the display processing S 3232 of the nodes included in the same relevant upper layer repeats only for a certain number of nodes of the lower layers.

In display processing S 3230 of the same layer, in the determination of the center point of the node arrangement circle S 3231, a circle whose radius is the distance from the center point of the upper layer node arrangement circle to the center of the inscribed circle constructed when the upper layer node arrangement circle was generated, and the point at which the extension of a straight line from the center point of the upper layer node arranging circle connecting each node of the upper layer intersects the circle is set as the center point of the circle on which the nodes included in each of the upper layers is set. However, the center point of the node arrangement circle of the highest layer is the center of the display area.

In the display processing S 3232 of the nodes included in the same upper layer, at the ID determination of the display area S 3233, the point chosen with the determination of the center point of the node arrangement circle S 3231 being the center, an inscribed circle in the extended lines of the partition angle of the upper layer nodes is generated, and the display area is within this inscribed circle. However, the display area of the highest layer is the entire area input with the input of the display area data S 3220. In weighting the partition angle S 3234, weighting is carried out depending on the number of nodes in the lowest layers. At this time, except for the highest layer, as a link display space from the highest layer nodes, a fictitious node n0 is added as the first node. When there are no lower layers, the partition angle is equally divided. In the calculation of the partition angles, except for the lowest layers, the largest value of the partition angle is (90=a/2)° for the partition angle a of the nodes of the upper layers. In the construction of the inscribed circle S 3236, an inscribed circle was generated for the area in the display area divided by the largest partition angle calculated in the calculation of the partition angle S 3235. However, in the case of the lowest layer, the generation of the inscribed circle S 3236 was skipped. In the construction of the arrangement circle of the nodes S 3237, a circle whose radius is the distance from the center point of the node arrangement circle to the point of contact with the inscribed circle is constructed. However, in the lowest layer, the circle of the display area found in the determination of the display area S 3233 is the node arrangement circle. In the arrangement of nodes S 3238, the nodes are arranged on points where the bisector of the partition angle of each node intersects the node arrangement circle. In constructing the links for the nodes of the same circle S 3239, links connecting nodes with straight lines are constructed. In the creation of the links of the highest layer S 3240, a base point is provided at a position not overlapping links already constructed on the straight line to the center point of the circle of the layer concerned from the center point of the circle of the upper layer, and the base point and each node are connected with straight lines.

Below, an example of the operation of the present embodiment will be explained. In the present embodiment as well, the hierarchical structure of the display object is the structure shown in FIG. 44. Further, nodes on the same layer included under the same upper layer node all have a connection relation, except with those of the lowest layer. The specific processing is shown in FIGS. 33 to 42.

Moreover, in the explanation of the example of operation of the present embodiment, even if the reference numerals used in FIG. 44 and FIGS. 33 to 42 are the same as reference numerals used in other figures, within the range of FIG. 44 and FIGS. 33 to 42, the same reference numerals indicate the same item and have no relation to identical reference numerals in the other figures.

Figure 44:
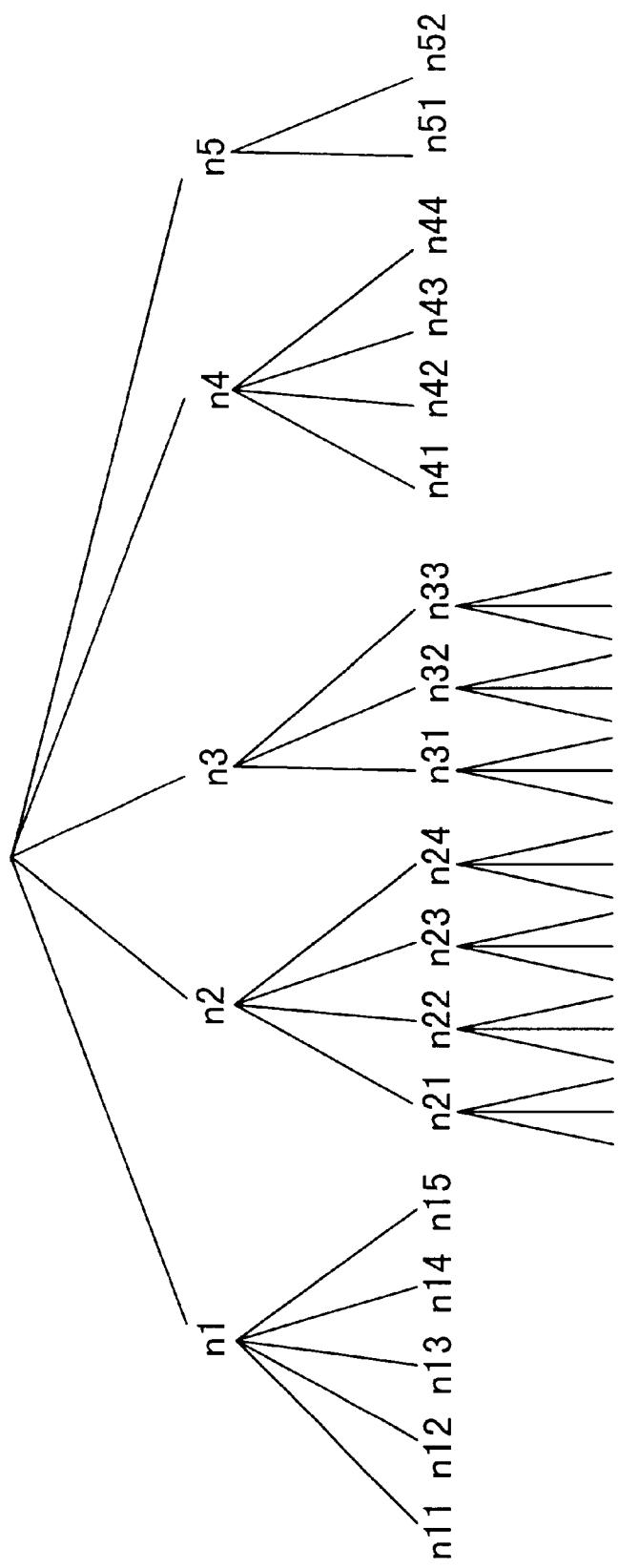
FIG. 44 is a specific example showing with a tree display the data of a hierarchical structure stored in the hierarchical structure data storage unit of FIG. 1.

First, in order to make the hierarchical structure image, the hierarchical structure data of a structure such as that shown in FIG. 44 and the data related to the display area of the display which displays the multi-layer image are input (steps S 3210 and S 3220).

Figure 33:
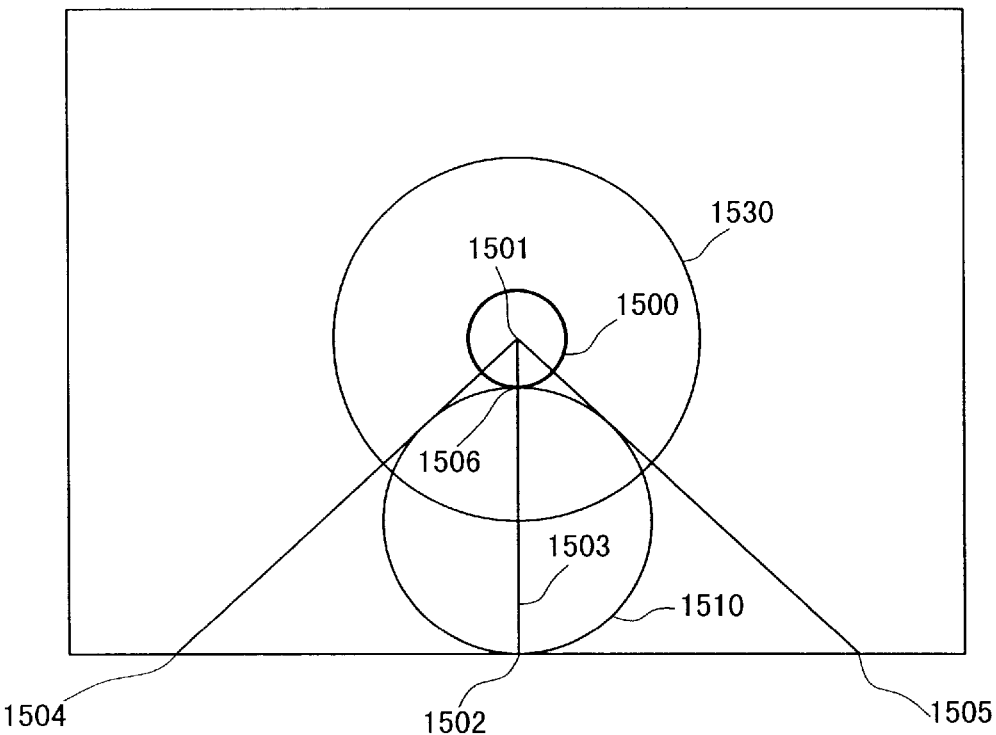
FIG. 33 is an explanatory drawing of the display processing for the highest nodes in the third embodiment.
Figure 34:
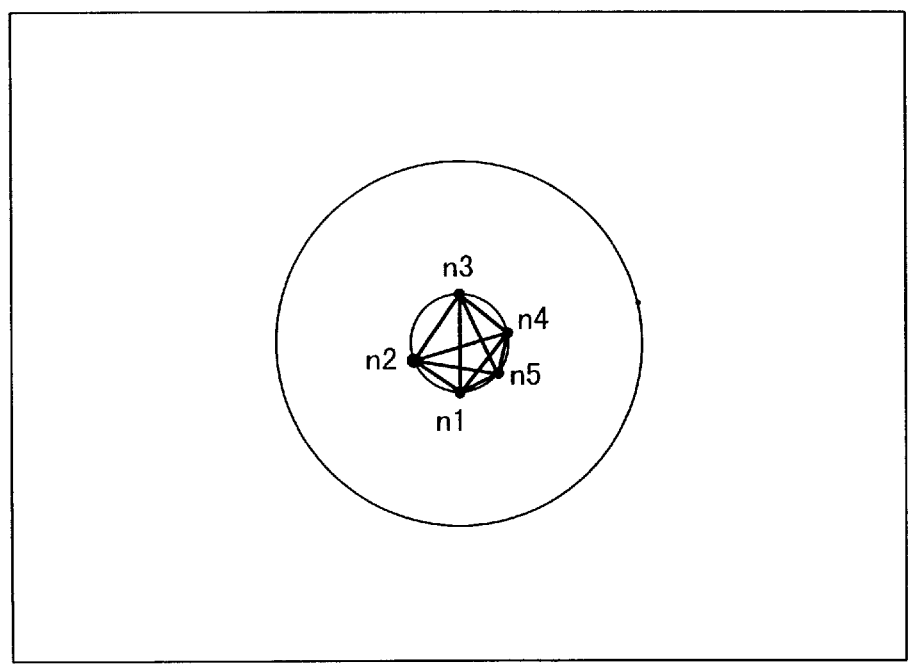
FIG. 34 is a figure showing the continuation of FIG. 33.

Next, first the display processing S 3230 of nodes n1~n5 of the highest layer is carried out. FIG. 33 and FIG. 34 are figures showing the processing at this time.

In relation to the highest layer, the center point 1501 of the node arrangement circle is chosen to be the center of the display area (step S 3231). Subsequently, the processing S 3232 below is carried out. The entire area input with the input of the display area data S 3220 is the display area for the highest layer (step S 3233). From the number of nodes in the lowest layer of each node, the partition angle for each node is weighted (step S 3234): in this example, 5, 8, 9, 4, and 4. Because the largest among these is 9, the largest partition angle is calculated to be 360°×(9/(5+8+9+4+4))= 108° (step S 3235). Because the layer concerned here is not the lowest layer, an area (in FIG. 33, the areas surrounded by 1501, 1504, 1505) demarcated by the 108° angle and whose bisector is the shortest straight line 1503 from the center point 1501 of the circle to the border of the display area 1502 is constructed, and the inscribed circle 1510 of this area is constructed (step S 3236). A circle 1500 whose radius is from the center point 1501 of the display area to the point 1506 at which the above constructed inscribed circle 1510 intersects the shortest straight line 1503 between the center point of the circle and the border of the display area is constructed as the node arrangement circle (step S 3237) According to the weighted partition angle, the node arrangement circle 1500 is partitioned into 60°, 96°, 108°, 48°, and 48°, and the nodes n1~n5 are arranged on the intersections of the bisector of each angle and the circle circumference (step S 3238). These nodes n1~n5 are connected with straight lines, and as shown in FIG. 34, links are constructed (step S 3239).

Because there is no highest layer with respect to the layer concerned, the node display processing with respect to the relevant highest layer ends, and next moves to the node display processing S 3230 of the second layer.

Figure 35:
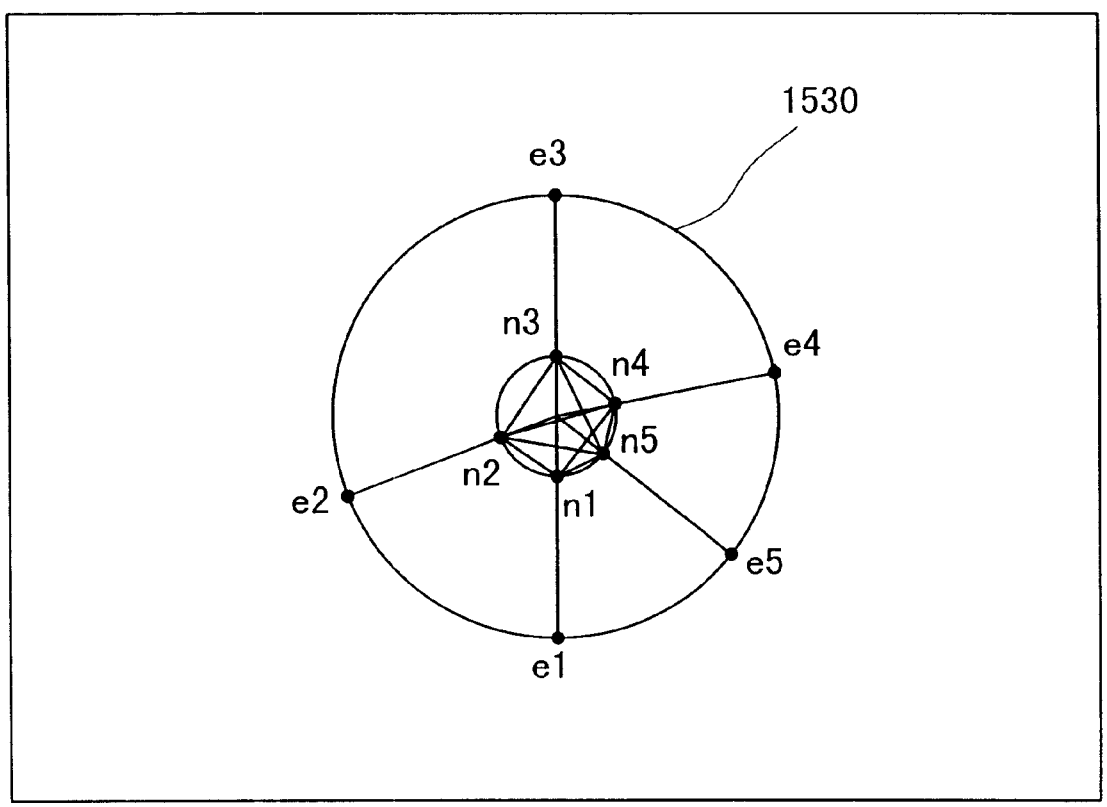
FIG. 35 is an explanatory drawing of the determination the central points of the node arrangement circle of the display processing of the second layer nodes in the third embodiment.

First, for nodes n11~n54 of the second layer under the nodes n1~n5 of the highest layer, a circle (shown as 1530 in FIG. 33) is constructed whose radius is the distance from the center point of the node arrangement circle of the highest layer to the center of the inscribed circle constructed when finding the node arrangement circle of the highest layer, and as shown in FIG. 35, the points where the extensions of straight lines from the center point of the highest layer node arrangement circle connecting each node of the highest layer intersect with the circle are e1~e5, and the center points of circles on which nodes are arranged under each of the higher layer nodes are determined (step S 3231).

Figure 36:
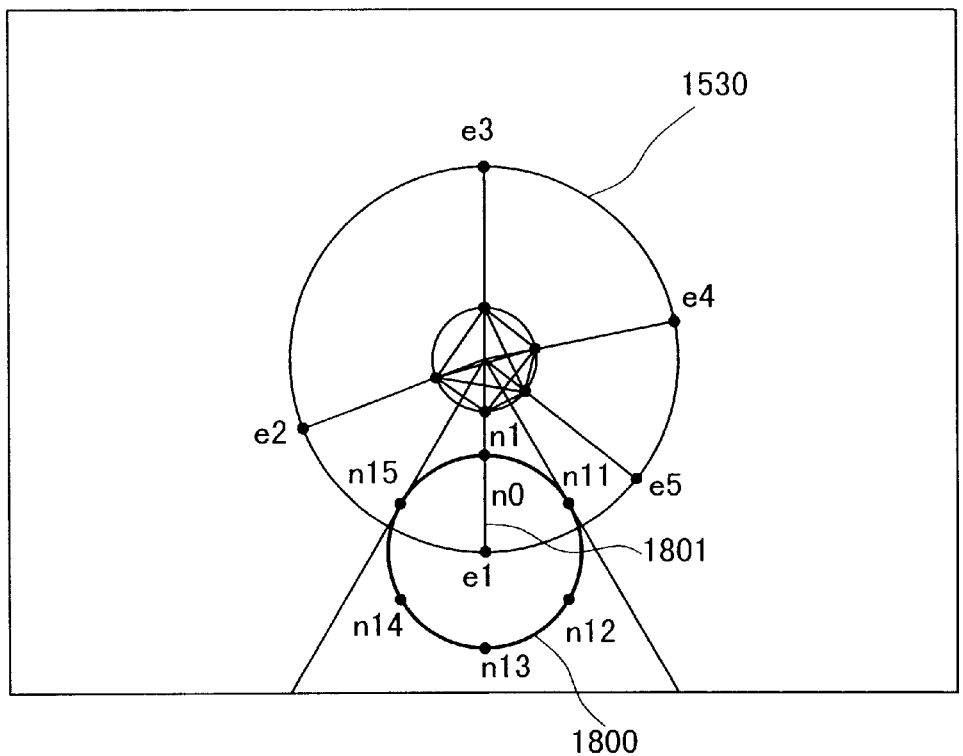
FIG. 36 is an explanatory drawing of the display processing of second layer nodes using one central point of the node arrangement circle of FIG. 35.
Figure 37:
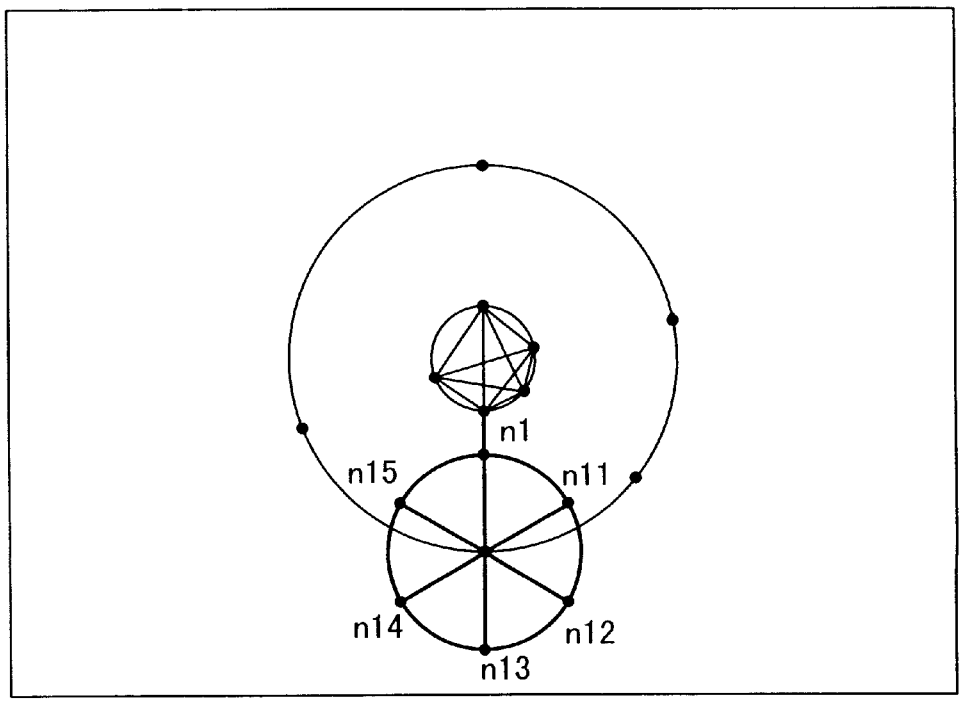
FIG. 37 is a figure showing a continuation of FIG. 36.

Next, first, for nodes n11~n15 of the second layer under node n1 display processing S 3232 is carried out. FIG. 36 and FIG. 37 are figures showing the processing at this step. First, the inscribed circle 1800, whose center is e1 and between the extensions of the partition angle of node n1, is the display area of the relevant node (step S 3233). Because nodes n11~n15 have no lower layers, the fictitious node n0 is added to the 5 said nodes, and the partition angle is equally divided into 6 parts (step S3234). Thus, each partition angle is 360°/(5+1)=60° (step S3235). Because nodes n11~n15 are lowest layers, the circle 1800 of the display area found in determining the display area S 3233 is made the node arrangement circle (step S 3237). Said node arrangement circle 1800 is equally divided by 60°, and as shown in FIG. 36, the nodes n0 and n11~n15 are arranged on the intersections of each bisector and the circumference (step S 3238). Because nodes n11~n15 have no connection relationship with nodes in the same layer at the lowest layer, step S 3239 is omitted, and as the link with the node n1, a base point (here, e1) is provided at a position not overlapping already constructed links on the straight line 1801 from the center point of the circle of the highest layer to the center point of the circle of the layer concerned, and as shown in FIG. 37, the base point and each node are connected by straight lines (step S 3240).

Figure 38:
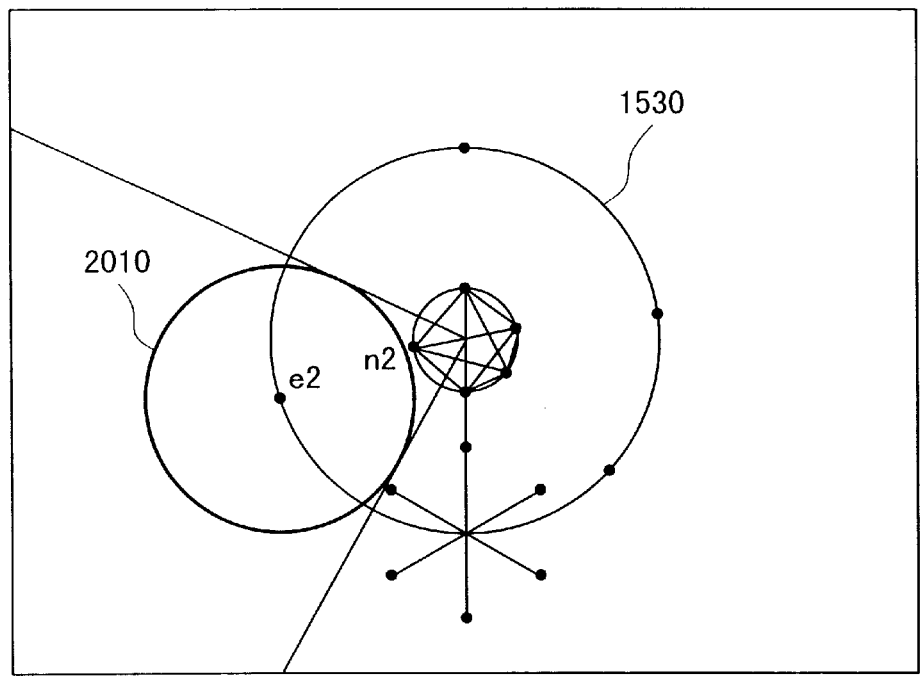
FIG. 38 is an explanatory drawing of the display processing of the second layer nodes using different central point in the node arrangement circle of FIG. 35.
Figure 39:
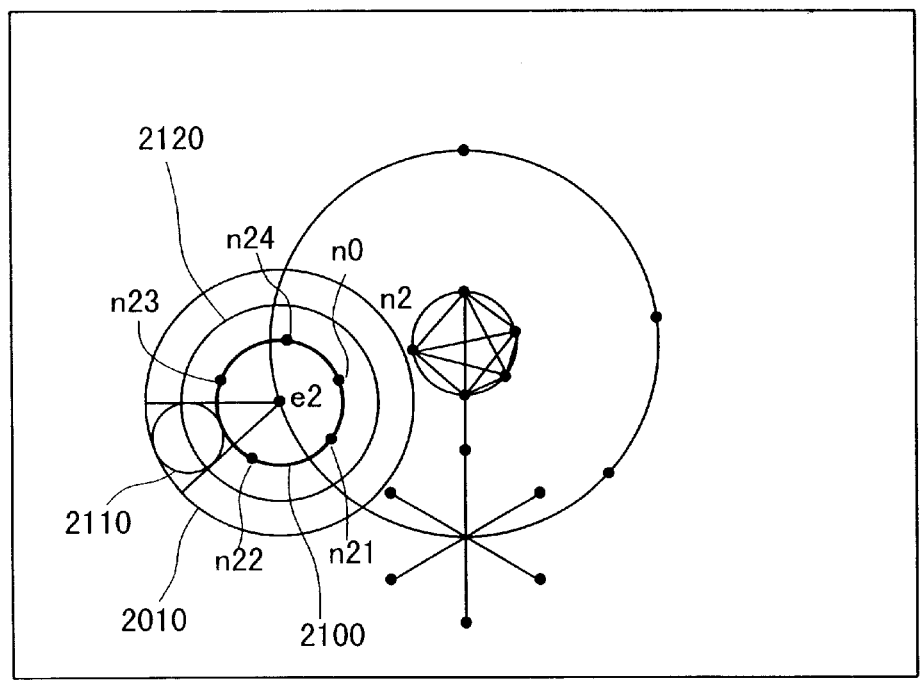
FIG. 39 is a continuation of FIG. 38.
Figure 40:
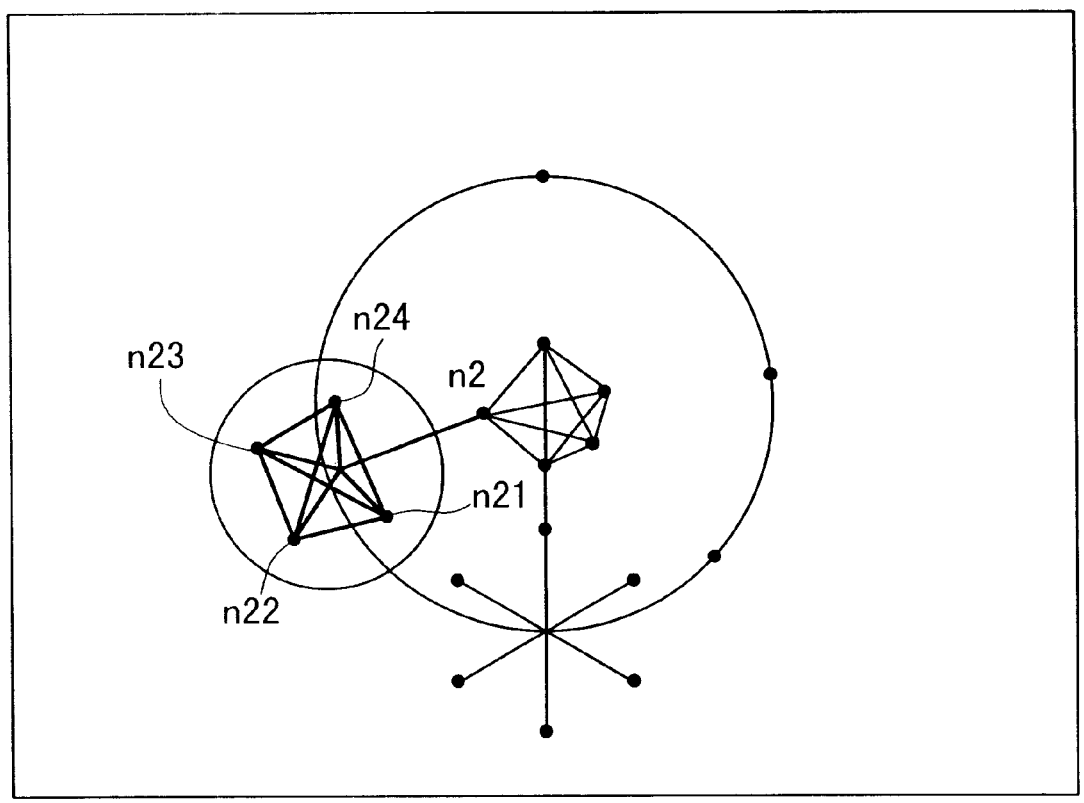
FIG. 40 is a continuation of FIG. 39.

Next, the display processing S 3232 for the nodes n21~n24 on the second layer under node n2 is carried out. FIGS. 38 to 40 are figures showing the processing at this step. First, as the inscribed circle, whose center is e2 and between the extensions of the partition angle of node n2, the circle shown in FIG. 38 is made the display area of this node (step S 3233). Because for nodes n21~n24 there are lower layers, the fictitious node n0 is added as a first node, and from the number of nodes of the lowest layer the partition angle of each node is weighted as 1, 2, 2, 2, and 2 (step S 3234). Because the largest is 2, the largest partition angle is calculated as 360°×(2/(1+2+2+2+2))=80° (step S 3235). Because nodes n21~n29 are not the lowest layer, an area demarcated by the 80° angle and whose bisector is the shortest straight line from the center point e2 of the circle 2010 to the border of the display area is constructed, and the inscribed circle 2110 of this area is constructed (step S 3236). A circle 2100 as shown in FIG. 39 whose radius is the distance from point e2 to the constructed inscribed circle is made the node arrangement circle (step 3237). According to the weighted partition angle, the node arrangement circle 2100 is partitioned into 40°, 80°, 80°, 80°, and 80°, and the nodes n0 and n21~n24 are arranged in order on the intersections of the bisector of each angle and the circle circumference (step S 3238). These nodes n0 and n21~n24 are connected with a straight line, and links are constructed (step S 3239). Furthermore, as the link with the node n2, a base point is provided at a position not overlapping already constructed links on the straight line from the center point of the circle of the highest layer to the center point of the circle of the layer concerned, and as shown in FIG. 40, the base point and each node are connected by straight lines (step S 3240).

The display processing S 3232 for nodes n31~n33 of the second layer under node n3, nodes n41~n44 under the second layer under node n4, and nodes n51~n54 under the second layer under node n5, is carried out in the same manner.

Figure 41:
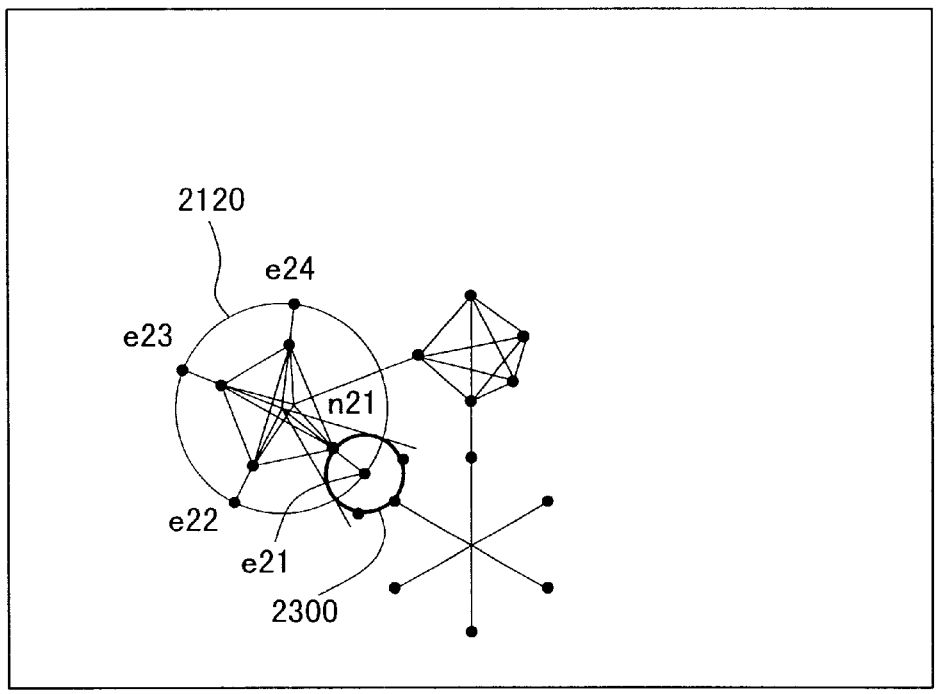
FIG. 41 is an explanatory drawing of the data processing of the third layer nodes in the third embodiment.
Figure 42:
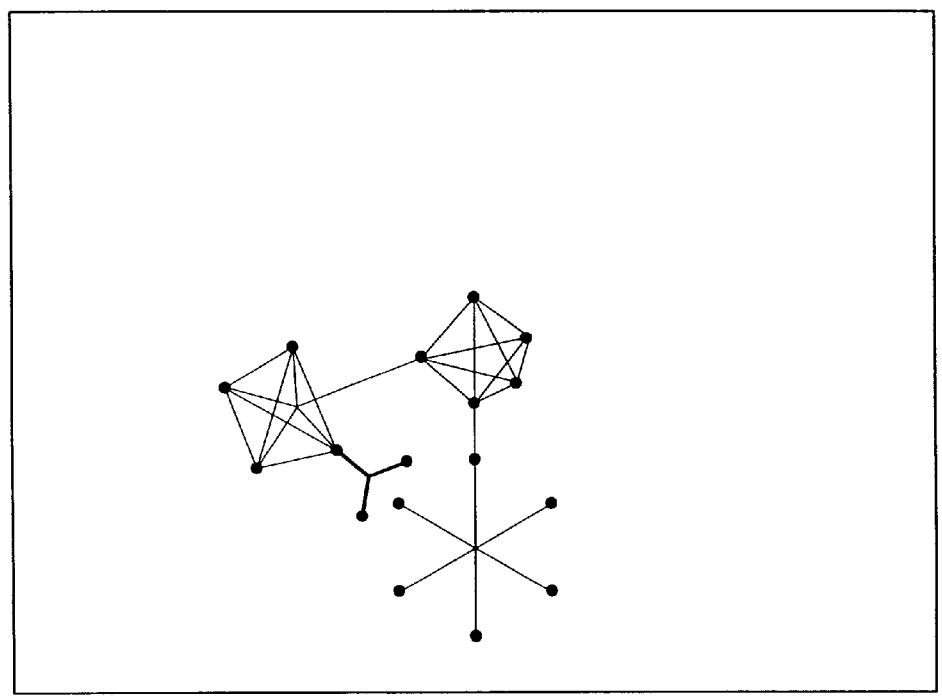
FIG. 42 is a continuation of FIG. 41.

Next, the node display processing S 3230 moves to the third layer. First, the display processing S 3230 is carried out for the nodes of the third layer under nodes n21~n24. FIGS. 41 and 42 are figures showing a part of the display processing at this step.

For the nodes of the third layer under nodes n21~n24, first, a circle is constructed whose radius is the distance from the center point e2 of the upper layer node arrangement circle (2100 is FIG. 39) to the center of the inscribed circle (2110 in FIG. 39) constructed when finding the node arrangement circle of said upper layer, and as shown in FIG. 41, the points where the extension of the straight lines connecting each node of the upper layer from point e2 intersect the circle are each made e21~e24, and the center points of the circle on which the nodes under each upper layer node are arranged, are determined (step S 3231).

Next, first, the display processing S 3232 for the nodes of the third layer under the node n21 is carried out. First, the inscribed circle 2300, whose center is e11 and between the extensions of the partition angle of node n21, is made the display area of the relevant node (step S 3233). Because there are no lower layers, a fictitious node n0 is added to the two nodes, and the partition angle is equally divided (step S 3234). Therefore, each partition angle is 360°/(2+1)=120° (step S 3235). Because the layer concerned is the lowest layer, the circle 2300 of the display area found in determining the display area S 3233 is made the node arrangement circle (step S 3237). The node arrangement circle 2300 is equally divided by 120°, and the nodes are arranged on the intersections of the bisector of each angle with the circumference (step S 3238). Because the layer concerned is the lowest layer and has no connection relation with the nodes of the same layer, processing S 3239 is omitted, and as the link with the node n21, a base point is provided at a position not overlapping already constructed links on the straight line from the center point of the circle of the highest layer to the center point of the circle of the layer concerned, and as shown in FIG. 42, the base point and each node are connected by straight lines (step S 3240).

For the nodes of the third layer under nodes n22~n24 as well, display processing S 3232 is carried out in the same way. Furthermore, for the nodes of the third layer under nodes n31~n33, display processing S 3230 is carried out.

Here, in the display S 3232 of nodes under the same node of the higher layer, in determining the display area S 3233, an inscribed circle, whose center was chosen when determining the center point for the node arrangement circle S 3231 and between the extensions of the partition angle of the upper layer node, is constructed, and the interior of this inscribed circle is made the display area, but inside the extensions of the partition angle of the upper layer node can be made the entire display area as well. In weighting the partition angles S 3234, the weighting was done by the number of nodes in the lowest layer of each node, but the ratio of the weight is arbitrary. Also, not only the lowest layer, but weighting by the number of nodes of all the lower layers can be done as well. When there are no lower layers, the partition angle is divided equally, but besides equal division, it can be allocated according to the display area. In the calculation of the partition angle S 3235, except for the cases of the lowest layers, the largest value of the partition angle with respect to the partition angle a° of the upper layer node was (90+a/2)°, but the setting of the largest value is arbitrary. In the construction of the node arrangement circle S 3237, a circle whose center is the distance from the center point of the node arrangement circle to the contact with the inscribed circle is constructed, but a circle of smaller radius than this is also possible. In the lowest layer, the circle of the display area found in determining the display area S 3233 was made the node arrangement circle, but a circle of smaller radius than this is also possible. In constructing the link of the nodes on the same circle S 3239, the links were straight lines connecting the nodes, but the links of the nodes positioned adjacently on the circumference could also use arcs. In constructing the links between the layers S 3240, a base point is provided at a position not overlapping already constructed links on the straight line from the center point of the circle of the upper layer to the center point of the circle of the layer concerned, and the base point and each node is connected by straight lines, but the base point need not be on the straight line from the center point of the circle of the upper layer to the center point of the circle of the layer concerned.

Moreover, in the explanation of the above-described embodiment, in the hierarchical structure data of FIG. 1, data of the hierarchical structure such as that in FIG. 44 was stored, but the structure of the data stored is arbitrary. Also, there need be no connection relation between the nodes of the same layer under the same upper layer node.

As explained above, according to the invention shown in the third embodiment, when graphically displaying a hierarchical structure, using a circle constructed according to definite rules, the nodes included on the same layer are radially arranged, and further the nodes included in its lower layer are displayed arranged radially on a circle, and by arranging the nodes on the same circumference according to the number of nodes on the lower layer, for the nodes of large lower layers, the display area of the lower layer nodes can be broadened, achieving the advantage that even in a large scale hierarchical structure having hundreds to about a thousand layers of nodes or in structures in which the number of nodes is irregular, the space between nodes and links can be widened and displayed in a manner easily viewed, and the nodes and links can be easily manipulated by direct command on the screen.

Fourth Embodiment

The processing of the data display processing unit 30 in the present embodiment used data stored in the hierarchical structure data storage unit 20 to calculate the position and size of the circle of each layer for arranging nodes, and carries out exchanging nodes with, for example, circles or triangles and replacing links that connect nodes with lines. In this manner, the hierarchical structure image generated is displayed on display 40 via the controller 50.

Below, the graphical display of a hierarchical structure of the fourth embodiment will be concretely explained.

Moreover, the present embodiment arranges the nodes included in the highest layer on the circumference of a circle drawn centered on the center point of the display area of the display, and arranges the nodes of the second layer and below on the circle of the upper layers, but in particular, this embodiment calculates the size of these circles and the positions of the nodes based on the "number of lower layers."

Figure 43:
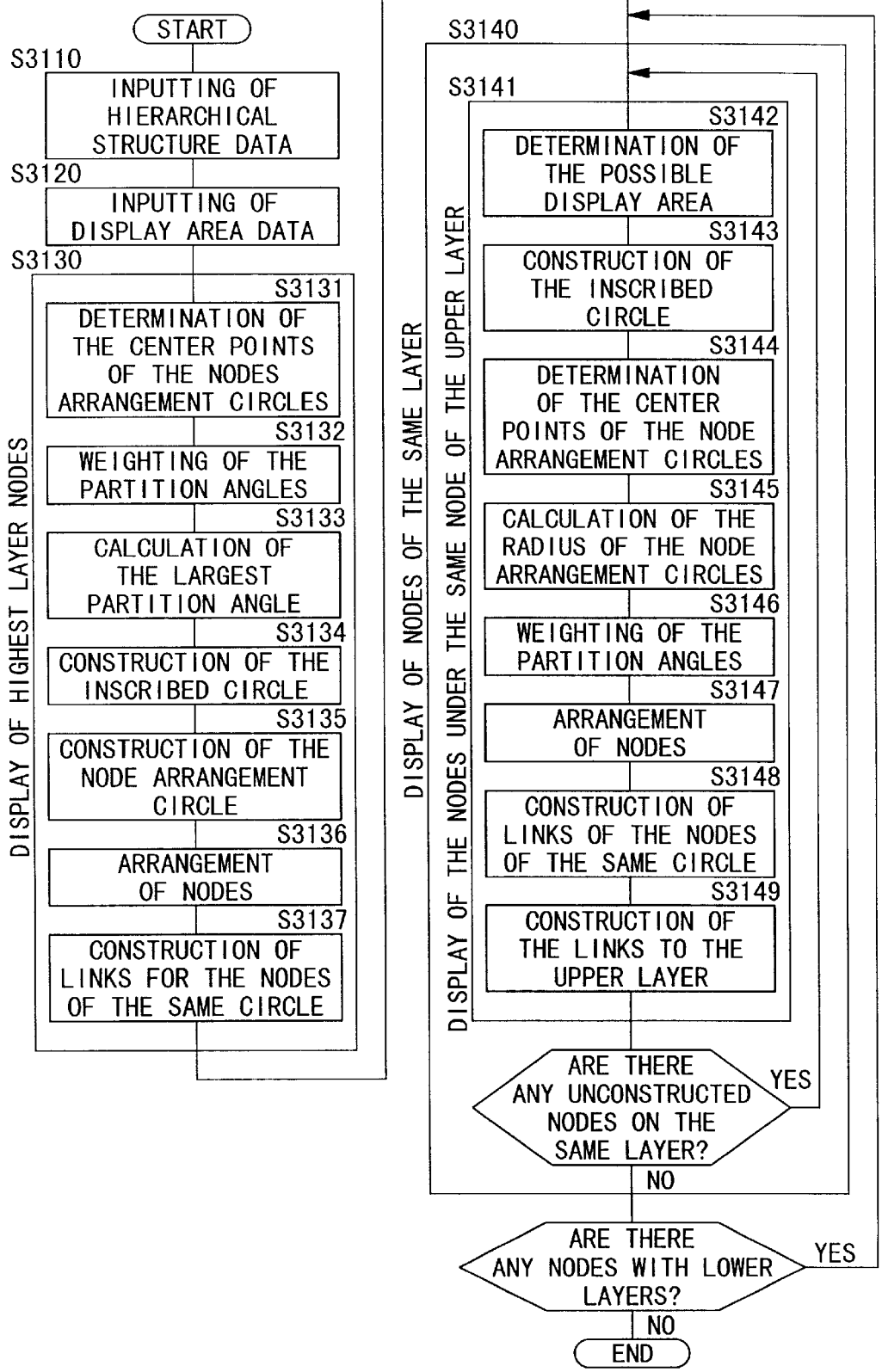
FIG. 43 is an example of a processing flowchart in the data processing unit of FIG. 1 in the fourth embodiment.

FIG. 43 is an example of a flowchart showing the processing sequence in the data display processing unit 30 of FIG. 1 in the present embodiment. In the display processing of the highest layer nodes S 3130, in determining the center point of the node arrangement circle S 3131, the central point of the node arrangement circle of the highest layer is made the center of the display area. In the weighting of the partition angles S 3132, the weighting is carried out according to the number of layers under each node. In the calculation of the largest partition angle S 3133, based on the weighting, the largest partition angle among the partition angles of each node is calculated. In constructing the inscribed circle S 3134, an inscribed circle is constructed on the shortest distance part from the center point of the node arrangement circle to the border of the display area with respect to the area divided by the largest calculated partition angle. In constructing the node arrangement circle S 3135, a circle, that is, the node arrangement circle, whose radius is the distance from the center point of the node arrangement circle to the point of contact with the inscribed circle, is constructed. In arranging the nodes S 3136, the nodes are arranged on the points where the bisector of the partition angle of each node intersects the node arrangement circle. In constructing the links for the nodes on the same circle S 3137, the links are constructed connecting the nodes with a straight line.

The display processing of the nodes of the same layer S 3140 repeats the display processing of the nodes under the same higher layer node S 3141 only by the number of upper layer nodes, and further, repeats it only for a certain number of nodes of the lower layers.

In the display processing of the same node of the higher layer S 3141, in determining the possible area of the display S 3142, the area enclosed by the extensions of the partition angle of the higher layer node and the inscribed circle used in constructing the upper layer node arrangement circle constructed is made the possible area of the display of the relevant node. However, the possible area of the display of the node arrangement circle of the second layer is the area enclosed by the extension of the partition angle of the highest layer node and the border of the display area. In constructing the inscribed circle S 3143, the largest inscribed circle with respect to the area chosen in the determination of the possible area of the display S 3142 is constructed. In the determination of the center point of the node arrangement circle S 3144, the center of the inscribed circle generated in the construction of the inscribed circle S 3143 is made the center point of the node arrangement circle. In the calculation of the radius of the node arrangement circle S 3145, when for at least one node among the nodes of the lower layer there is a further lower layer, it is set to ⅓ of the above inscribed circle, and when all the nodes of the lower layer are the lowest layer, or when the layer concerned is the lowest layer, it is set to ½ the radius of the above inscribed circle. In the weighting of the partition angles S 3146, the weighting is carried out by the number of lower layers of each node. At this time, as the link display space from the higher layer nodes, the fictitious node n0 is added as the first node. When there are no lower layers, the partition angle is equally divided. In the arrangement of the nodes S 3147, the straight line connecting the center point of the node arrangement circle and the center point of the upper node arrangement circle is made the bisector of the partition angle with respect to the first node (fictitious node n0) as base line, and the nodes are arranged on the points at which the bisector of the partition angle of each node intersects the node arrangement circle. In constructing the links for the nodes on the same circle S 3148, links are constructed with straight lines connecting the nodes. In constructing the links of the upper layer S 3149, a base point is provided at a position not overlapping already constructed links on the straight line from the center point of the circle of the upper layer to the center point of the circle of the layer concerned, the base point and each node are connected by straight lines.

Below, an example of the operation of the present embodiment will be explained. Moreover, even if the reference numerals in FIG. 44 to FIG. 52 used in the explanation of the example of the operation of the present embodiment and the reference numerals used in other figures are the same, the same reference numerals in the range of FIGS. 44 to 52 denote the same item, and have no connection with the same reference numerals of other figures.

In the example of operation below, the hierarchical structure of the display object is the structure shown in FIG. 44. Furthermore, except for the lowest layer, the nodes of the same layer under the same node of the upper layer all have connection relations. For the hierarchical structure in FIG. 44, the concrete processing of the present embodiment is shown in FIGS. 45 to 52.

First, in order to construct the hierarchical structure image, the hierarchical structure data of a structure such as that in FIG. 44 and the data related to the display area of the display displaying the hierarchical structure image are input (steps S 3110 and S 3120).

Figure 45:
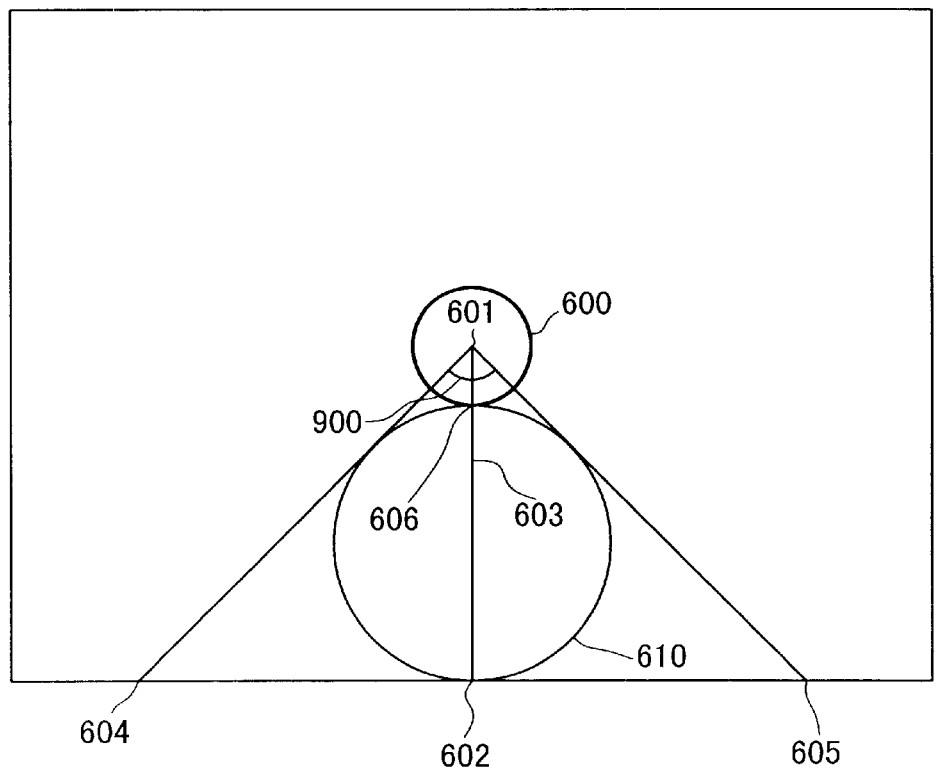
FIG. 45 is an explanatory drawing of the display processing of the highest multi-layer nodes in the fourth embodiment.
Figure 46:
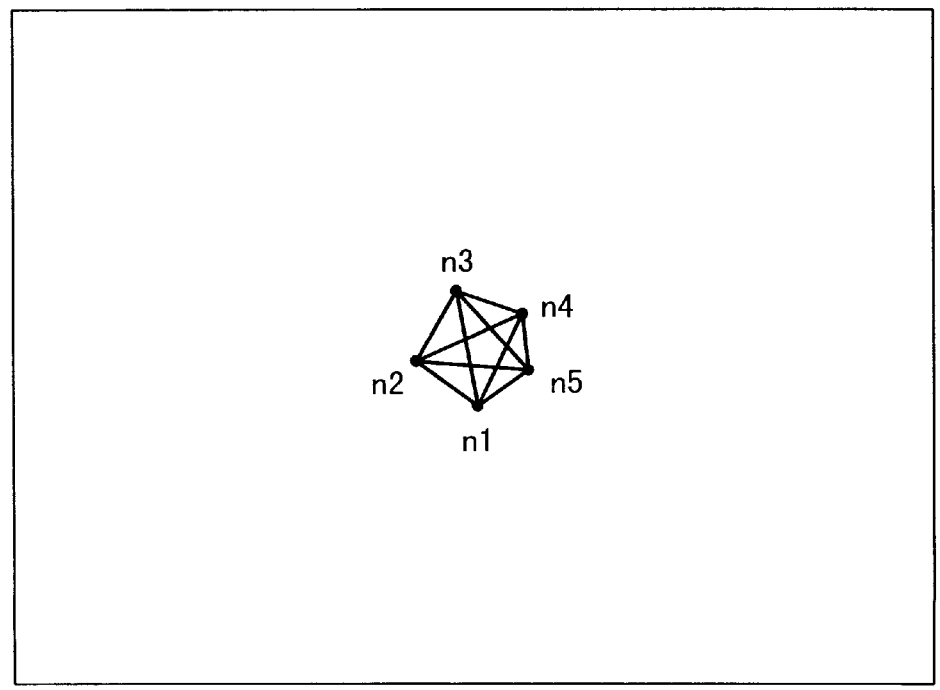
FIG. 46 is a continuation of FIG. 45.

Next, first, the display processing of nodes n1~n5 of the highest layer S 3130 is carried out. FIG. 45 and FIG. 46 are figures showing the processing at this time.

For the highest layer, the center point 601 of the node arrangement circle is chosen to be the center of the display area (step S 3131). From the number of layers of each node n1~n5, here, the partition angle of each node is weighted at 2, 3, 3, 2, 2, (step S 3132). Because the largest among these is 3, the largest partition angle is calculated as 360°×(3(2+3+3+2+2))=90° (step S 3133). An area (the area surrounded by 601, 604, and 605 in FIG. 45) is constructed demarcated by the 90° angle of the greatest partition angle, and whose bisector is the straight line 603, which is the shortest distance from the center point 601 and the border of the display area 602, the inscribed circle 610 of this area is constructed (step S 3134), and a circle 600 whose radius is from the center point 601 of the display area to the point 606 where the constructed inscribed circle 610 intersects with the shortest line from the center point 601 to the border of the display area, is constructed as the node arrangement circle (step S 3135). According to the weighted partition angles, the circle 600 is partitioned at 60°, 90°, 90°, 60°, and 60°, and the nodes n1~n5 are arranged on the intersections of the bisector of each angle and the circumference (step S 3136). These nodes are connected with a straight line, and the links as shown in FIG. 46 are constructed (step S 3137).

Figure 47:
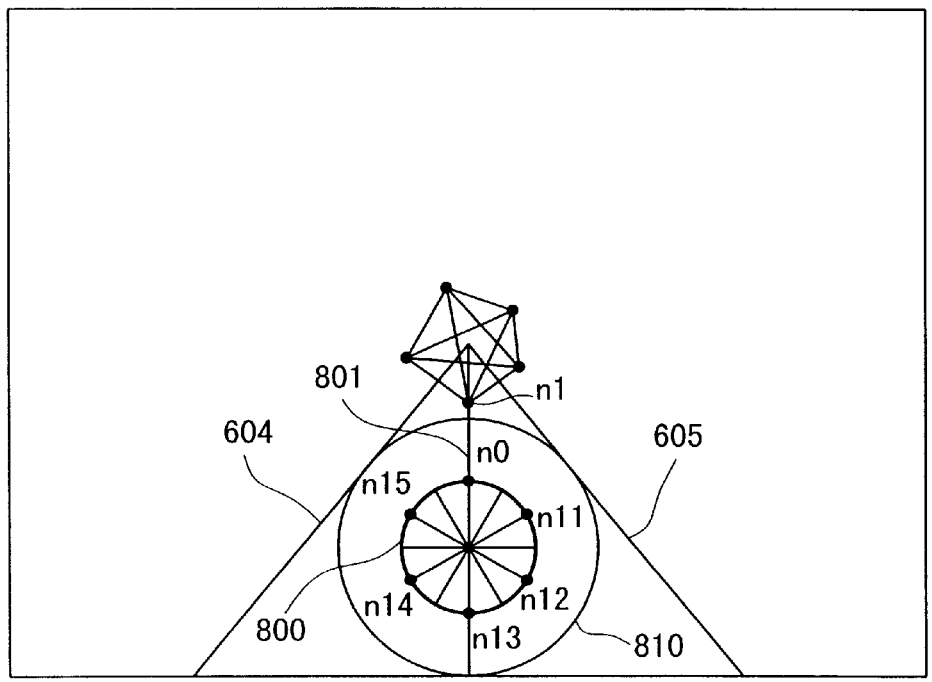
FIG. 47 is an explanatory drawing of the display processing of second layer nodes in the fourth embodiment.
Figure 48:
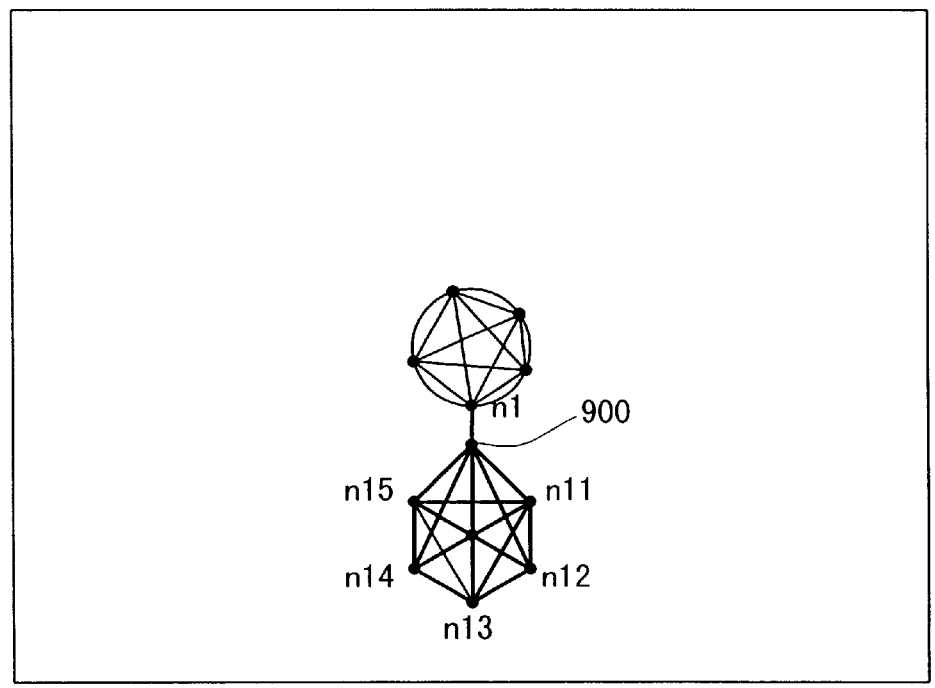
FIG. 48 is a continuation of FIG. 47.

Next, as the display processing S 3141 of the nodes under the same node of the upper layer, first, for the nodes n11~n15 of the second layer under the node n1, the display processing is carried out. FIG. 47 and FIG. 48 are figures showing the processing at this step. First, the area (here, the same area as the area surrounded by 601, 604, and 605 in FIG. 45) that the extensions 604 and 605 of the partition angle of node n1 of the upper layer from the center point of the node distribution circle of the highest layer demarcate with the border of the display area is made the possible display area of the relevant node (step S 3142). The inscribed circle 810 of this display area is constructed (step S 3143). The center of this inscribed circle 810 is determined as the center point of the node arrangement circle (step S 3144). Because the layer concerned is the lowest layer, a node arrangement circle 800, with the radius of the node arrangement circle being ½ the length of the radius of the inscribed circle 810, is constructed (step S 3145). Because nodes n11~n15 have no lower layer, a fictitious node n0 is added to the 5 nodes, and the partition angle is divided into 6 equal parts (step S 3146). The line 801 connecting the center point of the node arrangement circle 800 and the center point of the upper node arrangement circle is made the base line, and the base line is made the bisector of the partition angle with respect to the first node (fictitious node n0), which is divided into 360°/(5+1)= 60°. As shown in FIG. 47, nodes n11~n15 are arranged in sequence from node n0 on the intersections of the bisector of each angle and the circumference (step S 3147). These nodes n11~n15 are connected by straight lines, and links constructed (step S 3148). Furthermore, as the link for node n1, a base point 900 is provided on a point not overlapping with already constructed links on the straight line from the center point of the circle of the highest layer (600 in FIG. 45) to the center point of the circle 800 of the present layer, and as shown in FIG. 48, the base point 900 and each node are joined with straight lines (step S 3149).

Figure 49:
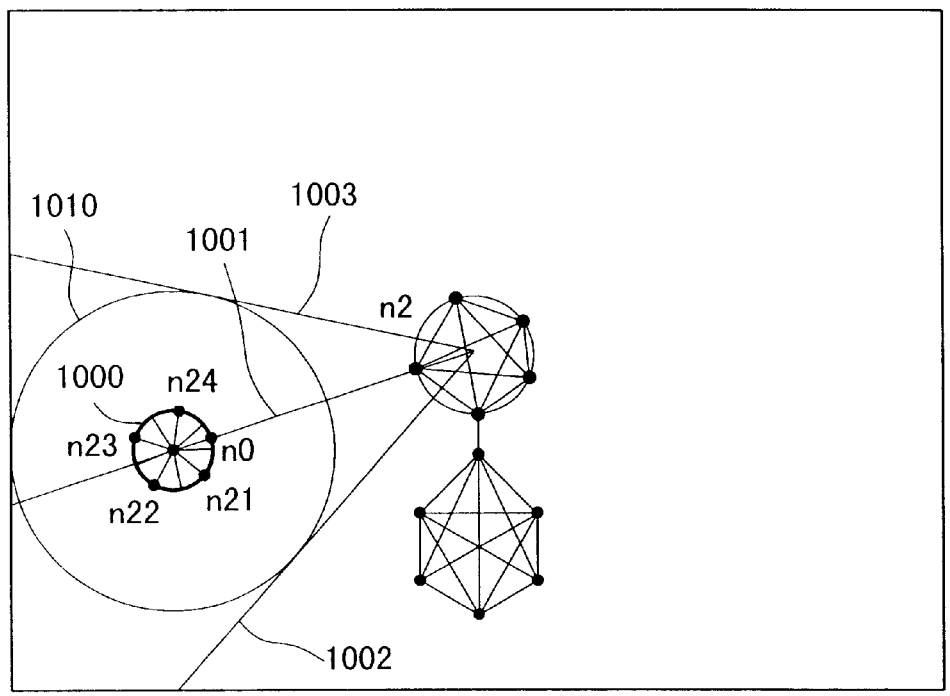
FIG. 49 is an explanatory drawing of a different display processing of a second layer node in the fourth embodiment.
Figure 50:
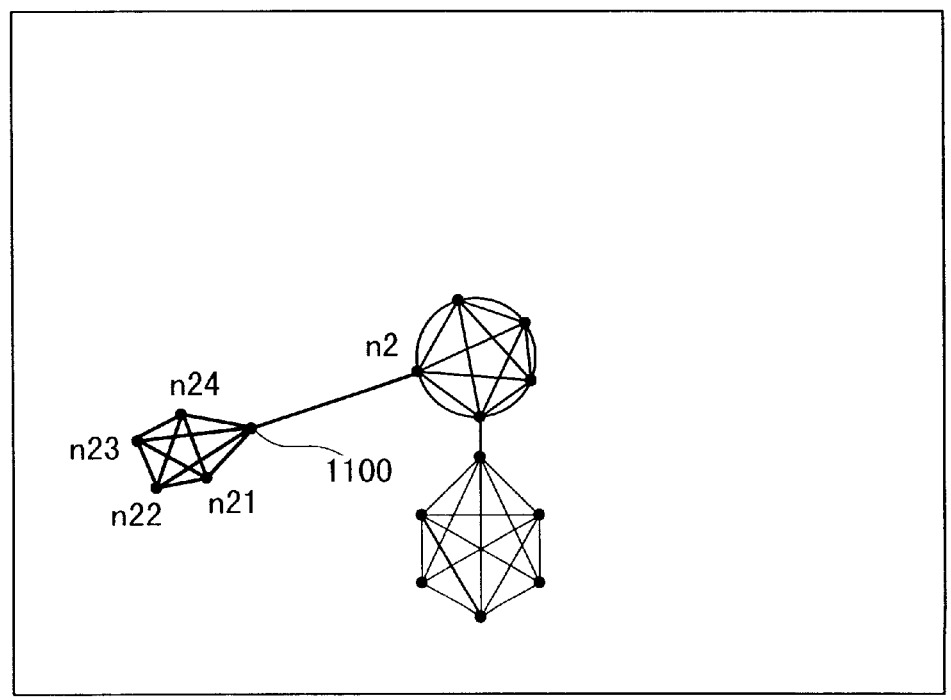
FIG. 50 is a continuation of FIG. 49.

Next, display processing S 3141 is carried out for nodes n21~n24 of the second layer under node n2. FIG. 49 and FIG. 50 are figures showing the processing at this step. First, an area which is demarcated by the extension 1002 of the partition angle of upper layer node n2 from the center of the node arrangement circle of the highest layer and the border of the display area is made the possible display area for the relevant node (step S 3142). The inscribed circle 1010 of this display area is constructed (step S 3143). The center of this inscribed circle 1010 is chosen as the center point of the node arrangement circle (step S 3144). Because the nodes of said layer have further lower layers, a node arrangement circle 1000 is constructed whose radius is 115 the radius of the inscribed circle 1010 (step S 3145). Adding the fictitious node as the first node, the partition angle of each node is weighted as 1, 2, 2, 2, 2, and 2 from the number of layers of each node (step S 3146). Making the straight line 1001 connecting the center point of node arrangement circle 1000 and the center point of the upper node arrangement circle the base line, this base line is made the bisector of the partition angle with respect to the first node (the fictitious node n0), and the node arrangement circle 1000 is divided into 40°, 80°, 80°, 80°, and 80°, and as shown in FIG. 49, the nodes n21~n24 are arranged in sequence from fictitious node n0 on the intersections of the bisector of each angle and the circumference (step S 3147). These nodes n21~n24 are connected with straight lines, and the links are constructed (step S 3148). Furthermore, as the link for node n2, a base point 1100 is provided on a point not overlapping with already constructed links on the straight line from the center point of the circle of the highest layer to the center point of the circle of the present layer, and as shown in FIG. 50, the base point 1100 and each node are joined with straight lines (step S 3149).

For nodes n31~n33 on the second layer under node n3, nodes n41~n44 on the second layer under node n4, and nodes n51~n52 of the second layer under node n5, the same display processing S 3141 is carried out.

Figure 51:
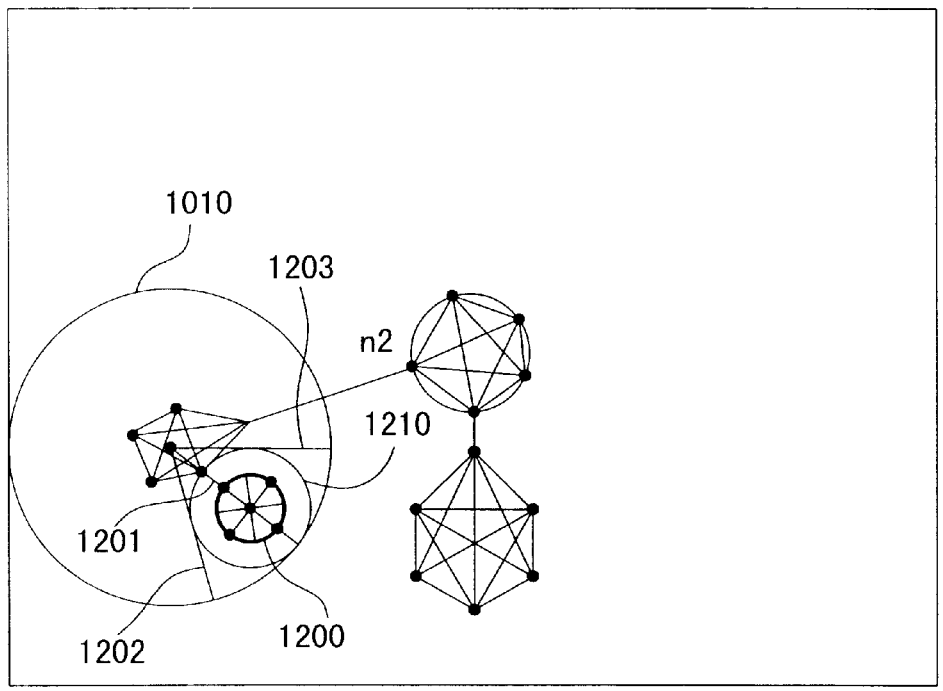
FIG. 51 is an explanatory drawing of data processing of the third layer nodes in the fourth embodiment.
Figure 52:
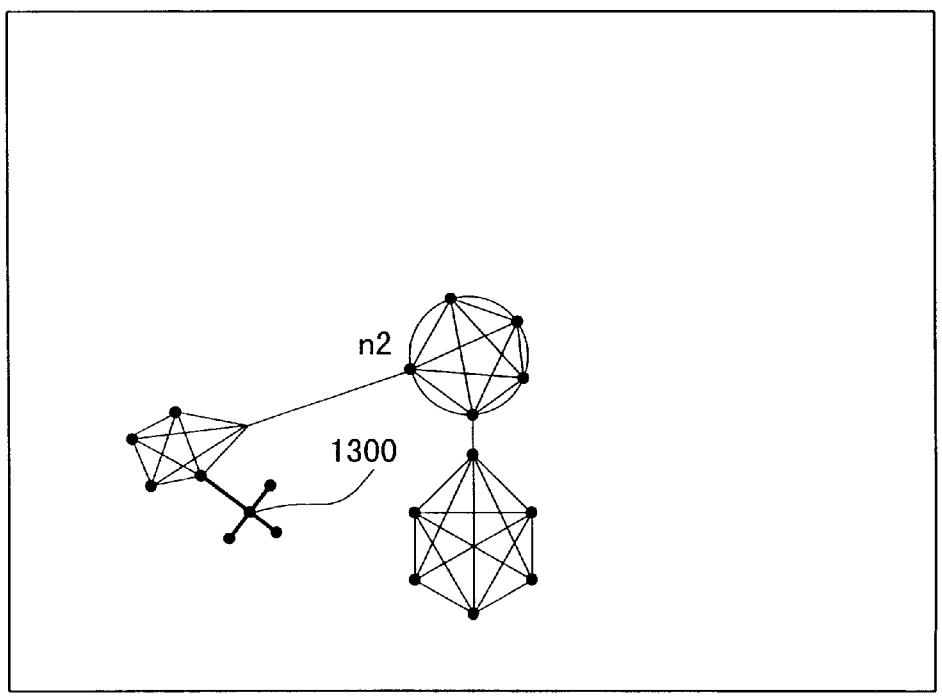
FIG. 52 is a continuation of FIG. 51.

Next, display processing 141 for the nodes of the third layer under node n21 is carried out. FIG. 51 and FIG. 52 are figures showing the processing at this step.

First, the area enclosed by the extensions 1202 and 1203 of the partition angle of node n21 of the upper layer from the center of the node arrangement circle (1000 in FIG. 49) of the upper layer and the inscribed circle (1010 in FIG. 49) made when constructing the upper layer node arrangement circle is made the possible display area (step S 3142). The inscribed circle 1210 of this display area is constructed (step S 3144). Because the layer of present concern is the highest layer, a node arrangement circle is constructed with a node arrangement radius 1200 that is ½ the radius of the inscribed circle 1210 (step S 3145). Because there are no lower layers, a fictitious node n0 is added to the number of nodes of the relevant third layer nodes (3 nodes), and the partition angle is divided into 4 equal parts (step S 3166). The straight line 1201 connecting the center point of the node arrangement circle 1200 and the center point of the upper node arrangement circle is made the base line, and this base line is made the bisector of the partition angle for the first node (fictitious node n0), and partitioned into 360°/(3+1)=90°. As shown in FIG. 51, the nodes are arranged in sequence on the intersections of the bisector of each angle and the circumference (step S 3147). These nodes are connected with straight lines, and links are constructed (step S 3148). Furthermore, as the link for node n21, a base point 1300 is provided on a point not overlapping with already constructed links on the straight line 1201 from the center point of the circle of the highest layer to the center point of the circle of the present layer, and as shown in FIG. 52, the base point 1300 and each node are joined with straight lines (step S 3149).

For node n22, node n23, and nodes n31~n33 under the third layer nodes, the same display processing S 3141 is carried out.

Here, in the display processing S 3130 of the nodes of the highest layer, in the weighting of the partition angles S 3132, a weighting of, for example, 2 or 3, according to the number of layers under each node was carried out, but the ratios of the weighting are arbitrary. In construction of the node arrangement circle S 3135, a circle is constructed whose radius is the distance from the center point of the node arrangement circle to contact with the inscribed circle, but a circle of a radius smaller than this is also possible. In constructing the links of nodes on the same circle S 3138, the links are connected with straight lines, but the links of nodes positioned adjacently on the circumference can also use arcs.

In addition, in the display processing S 3141 of the nodes under the same node of an upper layer, in constructing the inscribed circle S 3134, for the area chosen in the determination of the possible display area S 3142, the largest inscribed circle was constructed, but when the possible display area is large, it is possible to use a circle smaller than the largest inscribed circle. In the calculation of the radius of the node arrangement circle S 3145, when at least 1 of the nodes of the lower layer has a lower layer, the radius is set to ⅕ that of the above-mentioned inscribed circle, and when all the nodes of the lower layer are the lowest layer, or the layer concerned is the lowest layer, the radius is set to ½ the radius of the above-mentioned inscribed circle, but the partitioning of the radius of the node arrangement circles with respect to the radius of the inscribed circle can be changed. Also, like construction of the node arrangement layer of the highest layer, it is possible to construct the inscribed circle in the largest partition angle, or construct a circle whose radius is the distance from center point of the node arrangement circle to contact with the inscribed circle. In weighting the partition angles S 3146, the weighting was carried out according to the number of lower layers of each node, but the ratios of the weightings is arbitrary. Also, when there are no lower layers, the partition angle was divided equally, but it is not necessary that they be divided equally. In the construction of the links of nodes on the same circle S 3148, the links connected the nodes with straight lines, but the links of nodes positioned adjacently on the circumference can use arcs as well. In the construction of links of the upper layers S 3149, a base point is provided on a point not overlapping with already constructed links on the straight line from the center point of the circle of the highest layer to the center point of the circle of the present layer, and the base point and each node are joined with straight lines, but the base point need not be on the straight line from the center point of the circle of the upper layer to the center point of the circle of the layer concerned.

Moreover, in the explanation of the above-described embodiment, in the multi-layer data storage unit 20 of FIG. 1, a hierarchical structure such as that shown in FIG. 44 is stored, but the structure of the stored data is arbitrary. Also, there need not be any connection relation between the nodes of the same layer under the same node of an upper layer.

As explained above, according to the fourth embodiment of the invention, when graphically displaying a hierarchical structure, a circle upon which nodes under the same layer are radially arranged is constructed according to fixed rules, the nodes under its lower layer are arranged radially on a circle and are displayed, and by arranging the nodes on the same circumference according to the number of layers of the lower layers, for nodes with large lower layers, the display area of the nodes of the lower layers can be widened, and this has the advantage that even large scale hierarchical structures having from hundreds to about a thousand nodes, or a structure whose number of layers or number of nodes is irregular can be displayed widening the spaces of nodes and links for easy viewing, and the nodes and links can be manipulated easily by direct command on the screen.

Fifth embodiment

Below, the embodiment of the present invention will be concretely explained using the figures.

The data display processing unit 30 of the present embodiment calculates the position and size of an ellipse of each layer where nodes will be positioned from the data stored in the hierarchical structure data storage unit 20, exchanges the nodes with, for example, circles and triangles, exchanges the links connecting the nodes with straight lines, and displays the generated hierarchical structure image on the display 40 via the controller 50.

When a hierarchical structure is graphically displayed, the present embodiment concerns, in particular, the graphic display of a hierarchical structure when the nodes of the upper layer are directly connected with its two lower layers.

Figure 53:
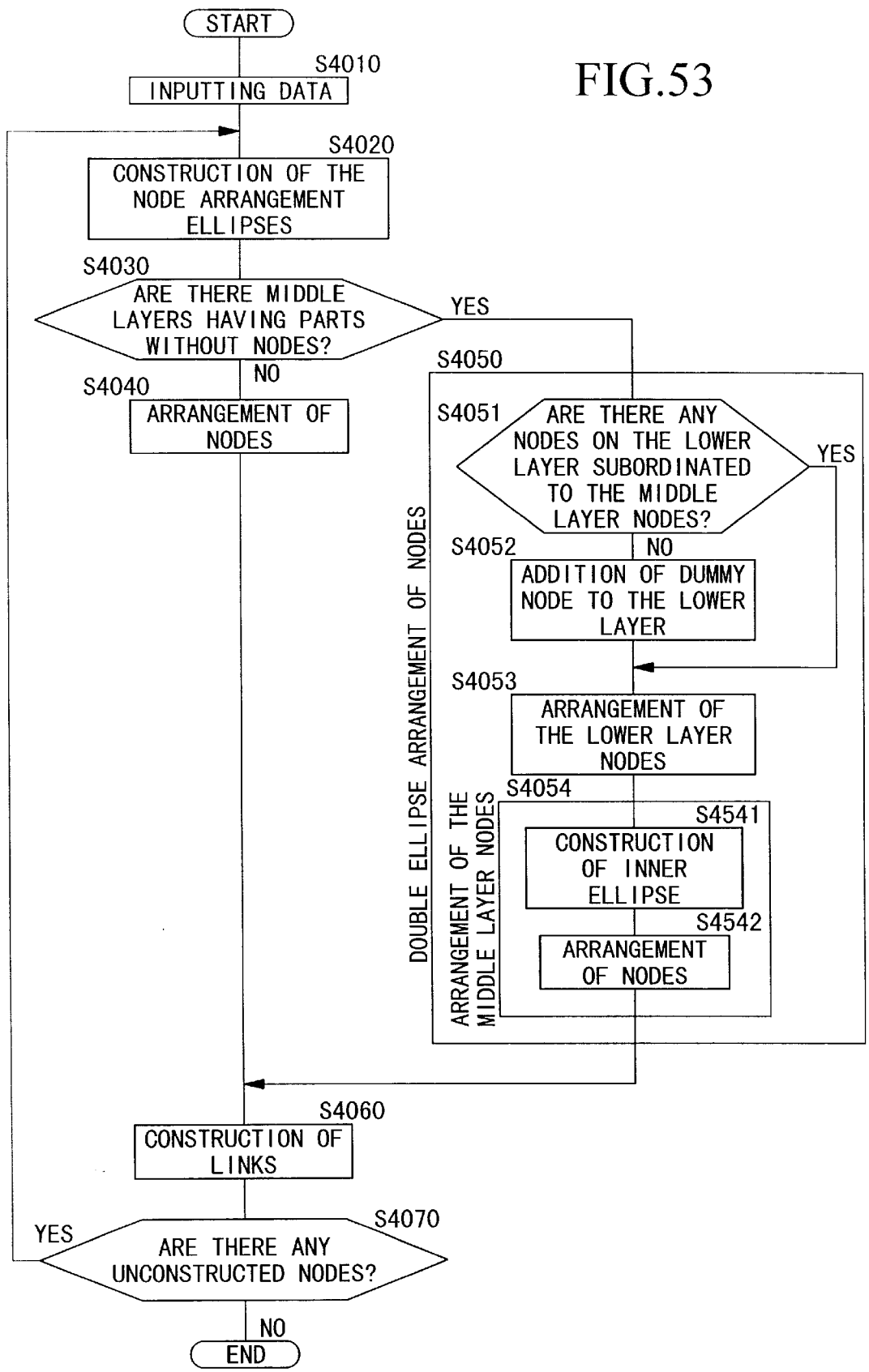
FIG. 53 is an example of a flowchart showing the processing in the data processing unit of FIG. 1 in the fifth embodiment.

FIG. 53 is an example of a flowchart showing the processing sequence in the data display processing unit 30. The program of the processing sequence of FIG. 53 can be stored in the apparatus in advance, or stored on a recording device such as a floppy disc or CD-ROM, and loaded from this medium.

Next, based on the flowchart of FIG. 53, an example of the operation of the graphical display of a hierarchical structure in the present invention will be explained.

Figure 54:
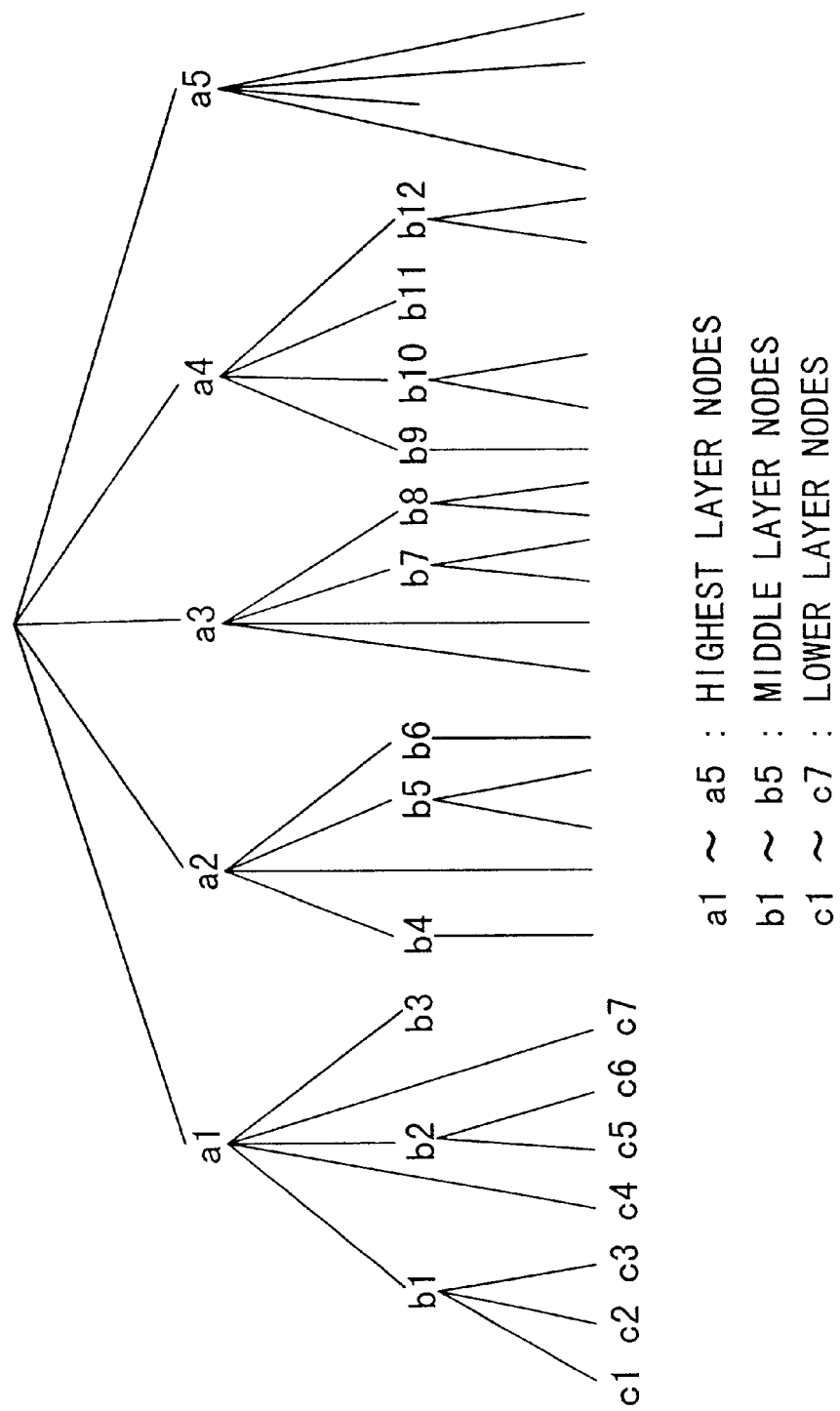
FIG. 54 is an example of a drawing in which the data of a hierarchical structure stored in the hierarchical structure data storage unit is shown with a tree display in the fifth embodiment.

As data stored in the hierarchical structure data storage unit 20, a structure such as that shown in FIG. 54 having a middle layer where part of the nodes do not exist may be given. For the sake of convenience, FIG. 54 shows the data of the hierarchical structure stored in the hierarchical structure data storage unit 20 as a tree display.

Moreover, in explaining the operation of the present invention, even if the reference numerals in FIGS. 54 to 62 are the same as the reverence numerals used in other figures, within the range of FIGS. 54 to 62, the same reference numeral indicates the same item, and has no connection with the same reference numeral of the other figures.

Figure 55:
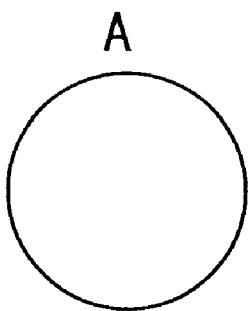
FIG. 55 is an example of a drawing of a highest layer node arrangement ellipse in the fifth embodiment.
Figure 58:
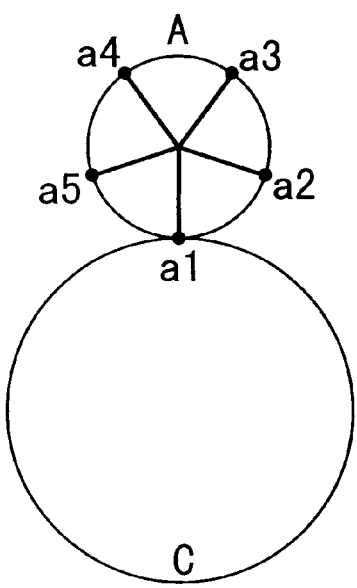
FIG. 58 is an example of the construction of node arrangement ellipse of the lower layer of the middle layer in which part of the nodes do not exist in the fifth embodiment.

In FIG. 53, in inputting the data (step S 4010), data stored in the data storage unit 20 is input. Here, the hierarchical structure data shown in FIG. 54 is input. In making the node arrangement ellipse (step S 4020), among the input data, using the data of the same layer under the same node, the position and size of the ellipse is calculated, and the ellipse is constructed. Here, for the sake of convenience, the ratio of the minor axis to the major axis is 1:1. As will be described later, the highest circle is constructed as shown in FIG. 55, and the circle of the layer subordinate to node a1 is constructed as shown in FIG. 58. In deciding whether or not there is a part of the middle layer without nodes (step S 4030), for the data of the same layer it is decided whether or not there is a part with links to a lower layer, but without nodes. In the arrangement of nodes (step S 4040), nodes are arranged equally spaced on the ellipse (circle) constructed in step S 4020.

In the processing of the double arrangement ellipse of the nodes (step S 4050), in deciding whether or not nodes exist on the lower layer subordinate to middle layer nodes (step S 4051), for the nodes existing on the middle layer, it is decided whether or not nodes of a lower layer subordinate to each node exist. In adding dummy nodes to the lower layers (step S 4052), for nodes without nodes of lower layers subordinate to nodes existing on the middle layer, one dummy node is added to the lower layer. In arranging the lower layer nodes (step S 4053), the nodes under a part of the middle layer without nodes are arranged equally spaced on the node (circle) constructed in step S 4020. In arranging the middle layer nodes (step S 4054), in the construction of the ellipse (step S 4541), the size of the ellipse on which the middle layer nodes are arranged is calculated such that the size is ½ of the ellipse (circle) of the lower layer nodes arranged in step S 4053, the same point as the center of the ellipse (circle) that was arranged in the same step S 4053 is made the center, and the ellipse (circle) is constructed. In arranging the nodes (step S 4542), the nodes are arranged on the points where a straight line connecting the nodes of the lower layer subordinate to the arranged node and the center of the ellipse (circle) intersect with the ellipse (circle) constructed in step S 4541. When a plurality of subordinate nodes exist, points are found in equally dividing an arc along the ellipse (circle) on which these nodes are arranged, and the nodes are arranged on points where a line connecting these points and the center of the ellipse (circle) intersect the arrangement ellipse (circle).

In constructing links (step S 4060), the nodes of the upper layer and the center of the arrangement ellipse (circle) concerned are connected with a straight line, this point is made the base point, and each node is connected with the straight line. However, dummy nodes are not connected to the links.

In deciding whether or not there are other undisplayed nodes (step S 4070), if there are other undisplayed nodes, step S 4020 is returned to, and when there are no undisplayed nodes, the processing is terminated.

FIGS. 55 to 62 are concrete explanatory figures of the processing of the graphic display of the hierarchical structure in the present embodiment. Below, the processing of FIG. 53 will be explained with reference thereto.

Figure 56:
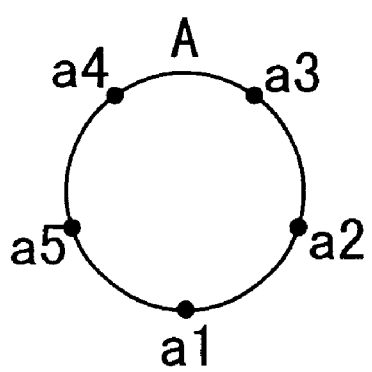
FIG. 56 is an example of the node arrangement of the highest layer in the fifth embodiment.
Figure 57:
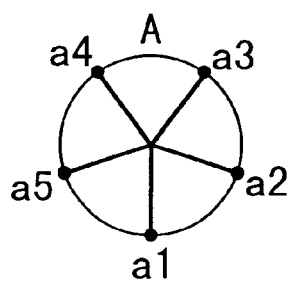
FIG. 57 is an example of a link construction of the highest layer nodes in the fifth embodiment.

First, hierarchical structure data for a structure such as that shown in FIG. 54 is input (step S 4010). Next, for the highest layer, node arrangement circle A as shown in FIG. 55 is constructed (step S 4020). As shown in FIG. 54, on the highest layer, because there are no parts having links to the lower layer and on which nodes do not exist (step S 4030), the five nodes a1~a5 are arranged equally spaced as shown in FIG. 56 (step S 4040). Additionally, these nodes a1~a5 are joined by links shown in the bold line in FIG. 57 (step S 4060). In step S 4070, it is decided whether or not there are undisplayed nodes, and step S 4020 is returned to because there are still undisplayed nodes below.

Figure 59:
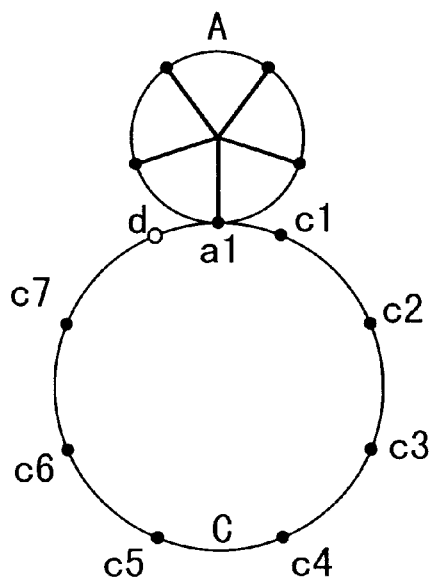
FIG. 59 is an example of the lower layer node arrangement in the fifth embodiment.
Figure 60:
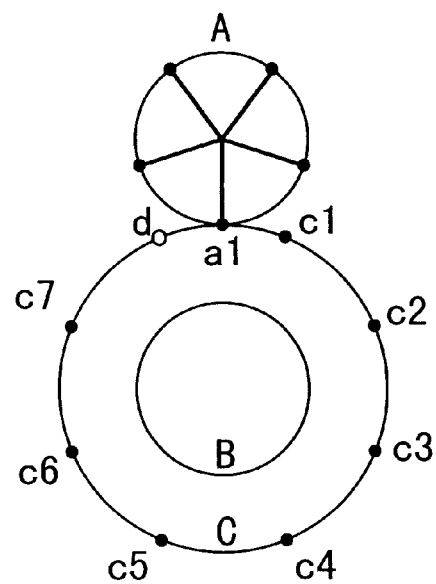
FIG. 60 is an example of the construction of a middle layer node arrangement ellipse in the fifth embodiment.
Figure 61:
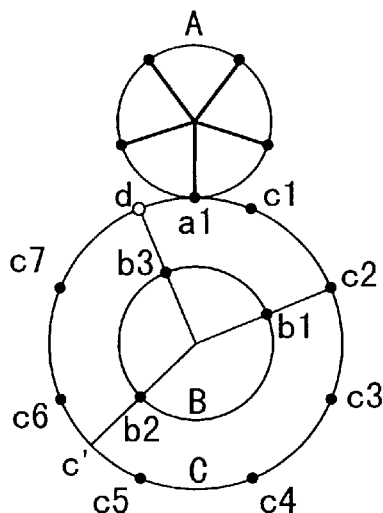
FIG. 61 is an example of the middle layer node arrangement in the fifth embodiment.
Figure 62:
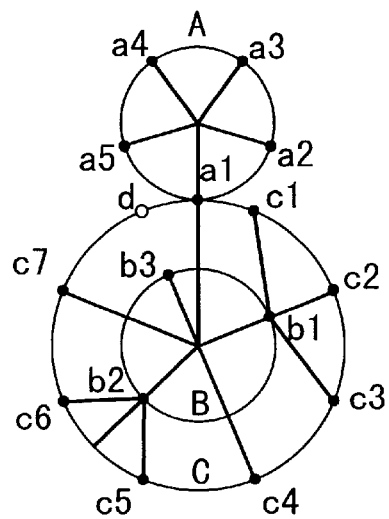
FIG. 62 is an example of the link construction of between a middle layer node and lower layer nodes in the fifth embodiment.

Next, as an arrangement ellipse of the layer subordinate to node a1, the node arrangement circle C, such as that shown in FIG. 58, is constructed (step S 4020). On the layer one below the node a1, there are only the three nodes b1~b3, and from node a1, because there is a part connected to nodes c4 and c7 two layers down (step S 4030), as shown below, double ellipse processing of the nodes is carried out (step S 4050). First, for middle layer nodes b1~b3, it is decided whether there are nodes on the lower layer (step S 4051), and because there are no nodes subordinate to node b3, a subordinate dummy node is added (step S 4052). Next, the eight nodes comprising the nodes c1~c7 of the lower layer and the dummy node are arranged equally separated on the circle C, as shown in FIG. 59 (step S 4053). Next, the processing of the arrangement of the middle nodes is carried out (step S 4054). First, as the circle on which the middle layer nodes b1~b3 are arranged, inside circle C, a circle ½ the size thereof is constructed, as shown in FIG. 60 (step S 4541). Next, on circle C, point C2, which is the midpoint that bisects the arc connecting the nodes c1 and c3, and c', which is the midpoint that bisects the arc connecting nodes c5 and c6, are found, and as shown in FIG. 61, on the intersection of the straight line from the center O of the double circle connecting c2, c', and d on the circle C with circle B, each middle layer node b1, b2, b3 is arranged (step S 4542). And as shown in FIG. 62, these nodes are connected by links (step S 4060).

Below, steps S 4020~4070 are repeated, and the nodes subordinate to nodes a2~a5 also are arranged in the same manner.

In the explanation of the embodiment above, in hierarchical structure data storage unit 20, the data for the hierarchical structure shown in FIG. 54 is stored, but the structure of the stored data is arbitrary. In addition, there need not be three layers.

In the flowchart in FIG. 54, in the inputting of data (step S 4010), data stored in the hierarchical structure data stored unit 20 was input, but all of the data can be input at once. In constructing the node arrangement ellipses (step S 4020), among the data input, the ellipse was constructed whose position and size were based on the data of the same layer subordinate to the same node, but the method of calculating the position and size of the ellipse is arbitrary, and can be calculated based on the data structure and the number of nodes, or the arrangement can be carried out with predetermined ellipses. Also, in the case of double ellipses by which middle layer ellipses are arranged on the outside of an ellipse, the size of the ellipse can be made larger. Also, here, the ratio of the minor axis to the major axis of the ellipse was 1:1, but the shape and size of the ellipse is arbitrary and can be determined according to the ratio of the abscissa to ordinate of the display area.

In the arrangement of the nodes (step S 4040), the nodes are arranged equally separated on the ellipses constructed in the construction of the node arrangement ellipse (step S 4020), but as a method of arrangement of the nodes, they do not have to be equally spaced, but could be arranged based on the data structure of each subordinate node.

In the processing of the double ellipses for the nodes (step S 4050), for nodes subordinate to nodes of the middle layer and have no lower layer nodes, one dummy node was added to the lower layer in order to secure the area in which the middle layer nodes are arranged (step S 4052), but without adding dummy variables, they can be arranged at an appropriate position on the middle layer arrangement ellipse. In the arrangement of the lower layer nodes (step 4053), nodes under the middle layer, a part of which has no nodes, are arranged equally spaced on an ellipse constructed in the construction of the node arrangement ellipses (step S 4020), but the method of arranging the nodes is arbitrary, and they need not be equally spaced, but the spacing of the nodes for which nodes on the upper middle layer exist, can, for example, be reduced, or distributed based on the nodes of the middle layers. In the arrangement of the middle layer nodes (step S 4054), in the construction of the ellipses (step S 4541), for the size of the ellipse arranging the middle layer nodes, the minor axis and the major axis are calculated such that the size of the ellipse is ½ of the ellipse arranged in the arranging of the middle layer nodes (step S 4053), but the size of the ellipse is arbitrary if its size is less than the size of the ellipse of the arranging lower layer. Also, in the arrangement of the lower layer nodes (step S 4053), the point which is the same as the center of the arranged ellipses was made the center, and the ellipse constructed, but if arranged within the lower layer arrangement ellipse, the centers need not be identical. In the arrangement of the nodes (step S 4542), the nodes are arranged on the points where a straight line connecting the nodes of the lower layer of arranged subordinate nodes and the ellipse constructed in the construction of the ellipses (step S 4541), but the method of arrangement is arbitrary, and they can be arranged equally spaced on the ellipse.

In constructing the links (step S 4060), the upper layer nodes and the center of the arrangement ellipse of the layer concerned are joined by a straight line, and making this point a base point, each node is connected by straight lines, but the position of the base point is arbitrary, and an upper layer node can also be made a base point.

In addition, in the above-described first through fourth embodiments, when the upper layer nodes and its two lower layer nodes are directly connected, the graphical display of the hierarchical structure shown in the present embodiment can be applied.

As explained above, according to the invention shown in the fifth embodiment, when graphically displaying hierarchical structures, by constructing a second ellipse inside the arrangement ellipse of the lower layers and arranging nodes of layers which have cases of nodes of the relevant layer not existing, so that upper layer nodes are directly connected to the nodes two layers down, on that ellipse, in addition having the advantage of eliminating the overlapping of link displays which show connection relations between nodes, the layer relations of the nodes can be displayed in a manner easily understood.

Sixth Embodiment

Below, the present embodiment will be concretely explained using the figures.

The data display processing unit 30 of the present embodiment uses data stored in a hierarchical structure data storage unit 20, calculates the position and size of a circle for each layer on which nodes will be positioned, replaces nodes with, for example, circles or triangles, and the links connecting nodes with straight lines, and display the hierarchical structure generated in this manner on the display 40 via controller 50.

In addition, the present embodiment, in particular, relates to graphical display of a hierarchical structure for making it easy to view and manipulate connection relationships when these connection relationships, in which two hierarchical structures are connected, show a complicated large scale hierarchical structure on one screen.

Figure 63:
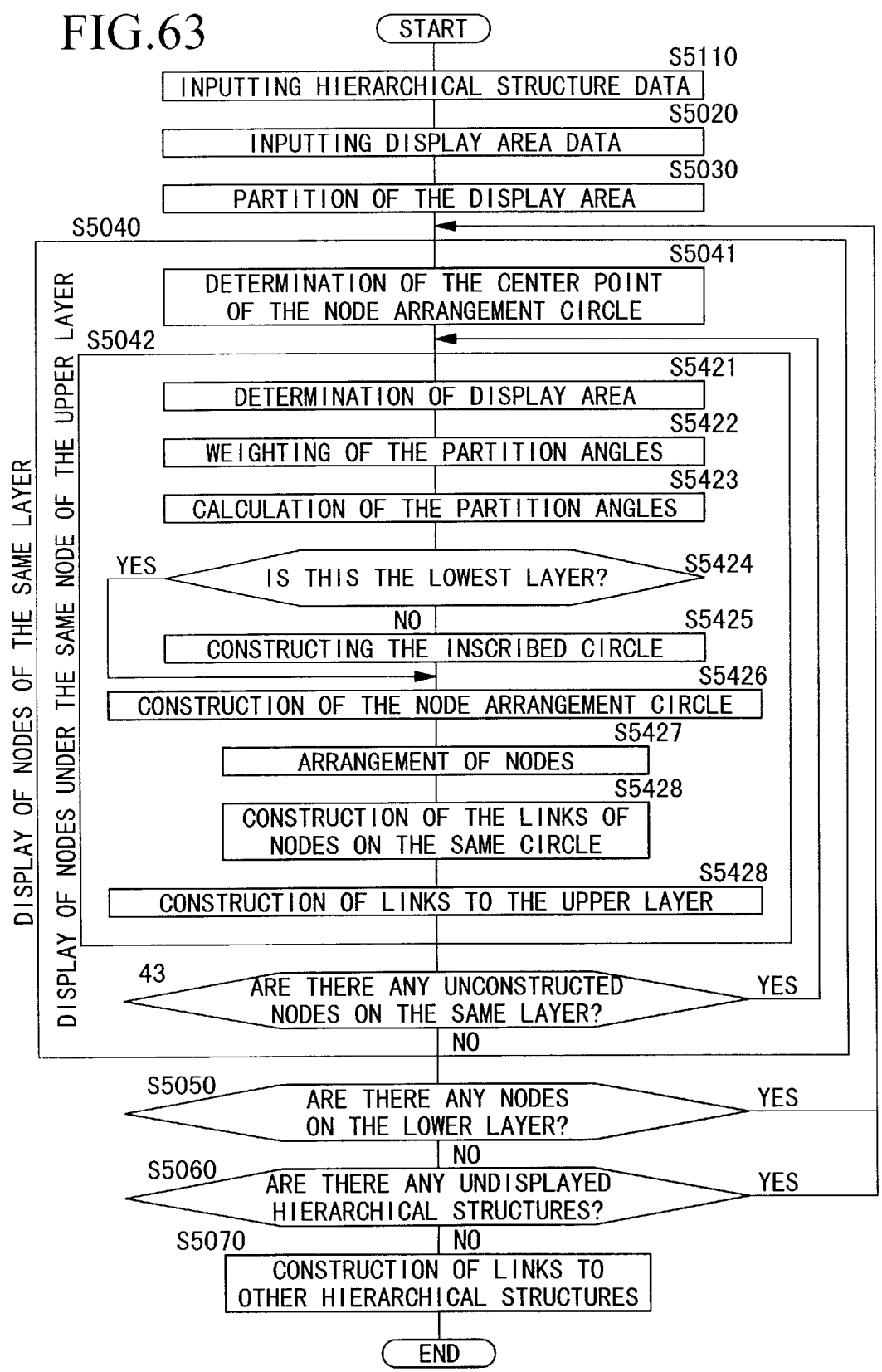
FIG. 63 is an example of a flowchart showing the processing in the data display processing unit of FIG. 1 in the sixth embodiment.

FIG. 63 is an example of a flowchart showing the processing sequence in the data display processing unit 30 of FIG. 1. According to FIG. 63, the construction process of the graphical display of a composite hierarchical structure related to an embodiment of the present invention will be explained.

Moreover, in the present embodiment, FIGS. 64 to 78 will be used in order to explain an example of the operations in the flowchart shown in FIG. 63, but even if the reference numerals used in FIGS. 64 to 78 are the same as the reference figures used in the other figures, within the range of FIGS. 64 to 78, the same reference numerals denote the same item, and have no connection to the same reference numerals of the other figures.

Figure 64:
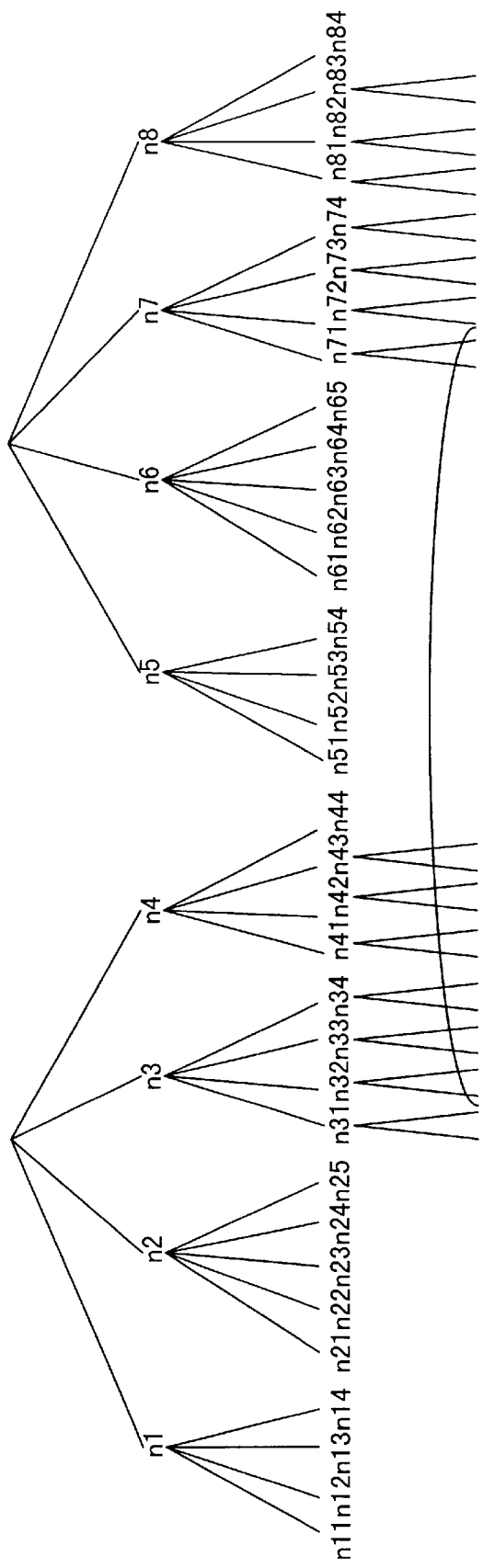
FIG. 64 is an example of a drawing showing the data of a hierarchical structure stored in the hierarchical structure data storage unit of FIG. 1 with a tree display in the sixth embodiment.

The processing shown in FIG. 63 are carried out at the following settings:

(1) In the hierarchical structure data storage unit 20, data for a hierarchical structure such as that shown in FIG. 64 is stored. Furthermore, except for the lowest layer, the nodes of the same layer under the same node of an upper layer within the same hierarchical structure all have connection relations. Also, in the hierarchical structure storage unit 20, in addition to hierarchical structure data, the data related to the display area of display 40 is also stored. Moreover, for the sake of convenience, FIG. 64 shows the data of the hierarchical structure stored in the hierarchical structure data storage unit 20 as a tree display.

(2) The display area which is input during the input of the display area data (step S 5020) is a rectangle, and in the partition of the display area (step S 5030), this display area is divided into equal parts by a straight line parallel to this rectangle. In the display of nodes of the same layer (step S 5040), in the determination of the center point for the node arrangement circle (step S 5041), a circle whose radius is the distance from the center point of the upper layer node arrangement circle to the center of an inscribed circle from when the upper layer node arrangement circle was constructed, and the points at which the extension of a straight line from the center point of the upper layer node arrangement circle connecting each node of the upper layer intersect this circle determine the center point of a circle on the nodes under each upper layer are arranged. However, the center point of the node arrangement circle of the highest layer is the center of each display area.

(3) In the display of nodes under the same node of the upper layer (step S 5042), in the determination of the display area (step S 5421), the point determined in the determination of the center point of the node arrangement circle (step S 5041) is made the center point, and the inscribed circle is constructed within the extensions of the partition angles of the upper node and the interior of the inscribed circle is made the display area. However, the display area of the highest layer is the display area equally divided by the partition of the display area (step S 5030). In weighting the partition angle (step S 5422), the weighting is according to the number of nodes of the lowest layer for each node. At this step, other than the highest layer, as the link display space from the higher layer node, fictitious node n0 is added as the first node. In the case that there is no lower layer, the partition angle is divided equally. In the calculation of the partition angle (step S 5423), other than the lowest layer, for the partition angle a° of the upper node, the largest value of the partition angle will be (90+a/2)°. In constructing the inscribed angle (step S 5425), the inscribed circle is composed for the area in the display area divided by the largest partition angle calculated in the partition angle partition (step S 5423). In constructing the node arrangement circle (step S 5426), a circle is constructed whose radius is the distance from the center point of the node arrangement up to where it meets the inscribed circle. However, in the lowest layer, the circle of the display area found in the determination of the display area (step S 5421) is made the node arrangement circle. In the arrangement of the nodes (step S 5427), the nodes are arranged on the points where the bisector of the partition angle of each node intersects the node arrangement circle, and the nodes which connect with the other hierarchical structures and the upper nodes are arranged at positions which are the shortest distance to the other display area. In constructing the links of the nodes on the same circle (step S 5428), the links connect the nodes with straight lines. In constructing the links with the upper layers (step S 5429), a base point is provided at a position not overlapping with links already constructed with straight lines from the center point of the upper layer to the center point of the circle of the layer concerned, and the base point and each node is connected with straight lines.

(4) In constructing the links between the other hierarchical structures (step S 5070), nodes which are connections with other hierarchical structures are connected with straight lines.

Below, an explanation will be given using the flowchart in FIG. 63, and the specific processing of the hierarchical structure image in the present embodiment is shown in FIGS. 65 to 78.

Figure 65:
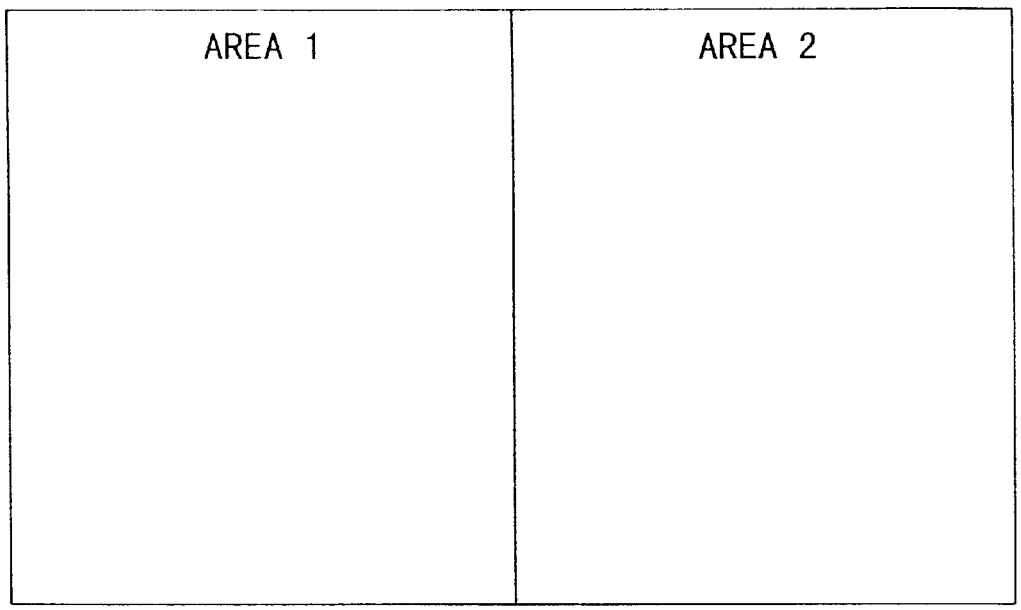
FIG. 65 is an explanatory drawing of the partition of the display area in the sixth embodiment.

First, in order to construct the hierarchical structure image, the hierarchical structure data of a structure such as that shown in FIG. 64 and the data related to the display area of the display which shows the hierarchical structure image is input (step S 5010, S 5020). Next, the input display area is partitioned into equal parts as shown in FIG. 65 (step S 5030).

A hierarchical structure is allotted respectively to each of the above divided areas, and the display processing of the nodes of the same layer is carried out sequentially (step S 5040). The display processing of nodes of the same layer for any hierarchical structure repeats the display processing (step S 5042) of nodes under the same node of the upper layer step only for the number of upper layer nodes (step S 5043), and further, repeats the same processing for the other hierarchical structures (step S 5050). In this manner, the display processing of a hierarchical structure is completed, and next, the processing is repeated in the same manner for the other hierarchical structures (step S 5060). Below, the hierarchical structure on the left side of FIG. 64 is allotted in the partitioned area 1, and the construction process of its hierarchical structure image is explained. Moreover, the processing of the hierarchical structure on the right side of FIG. 64 is the same.

Figure 66:
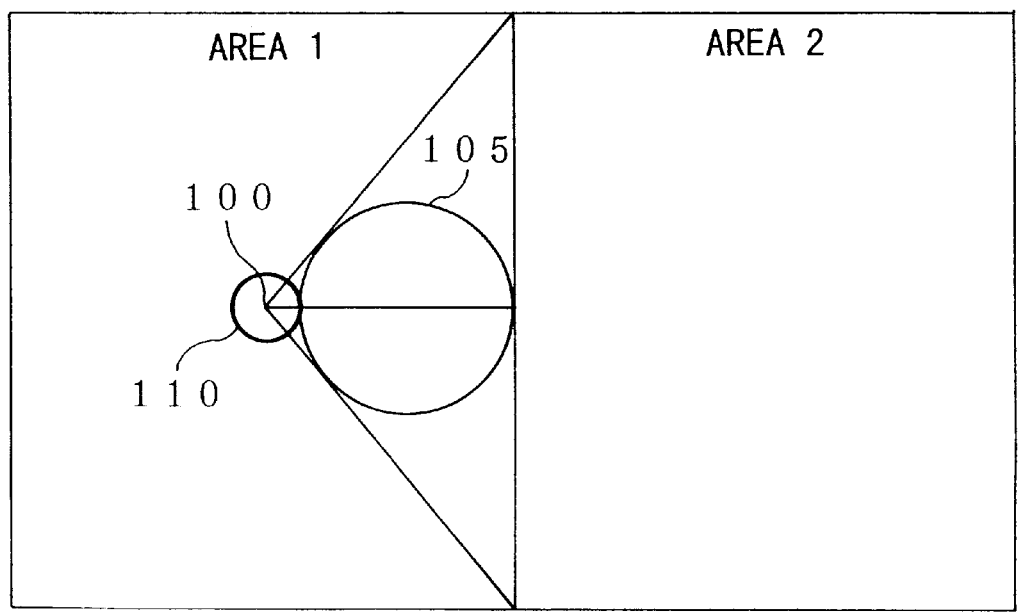
FIG. 66 is an explanatory drawing of the construction of an arrangement circle for the highest layer node in the sixth embodiment.

First, for the highest layer, the center of each display area is determined to be the center point of the node display circle (step S 5041). Next, for the hierarchical structure concerned, as the display area for the highest layers, the partitioned area 1 is determined (step S 5421). Next, in the present example, the partition angles of each node are weighted 4, 5, 8, 8 depending on the number of nodes of the lowest layer of each node (step S 5422). Among these, because the largest is 8, the largest partition angle is calculated as 360°×(8/(4+5+8+7))=120° (step S 5423). Next, it is decided whether or not this is the lowest layer (step S 5424), and because it is not the lowest layer, an area is constructed divided by the 120° which is the bisector of the straight line of the shortest distance from the center point of the circle to the border of the display area, and the inscribed circle of this area is constructed (step S 5425). Next, a circle, whose radius is from the center point of the display area to the point where the constructed inscribed circle intersects the straight line of the shortest distance from the center point of the circle to the border of the display area, is constructed as the node arrangement circle (step S 5426). FIG. 66 shows the processing up to this point, and 100 is the center point of the node arrangement circle, 105 is the inscribed circle, and 110 is the node arrangement circle.

Figure 67:
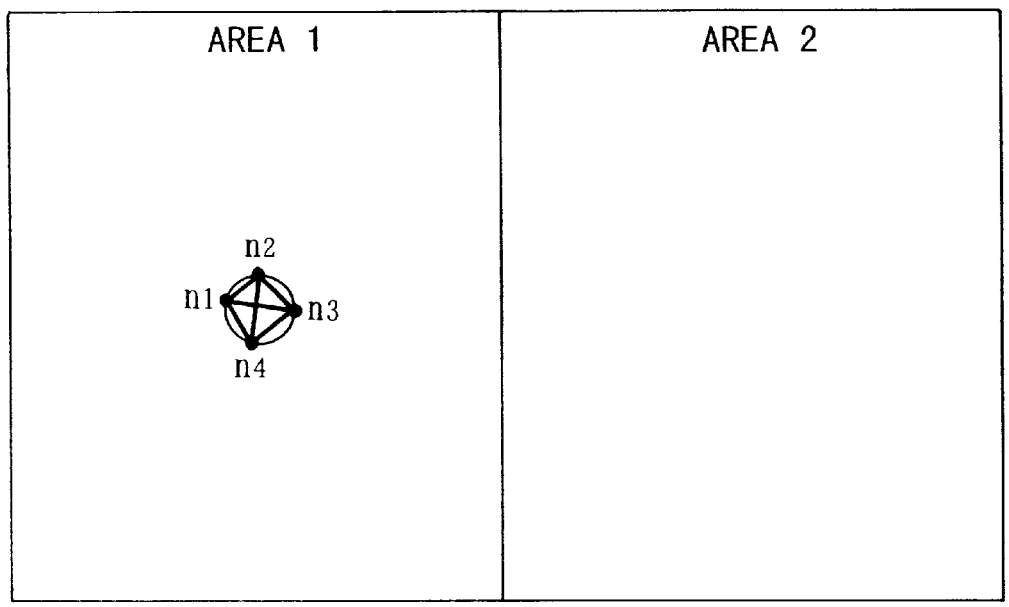
FIG. 67 is a drawing to explain the link construction and the arrangement of the highest layer nodes in the sixth embodiment.

Next, as the upper node of the node connected with the other hierarchical structure, in this example, node n3 is arranged on the point there the straight line connecting the center of both display areas and the node arrangement circle 110 intersect, this point being such that it is on the line bisecting the partition angle, and according to the weighted partition angles, the node arrangement circle 110 is partitioned 60°, 75°, 120°, and 105°; the nodes are then arranged on the intersections of the bisector of each angle and the circumference (step S 5427). Next, these nodes are connected with straight lines, and the links are constructed (step S 5428). FIG. 67 shows the processing up to this point, and n1~n4 are the nodes of the highest layer shown in FIG. 64. The lines that connect these nodes are the links.

Here, the node display processing of the highest layer ends (step S 5043), and next, processing moves to the second layer nodes.

Figure 68:
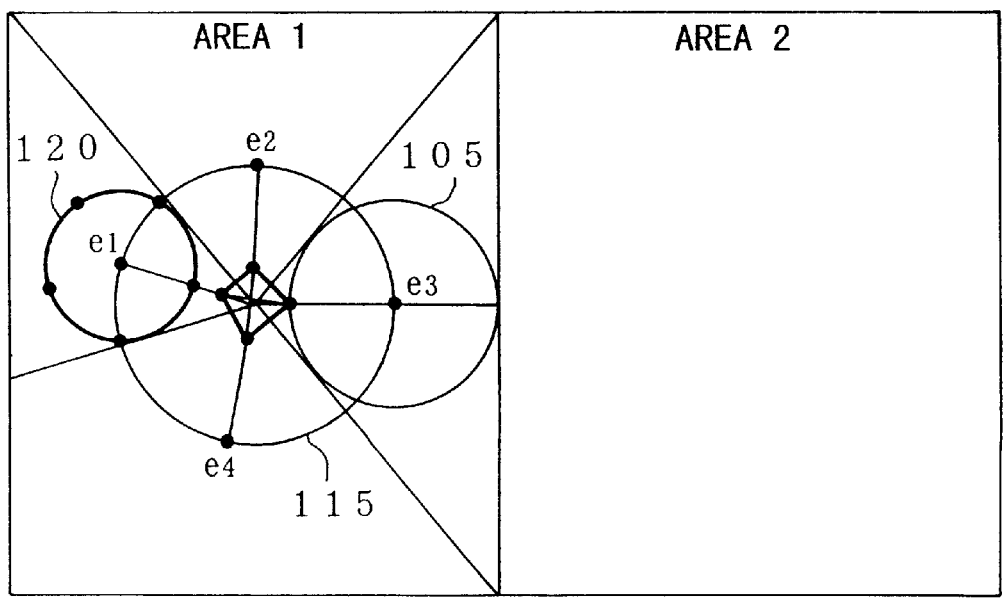
FIG. 68 is a drawing to explain the determination of the central point of a second layer node arrangement circle in the sixth embodiment.

For the nodes of the second layer under the nodes n1~n4 of the highest layer, first, a circle 115 is constructed whose radius is the distance from center point 100 of the highest layer node arrangement circle to the center point of the inscribed circle 105 constructed when finding the node arrangement circle of the highest layers, and from the center point of the highest node arrangement circle, the points where the extensions of the straight lines connecting each node of the highest layer intersect the circle are each made e1~e4, and these are determined to be the center points of circles arranging the nodes under each node of the highest layer nodes (step S 5041). This is shown in FIG. 68.

Figure 69:
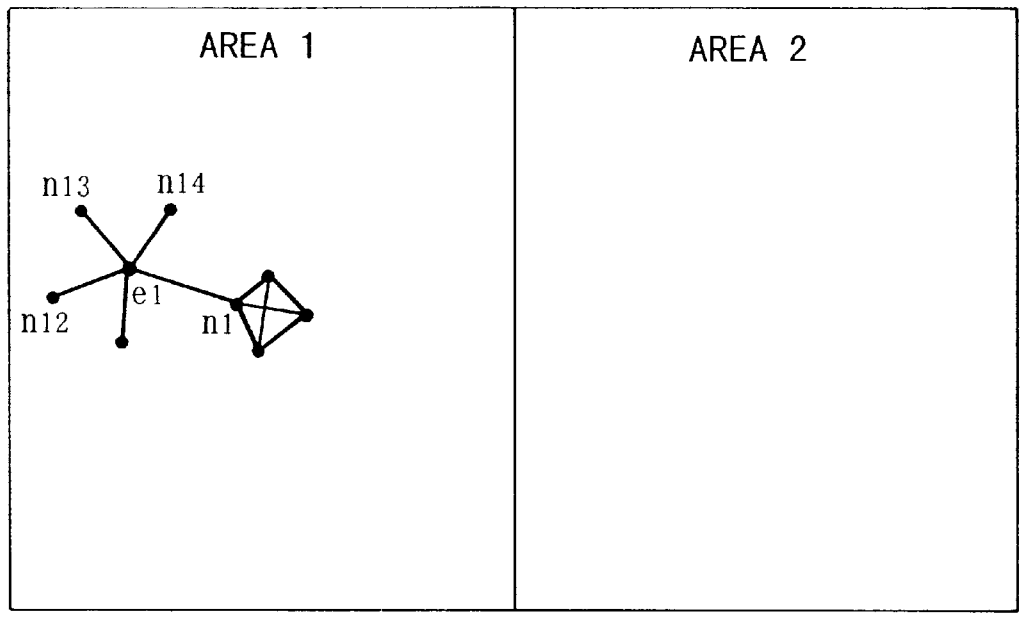
FIG. 69 is an explanatory drawing of the construction of links and the arrangement circle for a second layer nodes without lower layers in the sixth embodiment.

Next, for the nodes n11~n14 of the second layer under the node n1, first, the inscribed circle whose center is e1 and is between the extensions of the partition angle of node n1 is made the display area of these nodes (step S 5421). In nodes n11~n14, because they do not have a lower layer, a fictitious node n0 is added to the 4 nodes, and the partition angle is divided by 5 equal parts. Therefore, each partition angle becomes 360°/(4+1)=72° (step S 5423). Because nodes n11~n14 are the lowest layer (step S 5424), the circle of the display found in step S 5421 is the node arrangement circle (step S 5426). 120 of FIG. 68 shows this node arrangement circle. This circle is equally divided by 72°, and the nodes are arranged on the intersections of the bisector of each angle and the circumference (step S 5427). Because nodes n11~n14 are the lowest layer, and there is no connection relationship between the nodes on the same layer, step S 5428 is skipped, and as the links with node n1, a base point is provided at a position not overlapping the already constructed links on the straight line from the center point of the circle of the highest layer to the center point of the circle of the layer concerned, and the base point and each node are connected by straight lines (step S 5429). FIG. 69 shows the processing up to this point, and here an example is shown in which e1 is the base point.

Figure 70:
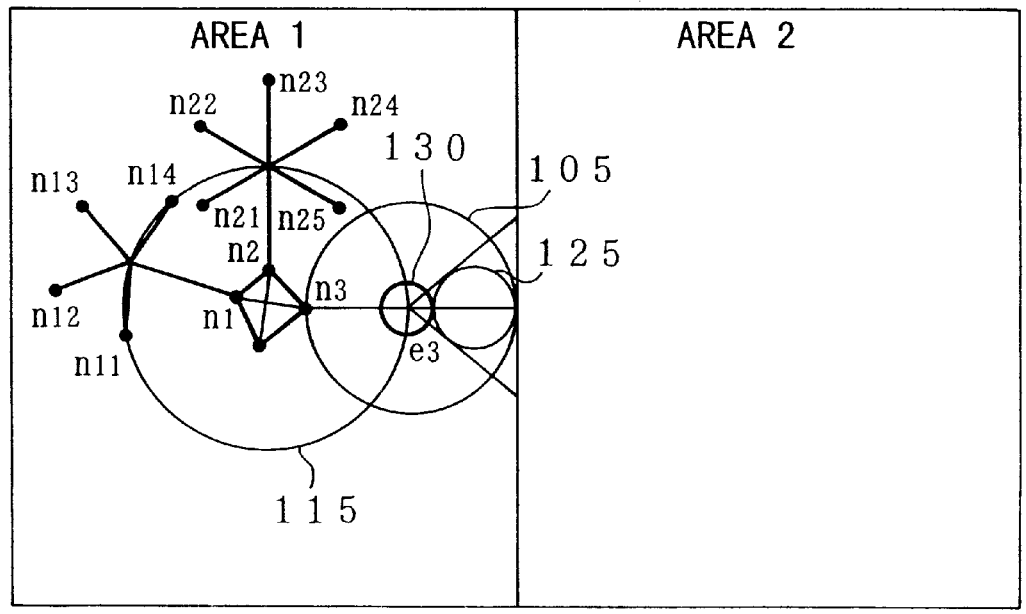
FIG. 70 is an explanatory drawing showing the construction for an arrangement circle of the second layer nodes having lower layers in the sixth embodiment.

For nodes n21~n25 of the second layer under the node n2 as well, processing is carried out in the same manner as for the nodes of the second layer under the above-described node n1. The result is shown in FIG. 70.

Next, for the nodes n31~n34 of the second layer under node n3, first, the inscribed circle 105 whose center is point e3 and inside the extensions of the partition angle of node n3 is made the display area of these nodes (step S 5421). Fictitious node n0 is added as the first node, and the partition angles of each node are weighted according to the number of nodes of the lowest layer of each node n31~n34 as 1, 2, 2, and 2 (step S 5422). Because the largest is 2, the largest partition angle is calculated as 360°×(2/(1+2+2+2+2))=80° (step S 5423). Next, because nodes n31~n34 are not the lowest nodes (step S 5424), an area is constructed divided by the 80° angle which is the bisector of the straight line having the shortest distance from the center point e3 of the circle to the border of the display area, and the inscribed circle of this area is constructed (step S 5425). The circle whose radius is the distance from the point e3 to the constructed inscribed circle is constructed as the node arrangement circle (step S 5426). FIG. 70 shows the processing up to this point, and 125 is the inscribed circle of the area, 130 is the node arrangement circle.

Figure 71:
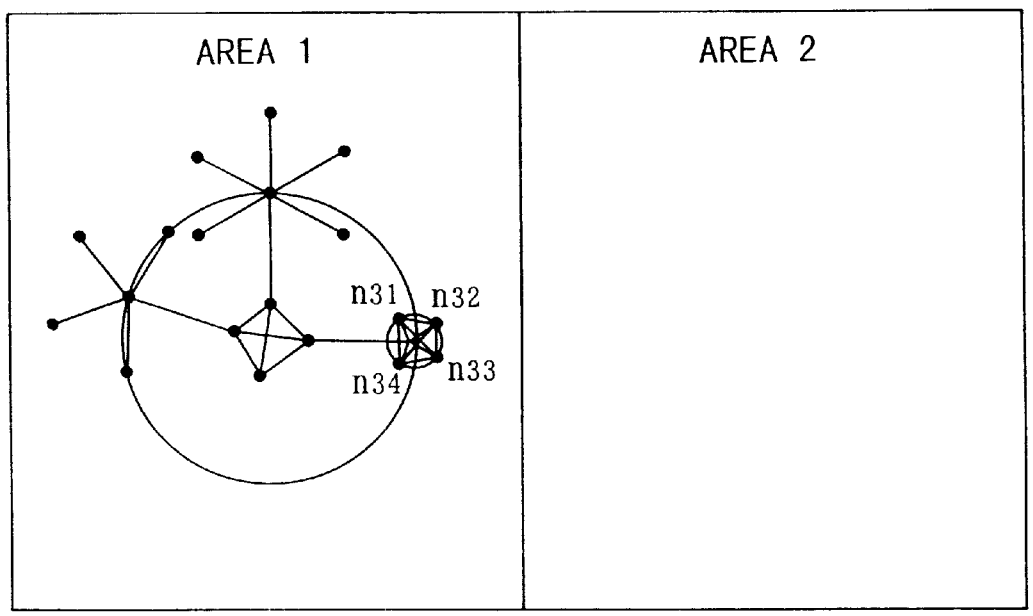
FIG. 71 is an explanatory drawing of the construction of links and node arrangements of the second layer nodes having lower layers and connections with another hierarchical structure in the sixth embodiment.

Next, the fictitious node n0 is arranged at a position on the upper node arrangement circle 110, and according to the weighting of the relevant node arrangement circle 130, the circle is partitioned at 40°, 80°, 80°, 80°, and 80° in such a way that the intersections between the bisector of the partition angle of the node n32, as an upper node of the node connected with the other hierarchical structure and the circumference, are made the shortest distance to the other display area. Then the nodes n21~n34 are arranged on the intersections of each bisector of the angles and the circumference (step S 5427). Next, these nodes are connected with straight lines, and the links are constructed (step S 5428). Further, as a link with node n3, a base point is provided at a position not overlapping the links already constructed on the line from the center point of the circle of the highest layer to the center point of the circle of the layer concerned, and this base point and each link is connected by straight lines (step S 5429). FIG. 71 shows the processing up to this step.

Figure 72:
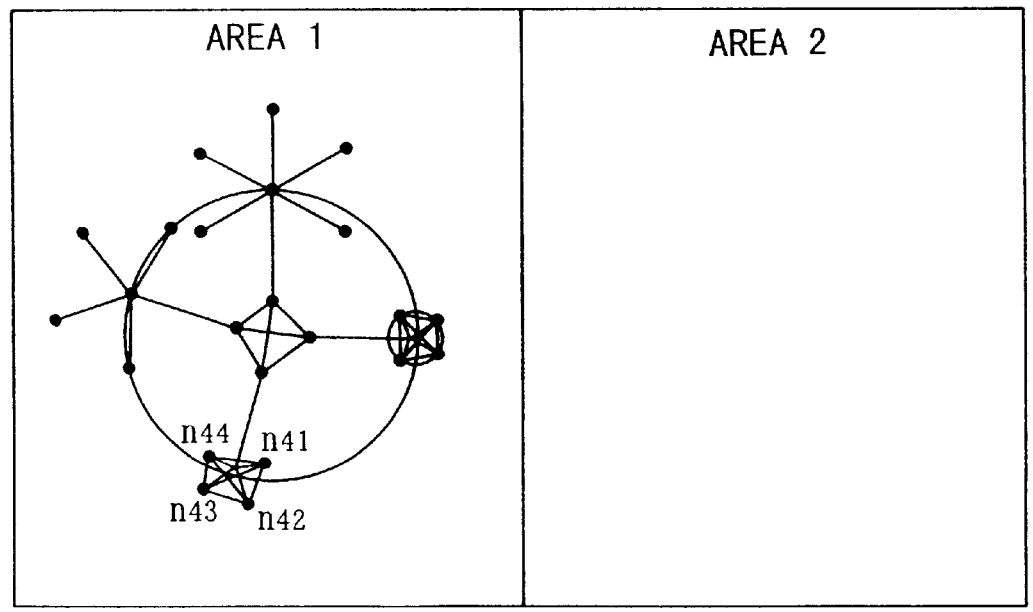
FIG. 72 is an explanatory drawing of the construction of links and the arrangement of second layer nodes having lower layer nodes in the sixth embodiment.

Similarly, for the nodes n41~n43 of the second layer under node n4, the nodes of the second layer under the above-mentioned node n3 are processed in the same way. However, for nodes n41~n43, because there are no nodes connecting to the other hierarchical structure, it is not necessary to consider the arrangement position of the nodes. FIG. 72 shows the processing up to this point.

Figure 73:
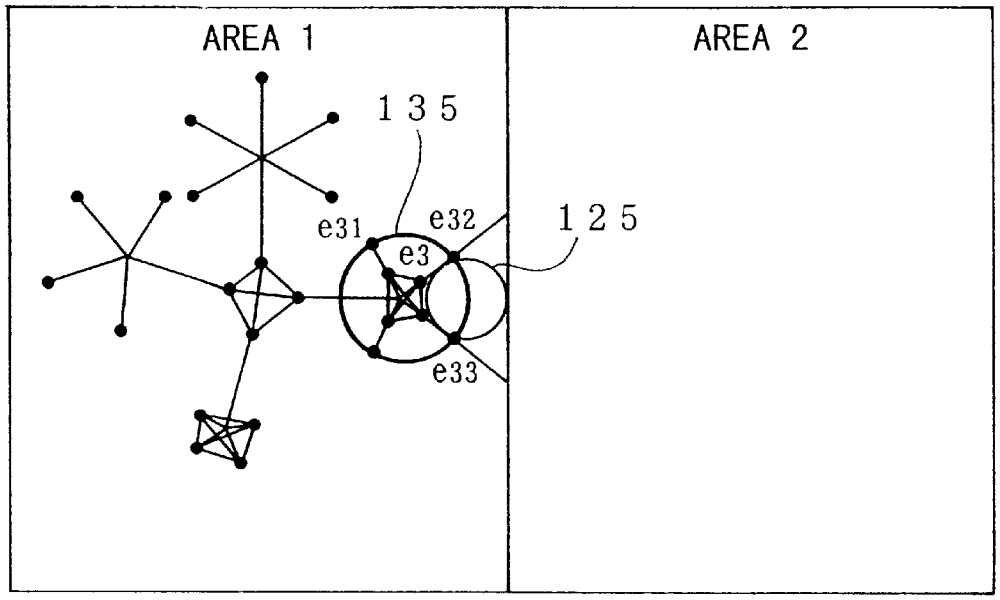
FIG. 73 is an explanatory drawing of the determination of the center points of the third layer node arrangement circle in the sixth embodiment.

Next, for the nodes of the third layer under the nodes n31~n34, a circle is constructed whose radius is the distance from the center point e3 of the upper layer node arrangement circle to the center of the inscribed circle constructed when finding the node arrangement circle 130 of the upper layer, and the points where the extensions of straight lines from the point e3 connecting each node of the upper surface are each made e31~e34, and the center point of the circles on which the nodes under each of the upper layers are arranged is determined (step S 5041). FIG. 73 shows this, and 135 is a circle whose radius is the distance from the center point e3 to the center of the inscribed circle 125.

Figure 74:
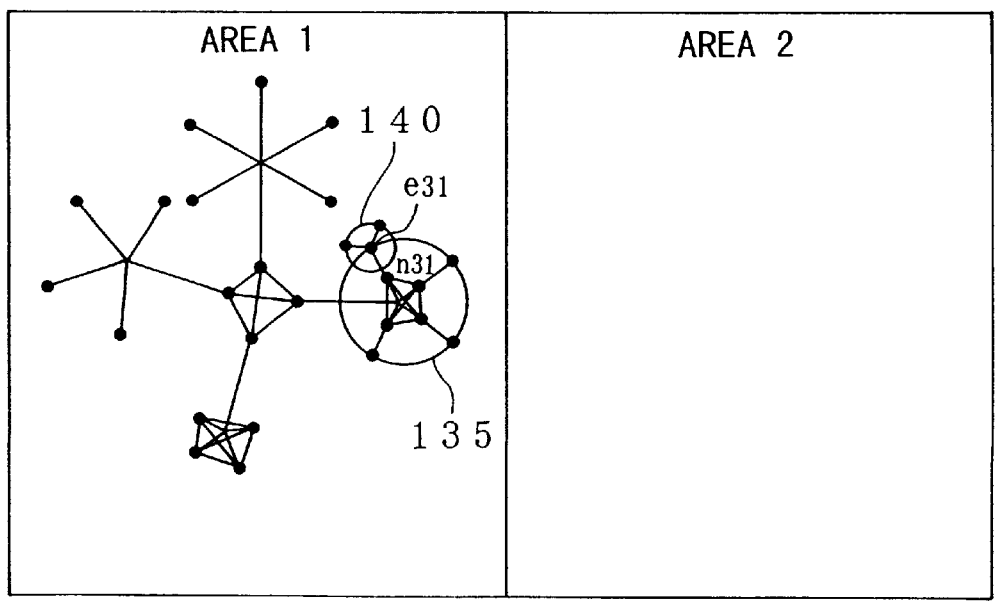
FIG. 74 is an explanatory drawing of the construction of links and the arrangement of third layer nodes in the sixth embodiment.

Next, for the nodes of the third layer under the node n31, first, the inscribed circle whose center is point e31 and is between the extensions of the partition angle of node 31, is made the display area (step S 5421). In FIG. 74, this inscribed circle is 140. Because the nodes of this third layer have no lower layer, a fictitious node is added to the 2 nodes, and the partition angle is equally divided by 3 (step 5422). Therefore, each partition angle is 360°/(2+1)=120° (step S 5423). Next, because the nodes of this third layer are the lowest layer (step S 5424), the circle 140 of this display area becomes the node arrangement circle (step S 5426). This node arrangement circle is divided equally by 120°, and nodes are arranged on the intersection of the bisector of each angle and the circumference (step S 5427). Because these third layer nodes are the lowest layer, and there are no connection relationships with other nodes of the same layer, step S 5428 is skipped, and as a link with node n31, a base point is provided at a position not overlapping with already constructed links on a straight line from the center point of the circle of the highest layer to the center point of the circle of the layer concerned, and this base point and each node are connected with straight lines (step S 5429). FIG. 74 shows the processing up to this point.

Figure 75:
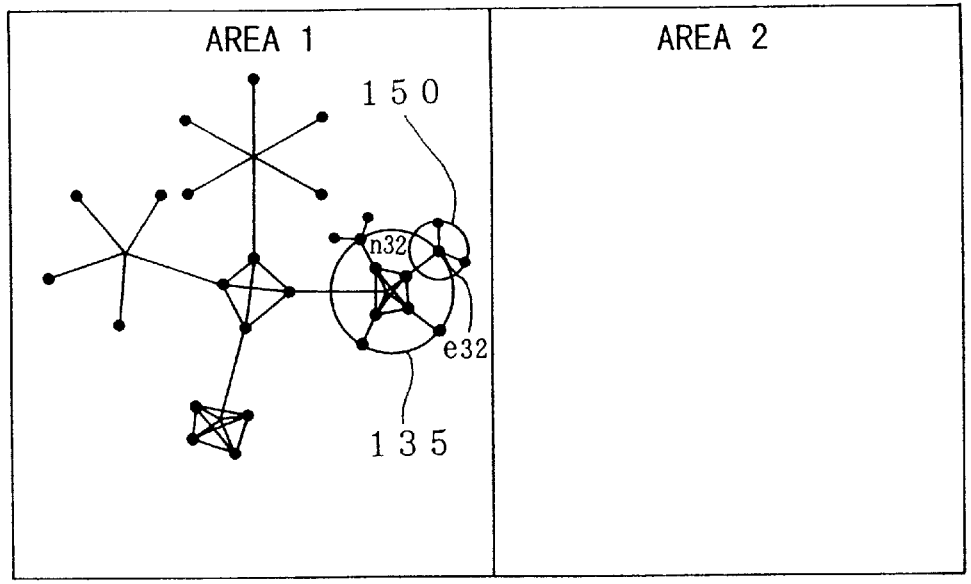
FIG. 75 is an explanatory drawing of the construction of links and the arrangement of third layer nodes having connections with other hierarchical structures in the sixth embodiment.

For the nodes of the third layer under node n32, first, an inscribed circle whose center is point e32 and is between the extensions of the partition angle of node n32 is made the display area of these nodes (step S 5421). In FIG. 75, this inscribed circle is denoted by 150. Here as well, because there is not a lower layer, the fictitious node n0 is added to the number of nodes, 2, and the partition angle is divided into three equal parts (step S 5422). Therefore, each partition angle will be 360°/(2+1)=120° (step S 5423). In addition, because it is a lowest layer (step S 5424), this circle 150 of this display area is made the node arrangement circle (step S 5426). Each node arrangement circle 150 is equally divided by 120°, and nodes are arranged on the intersections of the bisectors of each angle and the circumference in such a way that the nodes connecting to the other hierarchical structure are the shortest distance to the other display area (step S 5427). Additionally, step S 5428 is skipped, and as a link with node n32, a base point is provided at a position not overlapping the already constructed links on a line from the center point of the circle of the highest layer to the center point of the circle of the layer concerned, and the base point and each node are connected with straight lines (step S 5429). FIG. 75 shows the processing up to this step.

Likewise, for the nodes of the third layer under the nodes n33~n34, and nodes n41~n43, the nodes of the third layer under nodes n31 are processed in the same way.

Figure 76:
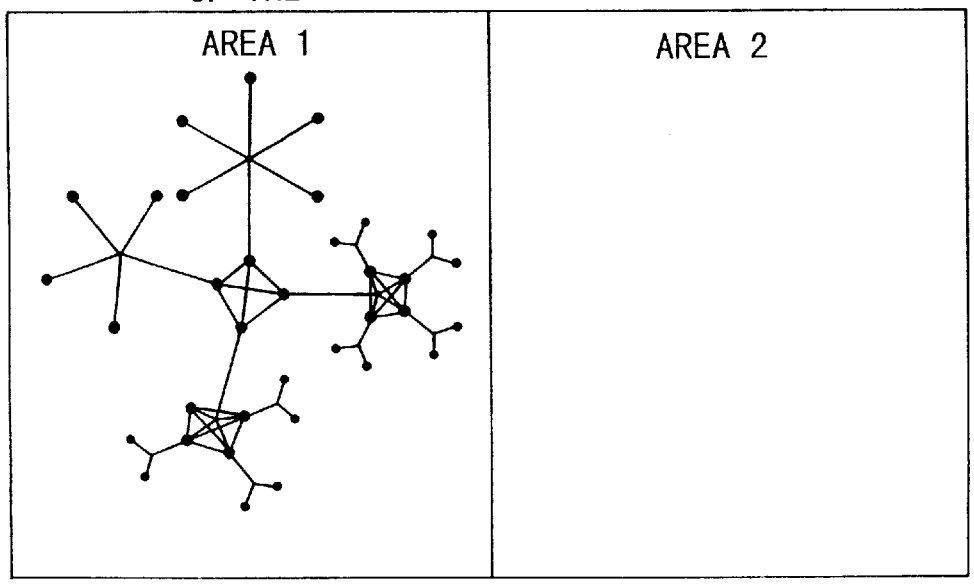
FIG. 76 is a drawing showing an example of a graphic display corresponding to one of the hierarchical structures in the sixth embodiment.

As a result, for the hierarchical structure on the left side of FIG. 64, the multi-layer image as shown in FIG. 76 is constructed.

Figure 77:
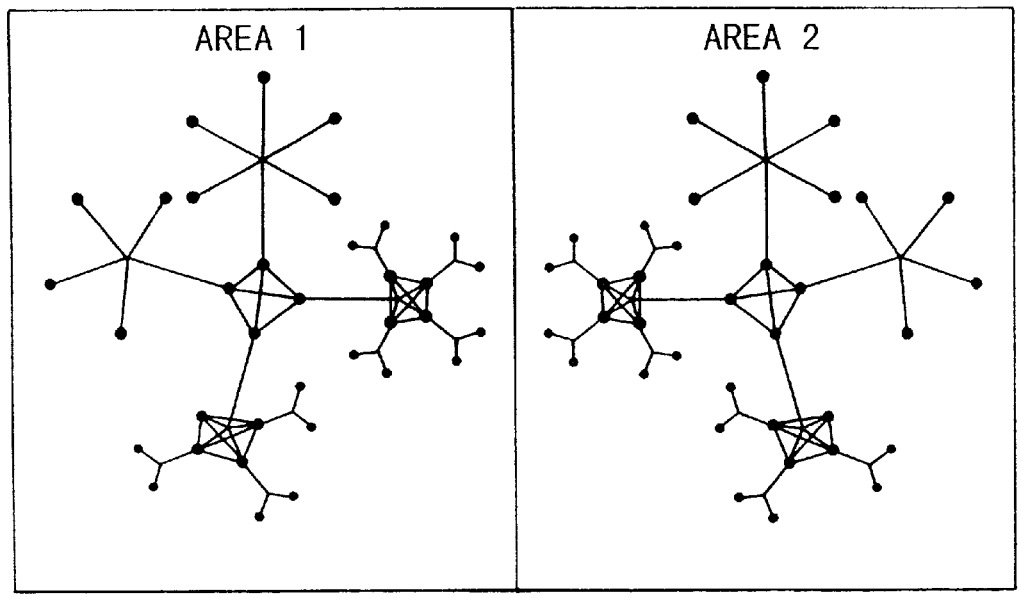
FIG. 77 is a drawing showing an example of graphic display corresponding to each hierarchical structure in the sixth embodiment.
Figure 78:
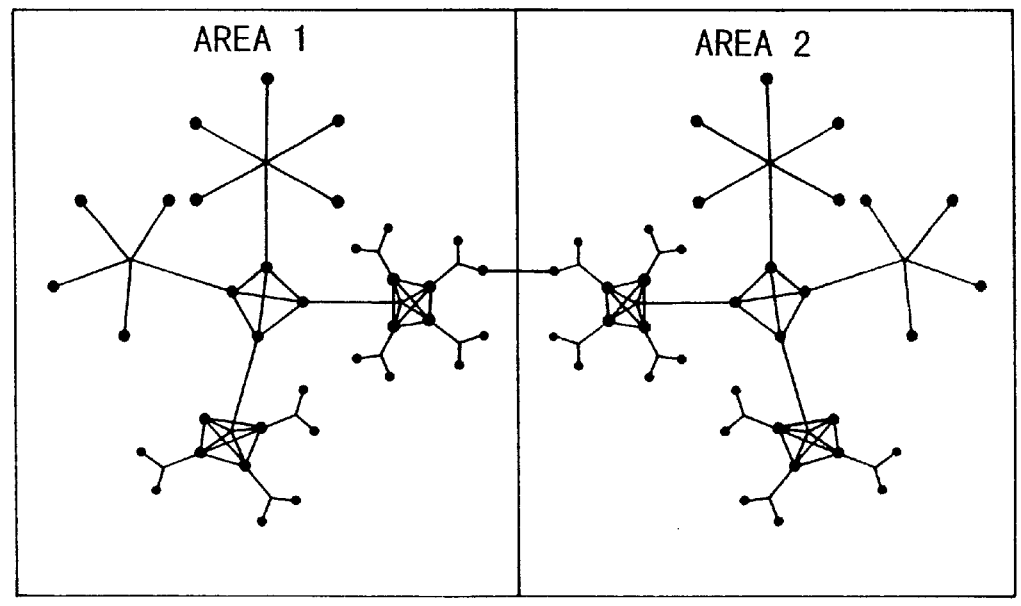
FIG. 78 is a drawing showing an example of graphic display of the final composite hierarchical structure in the sixth embodiment.

Continuing the process, the other hierarchical structures are processed in the same manner. For the hierarchical structures on the left and right of FIG. 64, the multi-layer images such as those shown in FIG. 77 are constructed. Finally, the nodes connecting both hierarchical structures are connected with straight lines (step S 5070). In this manner, for the composite hierarchical structure such as that shown in FIG. 64, the hierarchical structure is completed as shown in FIG. 78.

In the explanation of the above-described embodiment, in the hierarchical structure data storage unit 20 of FIG. 1, a hierarchical structure such as that shown in FIG. 64 was stored, but the structure of the data is arbitrary, and the two hierarchical structures need not have the same structure. Also, there need not be any connection relationships between the nodes of the same layer under the same node of the upper layer.

Furthermore, the display area was a rectangle, and in the partition of the display area (step S 5030), the display area was equally partitioned by a straight line parallel to this rectangle, but the method of partitioning the display area is arbitrary, and can be divided at an angle, and need not be equal.

Furthermore, in the display processing of the nodes under the same node of the upper layer (step S 5042), in determining the display area (step S 5421), the point determined in the determination of the center point of the node arrangement circle (step S 5041) is made the center point, an inscribed circle is constructed between the extensions of the partition angle of the upper layer nodes, and this inscribed circle was made the display area, but is it also possible that the area in the extensions of the partition angles of the upper layer nodes in its entirety is made the display area. In the weighting of the partition angles (step S 5422), weighting was carried out according to the number of nodes of the lowest layer of each node, but the proportions of the weightings are arbitrary. Additionally, not only the lowest layer, but also the weighting, can be carried out by the number of nodes of all the lower layers. In the case that there is no lower layer, the partition angles are evenly spaced, but they can also be arranged according to the display area, and not evenly spaced, In the calculation of the partition angle (step S 5423), for the partition angle a° of the upper layer nodes, the largest value of the partition angle is (90+a/2)°, but the largest value set is arbitrary. In the construction of the node arrangement circle (step S 5426), a circle is constructed whose radius is the distance from the center point of the node arrangement circle to the contact with the inscribed circle, but a circle with a smaller radius is also possible. In the lowest layer, the circle of the display area found in the determination of the display area (step S 5421) was made the node arrangement circle, but a circle with a smaller radius is also possible. In the arrangement of the nodes (step S 5427), the nodes were arranged on points where the bisector of the partition angle of each node intersects the node arrangement circle, and nodes connected with other hierarchical structures or those upper nodes are arranged in positions that are the shortest distance from the other display area, but when the other hierarchical structure is already constructed, they can be arranged on the position which is the shortest distance from the nodes having a connection relationship with the other hierarchical structure. In constructing links of the nodes of the same circle (step S 5428), the links connect nodes with a straight line, but the links between nodes positioned adjacently on the circumference can also use arcs. In constructing the links with the upper layers (step S 5429), a base point is provided on a position not overlapping already constructed links on a straight line from the center point of the circle of the upper layer to the center point of the circle of the layer concerned, and this base point and each node are connected with straight lines, but the base point need not be on a straight line from the center point of the circle of the upper layer to the center point of the circle of the layer concerned.

In constructing the links between other hierarchical structures (step S 5070), nodes having connections with different hierarchical structures are connected with a straight line, but curves which minimize overlap between other nodes and links can be used to connect them.

Additionally, in the above-mentioned embodiments 1 through 5, when two hierarchical structures are connected, a graphical display of the hierarchical structure indicated in the present embodiment can be adopted.

As explained above, according to the invention shown in embodiment 6, when graphically displaying hierarchical structures, the nodes in the same layer can be arranged radially using circles constructed according to determined rules, and by displaying nodes of lower layers having a high number of nodes distributed on further outside circles, the advantage is obtained that the roughness is decreased, and the nodes and links are displayed in a manner easy to view, and by making the nodes of the connecting parts of two hierarchical structures close, the advantage is obtained that overlapping links can be avoided, and the nodes and links can be easily manipulated by direct command on the screen.

Seventh Embodiment

Using data stored in the hierarchical structure data storage unit 20, the data display processing unit 30 of the present embodiment calculates the arrangement positions of the nodes for each layer and the distribution of links connecting nodes is carried out, and the displayed on display 40 via the controller 50.

The method of graphical display of hierarchical structures of the present embodiment relates, in particular, to connecting each node of the lower layers by branching the links showing the horizontal relationships of radially arranged nodes corresponding to the layers at positions not overlapping with other link displays, when displaying of links of hierarchical structures between radially arranged nodes.

Figure 79:
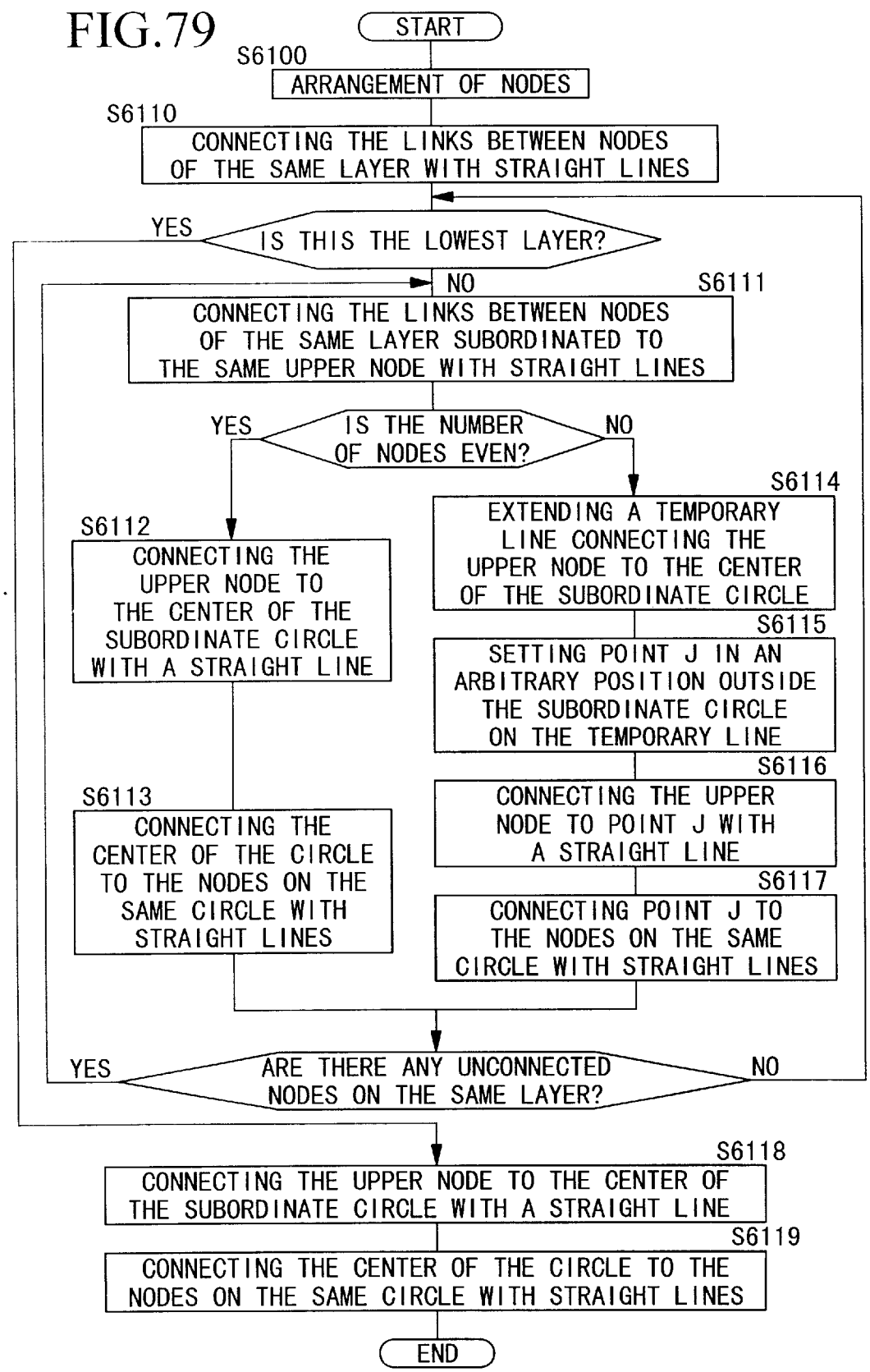
FIG. 79 is a flowchart showing the processing sequence of the data display processing unit in the seventh embodiment.

FIG. 79 is a flowchart showing an embodiment of the processing sequence of the present embodiment in the data display processing unit 30. Below, based on FIG. 79, an embodiment of the link display processing of the hierarchical structure according to the present invention is explained in detail.

Moreover, in the explanation of the example of operation in the flowchart shown in FIG. 79 in the present embodiment, FIG. 80 to FIG. 84 are used, and even if the reference numerals used from FIG. 80 to FIG. 84 are the same as those used in other diagrams, within the range of FIG. 80 to FIG. 84, they denote the same items, and have no relationship to the reference numerals of the other figures.

Figure 80:
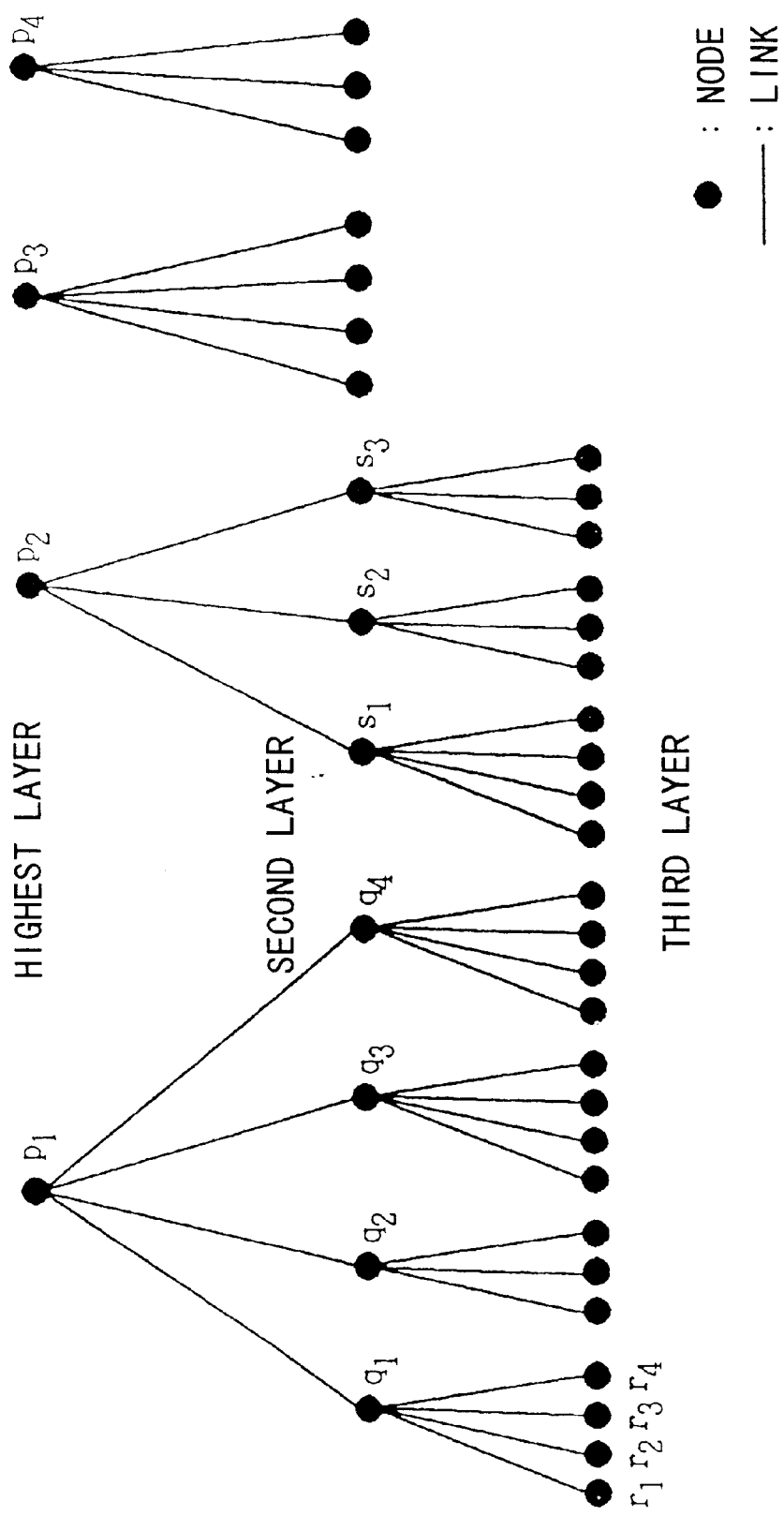
FIG. 80 is a drawing showing an example of the multi-layer data stored in the multi-layer data storage unit by tree display in the sixth embodiment.

In the hierarchical structure data storage unit 20, the data for a hierarchical structure such as that shown in FIG. 80 is stored. In FIG. 80, for ease of understanding, the hierarchical structure data stored in the hierarchical structure data storage unit 20 is displayed as a tree.

<Node Arrangement:>

Figure 81:
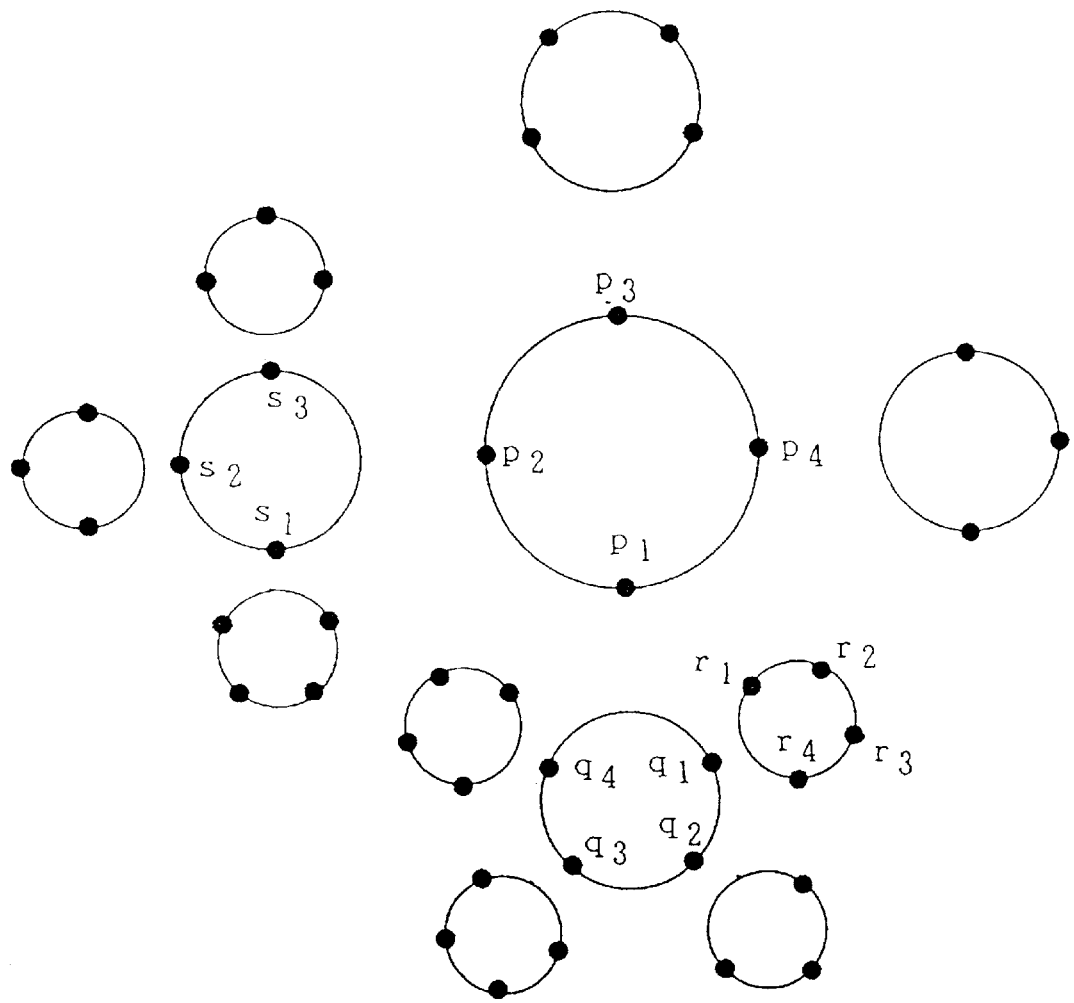
FIG. 81 is a drawing of the hierarchical structure data of FIG. 80 with nodes arranged radially on circles.

In the data display unit 30, first, from the hierarchical structure data storage unit 20 a hierarchical structure such as that shown in FIG. 80 is input, and as shown in FIG. 81, the node circle of the highest layer is nearly in the center, the node circle of the lower layers are arranged radially outside the node circle of the highest node circle, and the nodes included in the same layer are arranged on the same circle (step S 6100). At this time, the horizontal relationships between the nodes are such that the nodes of the lower layers arranged on the same circumference outside the nodes of the highest layer are all under the same node of the higher layer. For example, nodes q1~q4 arranged on the same circumference outside of node p1 are under p1, and the nodes r1~r4 are arranged on the same circumference outside the node q1 under node q1.

Because this kind of radial node arrangement has been explained in detail in the above-described first embodiment and second embodiment, its explanation will be omitted here. The nodes included in the highest layer are arranged, equally spaced using equally divided partition angles calculated from the number of nodes included in the relevant layer, on the circumference of a circle drawn using the center point of the display area, and the nodes of the second layer and below are arranged in the same manner on a circle outside the above-mentioned circle. Moreover, the radius of the circle on which the nodes of each layer are arranged can be calculated based on the number of layers in the lower layers or the number of nodes in the lower layer, and in addition, in the same manner, the positions at which the nodes of each layer are arranged on the same circumference can be determined using the partition angle calculated from the number of layers or number of nodes of the lower layer of each node.

<Link connection:>

Next, in the data display processing unit 30, the distribution processing for the links between each node is carried out. Here, as connection relationship within the same layer, the nodes under the same node of the higher layer all have a connection relationship except the lowest layer.

First, the links between nodes p1, p2, p3, and p4 of the upper layer are all connected with straight lines (step S 6110).

Figure 82:
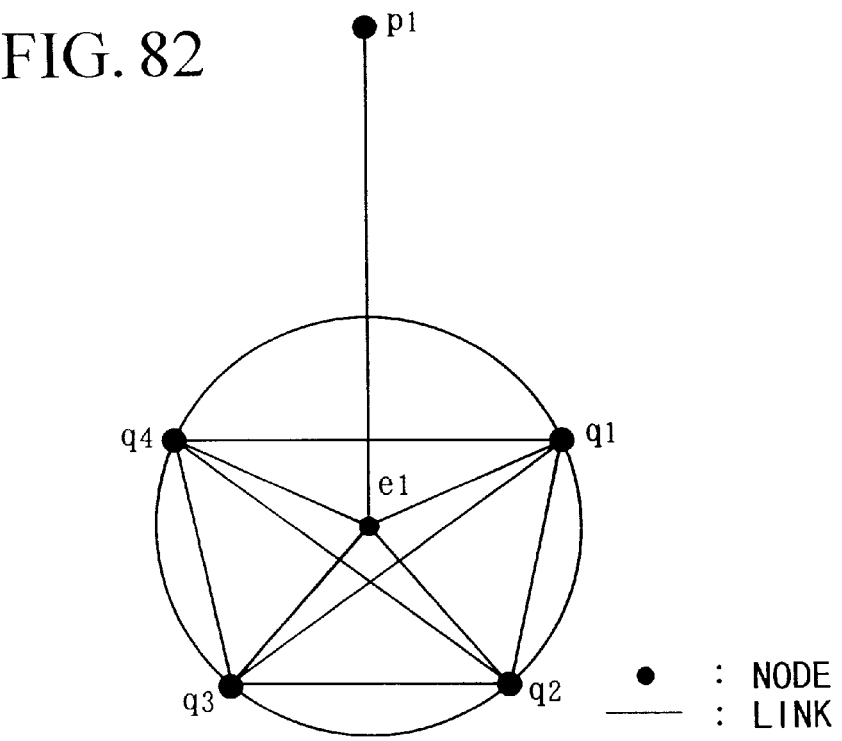
FIG. 82 is a drawing showing an example of the link display for the even numbered nodes of the second layer in the seventh embodiment.

Next, for the second layer, first, for nodes q1, q2, q3, and q4 on the second layer subordinate to node p1 of the highest layer, link distribution is carried out. Here, because nodes q1~q4 are not lowest nodes, for the links connecting the relevant node q1, q2, q3, or q4, all are connected with straight lines (step S 6111). Also, because nodes q1~q4 are even numbers, for the links connecting node p1 of the upper layer to the relevant node q1, q2, q3, and q4, as shown in FIG. 82, first, a straight line is extended from the node p1 to the center e1 of the circle on which nodes q1, q2, q3, and q4 are arranged (step S 6112), and next, point e1 is made a base point, straight lines extended to nodes q1, q2, q3 and q4, and the links connected (step S 6113).

Figure 83:
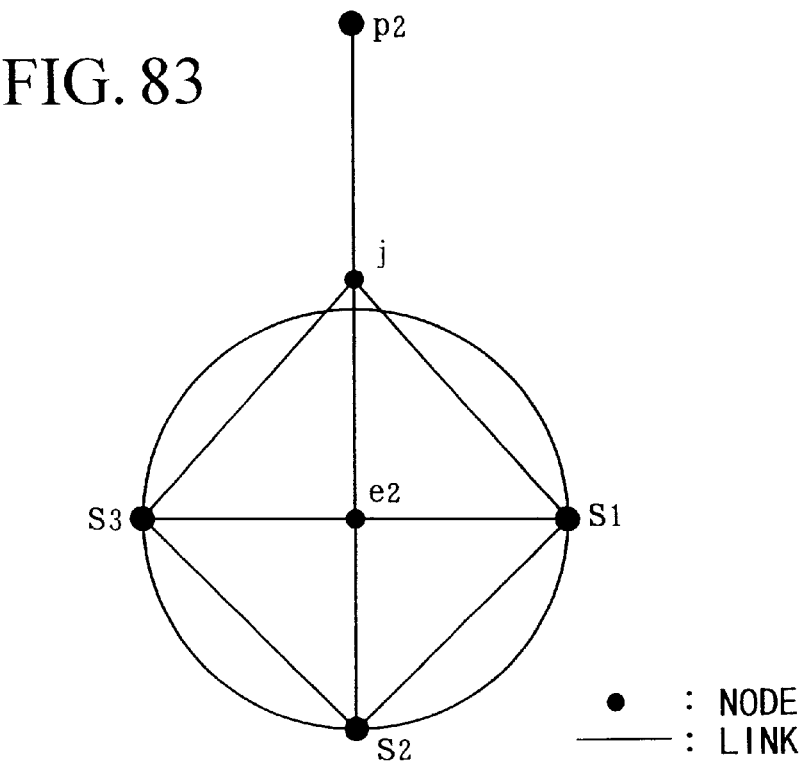
FIG. 83 is a drawing showing an example the link display for the odd numbered nodes of the second layer in to the seventh embodiment.

Next, the link distribution is carried out for nodes s1, s2, and s3, which are on the second layer subordinate to node p2 of the highest layer. Because nodes s1~s3 are not the lowest layer, each of the relevant nodes s1, s2, and s3, are all connected with straight lines (step S 6111). Furthermore, for the links connecting node p2 of the upper layer with the relevant node s1, s2 and s3, because nodes s1~s3 are odd numbered, as shown in FIG. 83, a supplementary line connecting node p2 of the upper layer to the center e2 of the circle on which the nodes s1, s2, and s3 are arranged (step S 6114). On this line, at an arbitrary position on the section from the node p2 to the contact with the circumference arranging nodes s1, s2 and s3, point j is set (step S 6115). And a straight line connects node p2 of the upper layer with point j (step S 6116), and a straight line is extended from point j to each node s1, s2, and s3, and links are connected (step S 6117).

Below, the nodes on the second layer subordinate to nodes p3 and p4 of the highest layer connect links in the same manner.

Next, for the third layer, first, the link distribution is carried out for the nodes r1, r2, r3, and r4 on the third layer subordinate to node q1 of the second layer and having an upper layer Here, because nodes r1~r4 are the lowest layer, a link connecting each node r1, r2, r3, and r4 is unnecessary. For the links connecting node q1 of the upper layer and the relevant node r1, r2, r3, or r4, a straight line is extended from node q1 to the center of the circle subordinate to the relevant node r1, r2, r3, or r4 (step S 6118), the center of this circle is made a base point, a straight line is extended of reach node r1, r2, r3, and r4, and they are connected with a link (step S 6119).

Below, the nodes included in the third layer subordinate to each node of the second layer are connected by links in the same manner.

Figure 84:
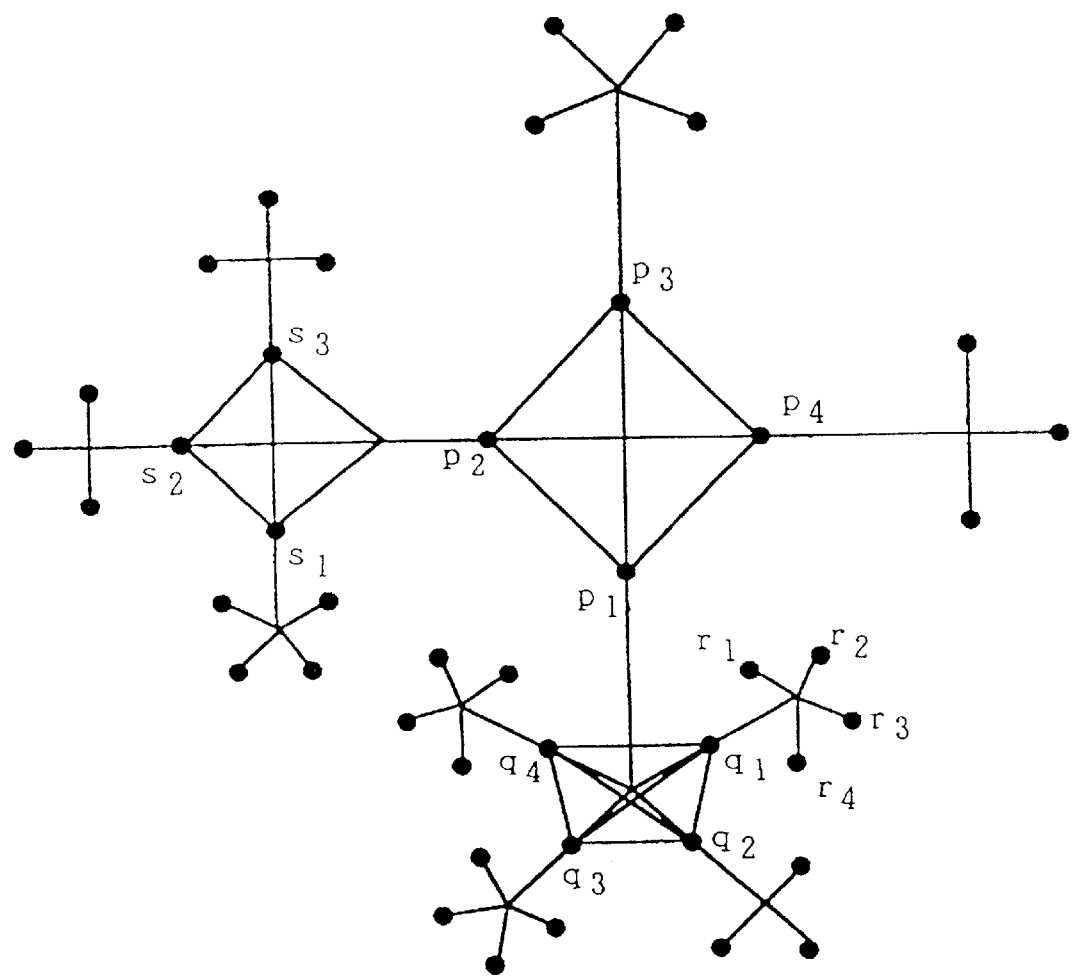
FIG. 84 is a drawing showing an example of the processing results for the hierarchical structure data of FIG. 80 in the seventh embodiment.

By the above processing, the link display of the tree of the hierarchical structure shown in FIG. 80 takes the form shown in FIG. 84.

Moreover, in the explanation of the above-described embodiments, in the hierarchical structure data storage unit, data related to a hierarchical structure such as that in FIG. 80 is stored, but the stored data structure is arbitrary.

In addition, in the flow of link distribution processing of the present embodiment in the multi-layer transformation unit carries out shift-processing of the base point only when the number of nodes is odd, but this is not limited to an odd number, and the processing can be carried out in the same manner when the number is even.

Furthermore, while not mentioned in the above described embodiment, the links between nodes of the same layer and the links of nodes of upper and lower layers can be shown to be of different colors and thicknesses.

Additionally, in the first through sixth embodiments described above, when branching a straight line issuing from the upper node to each node of the lower layer at a position not overlapping with other link displays and connecting it to each node of the lower layer, the graphical display of the hierarchical structure shown in the present embodiment can be applied.

As described above, according to the invention shown in the seventh embodiment, when the link display of a hierarchical structure of nodes is arranged radially, by connecting the links showing the horizontal relationships of nodes radially arranged corresponding to the layer to each node of the lower layer, and branching them at positions not overlapping with other link displays, even in a large scale hierarchical structure having from hundreds to about a thousand nodes, it has the advantage that the spaces between links can be widened and made easily viewed, in addition to the links being easily manipulated on the screen.

<Detailed structure of the data display processing unit 30:>

Figure 85:
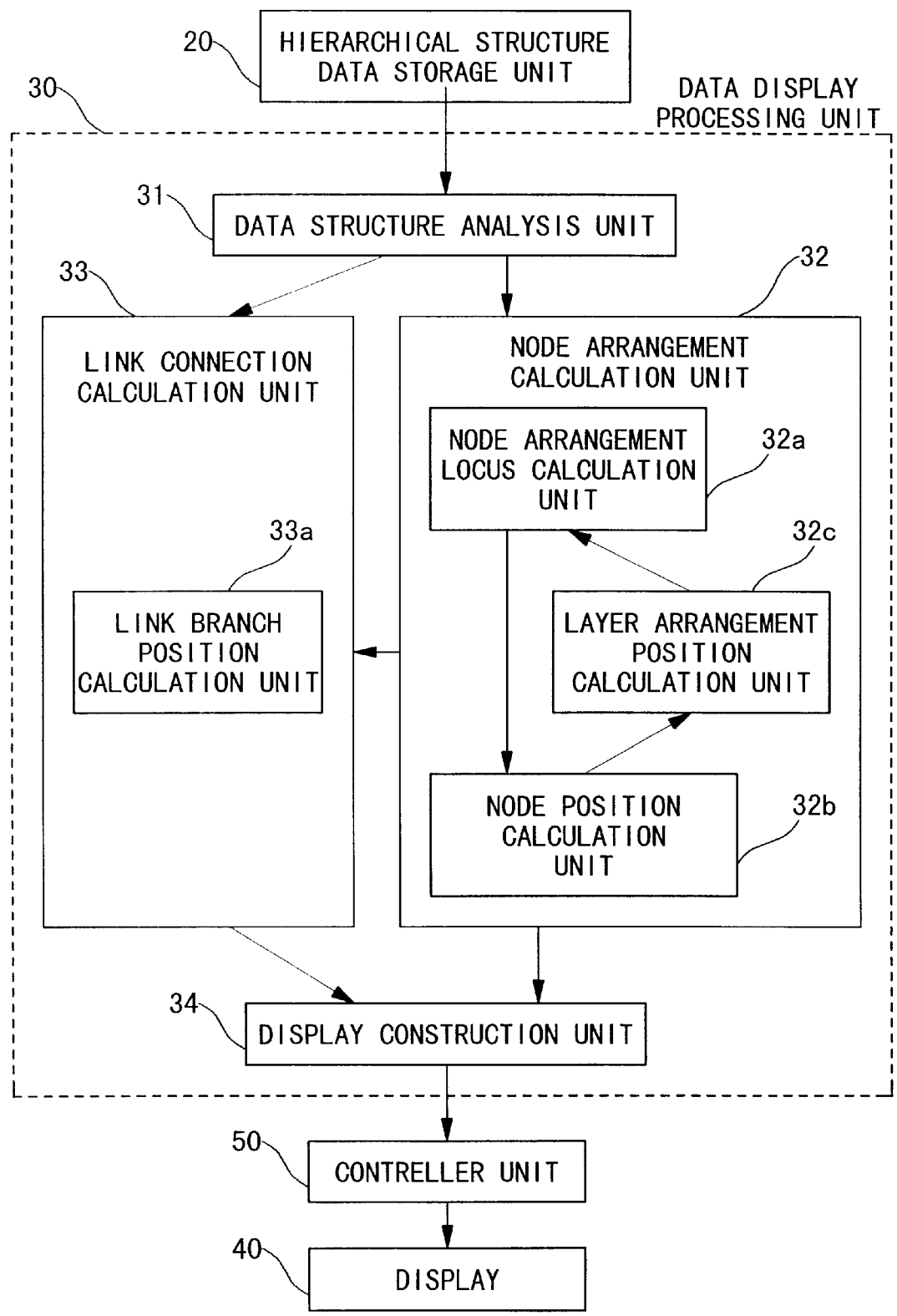
FIG. 85 is a drawing showing in detail the structure of the data display processing unit 30 in FIG. 1.

FIG. 85 is a more detailed structural diagram of the data display processing unit 30 characterizing the present invention in FIG. 1. Below, using FIG. 85, a more detailed explanation of the data display processing unit 30 will be made. Moreover, in FIG. 85, the same reference numeral is attached to the parts corresponding to the parts in FIG. 1.

From FIG. 85, the data display processing unit 30 is formed from a data structure analysis unit 31, a node arrangement calculation unit 32, and a link distribution calculation unit 33, and a display construction unit 34.

In addition, the data structure analysis unit 31 inputs data related to the hierarchical structure of the apparatus or function corresponding to the branch point, relay point, or end point, from the hierarchical structure data storage unit 20, and analyses it. The node arrangement calculation unit 32 arranges nodes of the same layer subordinate to the same node on the same ellipse according to the results of the analysis of the data structure analysis unit 31, and calculates the node arrangement position by arranging the ellipses of the same lower level on the outside the ellipse of the upper layer. The link distribution calculation unit 33 calculates the link distribution showing the connection relation between nodes from the results of analysis of the data structure analysis unit 31 and the node arrangement position of the node arrangement calculation unit 32. In addition, the display construction 34 used the results of the calculation from the node arrangement calculation unit 32 and the link connection calculation unit 33 to generate the image for output to the display 40. Moreover, the image generated by the display construction unit 34 is displayed on display 40 via the controller 50. Here, as a display apparatus, display 40 is given as an example, but it is not limited to this, and a printing apparatus such as a computer printer, for example, could also be used.

Furthermore, the node arrangement calculation unit 32 is constructed from the node arrangement locus calculation unit 32*a*, the node position calculation unit 32 which determines the positions arranging the nodes, and the layer arrangement position calculation unit 32*c* which carried out calculation of the arrangement positions of each layer. Because the data stored in the hierarchical structure data storage unit 20 generally becomes a plurality of layers and a plurality of nodes, until the display processing ends, processing is carried out in sequence by the node arrangement locus calculation unit 32*a*, the node position calculation unit 32*b*, and the layer arrangement position calculating unit 32*c*. At this time, the result calculated in each part is used in the processing of the next part.

In addition, the link connection calculation unit 33 causes straight lines issuing from the nodes of the upper layers to branch at positions not overlapping with other links, and the link branching calculation unit 33*a* connecting each node of the lower layers is provided.

Next, the flowchart showing the operation of the data display processing unit 30 used in explaining the embodiments 1 through 7 explains the operation of the parts shown in FIG. 85. Moreover, the flowchart showing the operation of the data display processing unit 30 used in the explanation of embodiments 1 through 7 is mainly related to the node arrangement calculation unit 32 and the link connection calculation unit 33.

In the flowchart in the first embodiment shown in FIG. 4, the correspondences between each step and the processing unit are as follows. Steps S 1101 to S 1103 are carried out by the data structure analysis unit 31, and the other steps are carried out by the node arrangement calculation unit 32. Moreover, steps S 1104, S 1107, S 1108, S 1111, and S 1112 are carried out by the node arrangement locus calculation unit 32*a*, S 1105, S 1109, and S 1113 are carried out by the node position calculation unit 32*b*, and the steps S 1106 and S 1110 are carried out by the layer arrangement position calculation unit 32*c*.

The correspondences in the flowchart in the second embodiment shown in FIG. 26 is as follows. Steps S 2110 and 2120 are carried out by the data structure analysis unit 31, and the other processing is carried out by the node arrangement calculation unit 32. In addition, in the arrangement of the highest layer in FIG. 26, steps S 2130 to S 2160 are carried out by the node arrangement locus calculation unit 32*a*, and the step S 2170 is carried out by the node position calculation unit 32*b*. In addition, in the arrangement of the nodes of the second layer, Step S 2180 is carried out by the node arrangement position calculation unit 32*c*, steps 2190 to 2230 are carried out by the node arrangement locus calculation unit 32*a*, and the step S 2240 are carried out by the node position calculation unit 32*b*. Also, in the arrangement of the nodes of the third layer, step S 2260 is carried out in the layer arrangement position calculation unit 32*c*, steps S 2270 to S 2280 are carried out in the node arrangement locus calculation unit 32*a*, and step S 2290 is carried out in the node position calculation unit 32*b*. Moreover, the condition decisions S 2250 and S 2300 are carried out by the node arrangement calculation unit 32, which comprises the node arrangement locus calculation unit 32*a*, the node position calculation unit 32*b*, and the layer arrangement position calculation unit 32*c*.

The correspondences in the flowchart in the third embodiment shown in FIG. 32 are as follows. Steps S 3210 and S 3220 are carried out by the data structure analysis unit 31. In addition, steps S 3239 to S 3240 are carried out by the link connection calculation unit 33, and the other steps are carried out by the node arrangement calculation unit 32.

The correspondences in the flowchart in the fourth embodiment shown in FIG. 43 are as follows. Steps S 3110 and S 3120 are carried out by the data structure analysis unit 31. In addition, steps S 3137, and steps S 3148 and S 3149 are carried out by the link connection calculation unit 33, and the other steps are carried out by the node arrangement calculation unit 32.

The correspondences in the flowchart in the fifth embodiment shown in FIG. 53 are as follows. Steps S 4010 is carried out by the data structure analysis unit 31. In addition, step S 4060 is carried out by the link connection calculation unit 33, and the other steps are carried out by the node arrangement calculation unit 32.

The correspondences in the flowchart in the sixth embodiment shown in FIG. 63 are explained as follows. Steps S 5010 and S 5020 are carried out by the data structure analysis unit 31. In addition, steps S 5428 and 5429, and step S 5070 are carried out by the link connection calculation unit 33, and the other steps are carried out by the node arrangement calculation unit 32.

The correspondences in the flowchart in the seventh embodiment shown in FIG. 79 are as follows. Step S 6100 is carried out by the node arrangement calculation unit 32. In addition, the other steps are carried by the link branch position calculation unit 33*a* in the link connection calculation unit 33.

By using the graphical display apparatus of the hierarchical structure which includes this data display processing unit 30, on a limited area, a multiplicity of nodes can be automatically arranged without overlap.

Moreover, the program for realizing the graphical display of the hierarchical structure in the data display processing unit 30 in FIG. 1 can be recorded on a computer readable recording medium such as a CD-ROM, FD, or hard disk, and the programs recorded on this recording medium input into a computer, and by being executed, produce a graphical display of a hierarchical structure.

Using the graphical display methods and apparatuses of a hierarchical structure described above, or by reading a recording medium on which a graphical program for a hierarchical structure is recorded into a computer, for the upper layer nodes the lower layer nodes are arranged on the outside of a concentric ellipse, and in order to arrange the nodes such that their position is on the same ellipse, the display area of the lower layers with many nodes is broadened, and the overlapping of nodes and links will disappear. In addition, because the calculation of the size of the ellipses are based on the hierarchical structure, in a limited display area the nodes of all layers can be displayed at one time. Furthermore, because the arrangement of nodes and the distribution of links is calculated automatically, it can respond instantly to changes in the structure.

Moreover, the graphical display methods and apparatuses for the hierarchical structure explained above display a large scale network construction which is a hierarchical structure as a whole on a limited screen, and when used as a display technology, monitors the condition of the network, and by manipulating the displayed object, changes the structure, and displays the detailed data for each machine. This can be applied a LAN motoring system that detects damage to a LAN and assesses the scale of the damage, a service control system that monitors and controls the quality level of service provided through a LAN, etc. Also, it can be applied to display the connection relations of, for example, internet service providers.

What is claimed is:

1. A computer-implemented graphical method for hierarchical structures, which can display graphically hierarchical structures of nodes from the nodes that are branch points, relay points or end points corresponding to apparatuses or functions and the connection relationships between the nodes, the method comprising the steps of arranging the nodes of the same layer subordinate to the same node on the same ellipse, arranging the subordinate ellipse of the same layer concentrically on an ellipse larger than the ellipse of the upper layer, and displaying the arranged hierarchical structures of nodes.

2. A graphical display method for hierarchical structures according to claim 1 wherein the size of said ellipse changes depending on the number of nodes arranged on said same ellipse.

3. A graphical display method for hierarchical structures according to claim 2 wherein the ratio of the minor axis to the major axis of said ellipse determined corresponding to the ordinate to abscissa ratio of the display area and the length of the minor axis and major axis of the ellipse calculated corresponding to the ratio of the number of nodes arranged on said same ellipse.

4. A graphical display method for hierarchical structures according to claim 1 wherein:

the arrangement of nodes on said same ellipse is changed according to the number of nodes on the lower layer.

5. A graphical display method for hierarchical structures according to claim 4 wherein said arrangement of nodes on the ellipse according to the number of nodes of the lower layer is carried out by the steps of:

partitioning the circumference of the ellipse on which the nodes are arranged corresponding to according to the ratio of the number of nodes of the lower layer subordinate to each node arranged in said same ellipse, and arranging each node on the center point of each partitioned arc.

6. A graphical display method for hierarchical structures according to claim 1 wherein:

the arrangement of the ellipses in said same layer is changed according to the number of nodes arranged in said same ellipse.

7. A graphical display method for hierarchical structures according to claim 6 wherein said arrangement of ellipses of the same layer according to the number of nodes arranged on said same ellipse carried out by the steps of:
- constructing a concentric ellipse larger than the upper layer,
- determining the circumference of said concentric ellipse or a part of the circumference as a locus of the centers of each ellipse upon which nodes are of the same layer arranged,
- partitioning an arc of the locus of the centers according to the ratio of the number of nodes arranged of said each ellipse, and
- determining the center point of the partitioned arc as a center position of each ellipse.

8. A graphical display method for hierarchical structures according to claim 1 wherein said graphical display of the hierarchical structure of the nodes is carried out by:
- determining the ratio of the size of the ellipse of each layer and the ratio of the minor axis and major axis of the ellipses based on the hierarchical structure of the nodes, and determining a size of the ellipses of each layer according to a display area
- constructing ellipse of the first layer based on said determined value,
- constructing the locus of the centers of ellipses of the second layer centered on said ellipse of the first layer, and at a distance where the ellipses of the first layer and the second layer do not overlap,
- constructing ellipses of the second layer centered on the locus for the centers of ellipses of the second layer at a position depending on the number of nodes arranged on each ellipse of the second layer, and whose size is a function of the number of arranged nodes,
- arranging nodes on the ellipses according to the number of nodes subordinate to each node of the second layer, and
- repeating the processing in the same manner as said processing for the third.

9. A graphical display method for hierarchical structures according to claim 1 wherein said ellipse is a circle.

10. A graphical display method for hierarchical structures according to claim 9 wherein:
- the size of the circle upon which said nodes are arranged is determined such that the circle upon which the nodes of the lower layer subordinate to each node are arranged is made the largest.

11. A graphical display method for hierarchical structures according to claim 10 wherein said determination in which the circle on which the nodes of the lower layer subordinate to each node is made the largest is carried out by the steps of:
- partitioning the center angle of the circle on which the nodes are arranged by the number of nodes arranged on the same circle,
- constructing an inscribed circle in the smallest area formed by this partition line and the display border line, and
- for the layer excluding the lowest layer, making the radius of the circle upon which the nodes are arranged the length from the center of the circle to the inscribed circle, or less, or for the lowest layer, making the radius of the circle upon which nodes are arranged equal to the radius of the inscribed circle, or less.

12. A graphical display method for hierarchical structures according to claim 9 wherein:
- the arrangement of the nodes on the circle is carried out by equally partitioning the center angle of the circle according to the number of arranged nodes.

13. A graphical display method for hierarchical structures according to claim 12 wherein said equal partitioning of the center angle of the circle according to the number of arranged nodes is carried out by the steps of:
- equally partitioning the center angle of the circle upon which nodes are arranged by the number of arranged nodes for the highest layer, and
- equally partitioning the center angle by a value adding 1 to the number of nodes arranged on the same circle, and arranging the nodes for the nodes of the second layer and less.

14. A graphical display method for hierarchical structures according to claim 9 wherein said arrangement of circles of the same layer is performed by:
- arranging the circles of the said same layer equally spaced on a circle whose center is the center of the circle of the upper layer and whose radius is the length adding the radius of the largest circle on the circle of the same layer to the radius of the upper layer, or more.

15. A graphical display method for hierarchical structures according to claim 14 wherein said arrangement of circles of the same layer is carried out by the steps of:
- determining the center of the circle of the upper layer as the center for nodes of the second layer or less,
- constructing a circle, the length of whose radius is the radius of the circle of the upper layer added to the radius of the inscribed circle constructed when calculating the radius of the circle of the upper layer, and
- determining the intersection of the extensions of straight lines from the center of the circle of the upper layer to the upper node and the constructed circle as the center of the circle on which the nodes are arranged.

16. A graphical display method for hierarchical structures according to claim 9 wherein said graphical display of a hierarchical structure of the nodes is carried out by the steps of:
- equally partitioning a center angle of the circle upon which nodes are arranged by the number of nodes arranged on the same circle,
- constructing an inscribed circle in the smallest area formed by this partition line and the display border line,
- constructing a circle upon which nodes are arranged, the radius thereof being determined as the distance from the center of the circle to the inscribed circle, or from the radius of the inscribed circle,
- arranging nodes by equally partitioning the center angle according to the number of arranged nodes,
- constructing a circle whose radius is the radius of the circle of the upper layer added to the radius of the inscribed circle, and determining the intersection of the extensions of the straight lines from the center of the circle of the upper layer to the upper nodes as the center of a circle on which the nodes of the second layer and less are arranged, and
- repeating the processing in the same manner as the above processing for undisplayed nodes.

17. A graphical display method for hierarchical structures according to claim 9 wherein:
- said radius of a circle upon which said nodes are arranged is calculated based on the number of nodes in the lower layers.

18. A graphical display method for hierarchical structures according to claim 17 wherein said calculation based on the number of nodes of the lower layer is carried out by the steps of:

partitioning the center of a circle on which nodes are arranged according to the ratio of the number of nodes of the lower layers subordinate to each node arranged on the same circle, constructing an inscribed circle in the smallest area formed by the extensions of its greatest partition angle and the display border line, making the radius of the circle upon which nodes are arranged the length from the center of the circle to the inscribed circle, in the case excluding the lowest layer, and constructing an inscribed circle in the area formed by the extensions of each partition angle formed when the nodes of the upper layer are arranged, and the display border line making the radius of the circle upon which nodes are arranged the equal length of the radius of its inscribed circle for the lowest layer.

19. A graphical display method for hierarchical structures according to claim 9 wherein:

said position of the nodes of each layer on the same circumference upon is arranged according to the partition angle calculated from the number of nodes of the lower layers of each node.

20. A graphical display method for hierarchical structures according to claim 19 wherein said arrangement according to the partition angle calculated from the number of nodes of the lower layer of each node is carried out by the steps of:

arranging the nodes according to each partition angle constructed when calculating the radius of the circle upon which nodes are arranged for the layers excluding the lowest layer, and arranging the nodes by partitioning according to the number of nodes arranged on the same circle for the lowest layer.

21. A graphical display method for hierarchical structures according to claim 9 wherein said center of the circle upon which nodes are arranged among the nodes in the second layer or lower is carried out by the steps of:

constructing an inscribed circle in the area formed by the extensions of each partition angle constructed when calculating the radius of the circle upon which nodes of the upper layer are arranged and the display border line, and determining the center of said inscribed circle as the center of each circle upon which nodes are arranged.

22. A graphical display method for hierarchical structures according to claim 9 wherein said graphical display of the hierarchical structure of nodes is carried out by the steps of:

partitioning the center of a circle upon which nodes are arranged according to the ratio of the number of nodes on the lower layer subordinate to each node arranged on the same circle, constructing an inscribed circle in the smallest area formed by the extensions of the largest partition angles and the display border line, and constructing a circle upon which nodes are arranged calculating the radius of the circle upon which nodes are arranged to be the length from the center of the circle to the inscribed circle, arranging the nodes according to the partitioned angle, constructing an inscribed circle in the area formed by the extensions of each partition angle and the display border line, and determining the center of each inscribed circle as the center of each circle upon which nodes of the lower layer are arranged, and repeating in the same manner said processing for any undisplayed nodes.

23. A graphical display method for hierarchical structures according to claim 9 wherein:

the radius of the circle upon which the nodes are arranged is calculated based on the number of layers in the lower layers.

24. A graphical display method for hierarchical structures according to claim 23 wherein said calculation based on the number of layers in the lower layers is carried out by the steps of:

partitioning the center of a circle upon which the nodes are arranged according to the ratio of the number of layers on the lower layer subordinate to each node arranged on the same circle, constructing an inscribed circle in the smallest area formed by the extensions of the largest partition angles and the display border line, and determining the length from the center of the circle to the inscribed circle as the radius of the circle upon which circles are arranged, for the layers excluding the lowest layers, and constructing an inscribed circle in the area formed by the extensions of each partition angle formed when the nodes are disposed in the upper layer and the display border line, and determining the length equal to the radius of this inscribed circle as the radius of the circle upon which nodes are arranged, for the lowest layer.

25. A graphical display method for hierarchical structures according to claim 9 wherein said position of the arrangement on the same circumference of nodes of each layer is carried out using the partition angle calculated from the number of layers of the lower layer of each node.

26. A graphical display method for hierarchical structures according to claim 25 wherein said positioning using the partition angles calculated from the number of layers of the lower layers of each of said nodes is carried out by the steps of:

positioning the nodes according to each partition angle formed when calculating the radius of the circle upon which nodes are arranged for the layers excluding the lowest layer, and positioning the nodes equally spaced according to the number of nodes arranged on the same circle for the lowest layers.

27. A graphical display method for hierarchical structures according to claim 9 wherein said center of the circle upon which the nodes of the second layer and below are arranged is carried out by the steps of:

constructing an inscribed circle constructed in an area formed by the extensions of each partition angle formed when calculating the radius of the circle upon which the upper layer nodes are arranged and the display border line, and determining the center of the inscribed circle as the center of the circles upon which the nodes are arranged.

28. A graphical display method for hierarchical structures according to claim 9 wherein said graphical display of the hierarchical structures of said nodes is carried out by the steps of:

partitioning the center of the circle upon which nodes are arranged according to the ratio of the number of layers of the lower layers subordinate to each node positioned on the same circle, constructing an inscribed circle in the smallest area formed by the extensions of the largest partition angles and the display border line, constructing a circle upon which the nodes are arranged by determining the length form the center of the circle to the inscribed circle as the radius of the circle upon which the nodes are arranged, and arranging the node according to the positioned angle, and processing in the same manner as the above processing is repeated in the same manner for undisplayed nodes.

29. A graphical display method for hierarchical structures according to claim 1 wherein when nodes of the upper layer and nodes two or more layers lower are directly connected:

the nodes of the same layer subordinate to the same node are arranged on the same ellipse, and nodes of the middle layers where there are parts for which corresponding nodes do not exist in said layers because of direct connection between the upper and lower nodes are arranged on ellipses constructed in the interior of node arranging ellipses of the lower layer nodes.

30. A graphical display method for hierarchical structures according to claim 29 wherein when the nodes of the upper layer nodes and the nodes two or more layers lower are directly connected, the graphical display method is carried out by the steps of:

constructing an ellipse for the nodes of the same layer subordinate to the same node, arranging the nodes of the same layer on the constructed ellipse when it is decided that there are no middle layers where some nodes do not exist, arranging the nodes of a lower layer on the constructed ellipse, constructing the second ellipse in the interior of said ellipse, and arranging the nodes of the middle layer on said second ellipse when it is decided that there are middle layers where nodes do not exist, and determining whether or not there are any undisplayed nodes, repeating the above processing if there are undisplayed nodes, and ending the processing if there are none.

31. A graphical display method for hierarchical structures according to claim 9 wherein when a plurality of hierarchical structures is connected, the graphical display method is carried out by the steps of:

partitioning the display area of the display part by the number of unitary hierarchical structures whose nodes of the highest layer are independent, arranging nodes included in the same highest layer of each hierarchical structure on the circumference of the ellipse drawn in the center of each display area for, and arranging the nodes of lower layers on a concentric ellipse larger than the ellipse of the upper layer nodes, and arranging as near as possible the positions of nodes of the part connecting other hierarchical structures.

32. A graphical display method for hierarchical structures according to claim 31 wherein the arranging the ellipses of each layer, and arranging the nodes on the same ellipse is carried out by determining the position of the shortest distance on the ellipse to the partition line of the display area as the base point, and arranging the nodes which connect with the other hierarchical structures the ellipses of this upper layer on this base point.

33. A graphical display method for hierarchical structures according to claim 9 wherein said links showing the vertical relationships of the nodes are carried out by branching at a position where straight lines issuing from the upper layer nodes do not overlap the other links, and connecting them to each node of the lower layer.

34. A graphical display method for hierarchical structures according to claim 33 wherein the branch point of said links connects each node of the lower at the point which is located on a straight line from the center of the ellipse where the nodes of said layer are connected to the upper node, and on the straight line issuing from the node of the upper layer up to where it is tangent to the ellipse of the lower layer.

35. A graphical display apparatus for hierarchical structures comprising:

a data structure analysis unit which reads data related to the hierarchical structure of apparatuses and functions corresponding to branch points, relay points, and end points analyses the input data, a node arrangement calculation unit which arranges the nodes of the same layer subordinate to the same node on the same ellipse from the results of analysis of the said data structure analysis unit, and carries out calculation of the node arrangement positions by arranging ellipses of the same lower layer on concentric ellipses larger than the ellipse of the upper layer, a link connection calculation unit which carries out calculation of the link connections showing the connection relationships between said nodes from the results of the analysis of said data structure analysis unit and the node arrangement positions of said node arrangement calculation unit, and an image construction unit which carries out construction of the output image for output to an apparatus using the calculation results from said node arrangement calculation unit the said link connection calculation unit.

36. A graphical display apparatus for hierarchical structures according to claim 35 wherein said node arrangement calculation unit is provided with:

a node arrangement locus calculation unit which constructs an ellipse which is the locus for arranging nodes of the $n^{th}$ layer (n is an integer equal to or greater than 1) based on the value determined by said data structure analysis unit, a node position calculation unit which arranges nodes on an ellipse calculated by said node arrangement locus calculation according to the number of nodes subordinate to each node of the $n^{th}$ layer, and a layer arrangement position calculation unit which carries out calculation of the layer arrangement position by constructing a locus centered on the ellipse of said $n^{th}$ layer for the centers of ellipses of the $(n+1)^{th}$ layer at a distance where ellipses of the $n^{th}$ layer and the $(n+1)^{th}$ layer do not overlap, and further said node arrangement locus calculation unit constructs ellipses which are the locus of the node arrangement by:

constructing an ellipse in a prescribed position in the case of the first layer, and constructing an ellipse for the $m^{th}$ layer (m is an integer equal to or greater than 2) whose size depends on the number of arranged nodes, and sets the center at a position depending on the number of nodes arranged on each ellipse of the $m^{th}$ layer on the locus for the center of ellipses of the $m^{th}$ layer calculated by the said layer arrangement position calculation unit in the case of layers of the $m^{th}$ layer (m is an integer equal to or greater than 2).

37. A graphical display apparatus for hierarchical structures according to claim 35 wherein the ellipse used in order to arrange nodes by said node arrangement calculation unit is a circle.

38. A graphical display apparatus for hierarchical structures according to claim 37 wherein said node arrangement calculation unit is provided with:

a node arrangement locus calculation unit which calculates the locus on which nodes are arranged by equally partitioning the center angle of a circle upon which nodes are arranged by the number of nodes arranged on the same layer, constructing an inscribed circle in the smallest area formed by this partition line and the display border line, and calculating a circle upon which nodes are arranged by calculating the radius of the circle upon which nodes are arranged from the distance from the center of the circle to the inscribed circle or the radius of the inscribed circle, a node position calculation unit which calculates the positions on which nodes are arranged by partitioning the central angle according to the number of nodes arranged on the circle calculated by said node arrangement locus calculation unit, and a layer arrangement calculation unit which calculates the layer arrangement positions by fixing the center of the circle upon which nodes of the first layer are arranged at a predetermined position in the case of the first layer, and in the case of the $n^{th}$ layer (n is an integer equal to or greater than 2), constructing a concentric circle whose radius is the radius of the circle of the $(n-1)^{th}$ layer calculated by said node arrangement locus calculation unit added to the radius of said inscribed circle, and determining the intersection of the straight line from the center of said $(n-1)^{th}$ layer to each node of the $(n-1)^{th}$ layer as the center of each circle upon which the nodes of the $n^{th}$ layer are arranged.

39. A graphical display apparatus for hierarchical structures according to claim 37 wherein said node arrangement calculation unit which carries out calculations of the radius of the circle upon which nodes are arranged based on the number of nodes of the lower layer.

40. A graphical display apparatus for hierarchical structures according to claim 37 wherein said node arrangement calculation unit is furnished with:

a node arrangement locus calculation unit which partitions the center of a circle upon which nodes are arranged according to the ratio of the number of nodes of the lower layer subordinate to each node arranged on the same circle, constructs an inscribed circle in the smallest area formed by the extensions of the largest partition angle and the display border line, and calculates the locus which arranges nodes by constructing a circle upon which nodes are arranged by calculating the radius of the circle upon which nodes are arranged as the length from the center of the circle to the inscribed circle, a node position calculation unit upon which arranges the nodes according to the partitioned angle on the circle calculated by said node arrangement locus calculation unit, and a layer arrangement position calculation unit which calculates the layer arrangement position by fixing the center of the circle upon which the nodes of the first layer are arranged on a predetermined position in the case of the first layer, and in the case of the $n^{th}$ layer (n is an integer equal to or greater than 2), constructing a concentric circle whose radius is the result of adding the radius of the circle of the $(n-1)^{th}$ layer calculated by said node arrangement locus calculation unit and the radius of said inscribed circle, and determining the intersection of the extensions from the center of the circle of said $(n-1)^{th}$ layer to each node of the of the $(n-1)^{th}$ layer as the center of each circle upon which the nodes of the $n^{th}$ layer are arranged.

41. A graphical display apparatus for hierarchical structures according to claim 37 wherein said node arrangement calculation unit calculates the radius of the circle upon which nodes are arranged based on the number of layers of the lower layer.

42. A graphical display apparatus for hierarchical structures according to claim 37 wherein said node arrangement calculation unit is provided with a arrangement locus calculation unit which calculates the locus upon which nodes are arranged, a node position calculation unit which calculates the position upon which nodes are arranged, and a layer arrangement position calculation unit which calculates the arrangement position of the layer, and wherein said node arrangement locus calculation unit which calculates the locus upon which nodes are arranged, in the case of the first layer by partitioning the center of the circle upon which nodes are arranged in proportion to the number of layers of the lower layer subordinate to each node positioned on the same circle, constructing an inscribed circle in the smallest area formed by the extensions of the largest partition angle and the display border line, and constructing a circle upon which nodes are arranged by calculating the length from the center of the circle to the inscribed circle as the radius of a circle upon which nodes are arranged, and in the case of the $m^{th}$ layer (m is a integer equal to or greater than 2), by constructing a circle by calculating the radius from the constructed inscribed circle by said layer arrangement position calculation unit, said node position calculation unit which arranges nodes on a circle calculated by said node arrangement locus calculation according to the partitioned angle in the case of the first layer, and in the case of the $p^{th}$ layer (p is an integer equal to or greater than 2) partitions the center of the circle constructed by said node arrangement locus calculation unit according to the ratio of the number of layers of the lower layers subordinated to each node arranged on the same circle, and arranges the nodes on the circle according to the partitioned angle, and said layer arrangement position calculation unit calculates the arrangement position of the layer by determining the center of a circle upon which the nodes of the first layer are arranged at a predetermined position in the case of the first layer, and in the case of the $n^{th}$ layer by constructing an inscribed circle in the area formed by the display border line and the extensions of each partition angle of the $(n-1)^{th}$ layer by said node arrangement locus calculation unit or node position calculation unit, and by determining the center of each inscribed circle as the center of each circle upon which nodes are arranged.

43. A graphical display apparatus for hierarchical structures according to claim 35 wherein said node arrangement calculation unit, in the case that an upper layer node is directly connected to a node two or more layers below:

arranges on the same ellipse nodes of the same layer subordinate to the same node, and arranges the nodes of the middle layer for which part has no nodes corresponding to the relevant layer when the nodes of vertical layers are directly connected on an ellipse constructed in the ellipse upon which nodes of the lower layer are arranged.

44. A graphical display apparatus for hierarchical structures according to claim 43 wherein said node arrangement calculation unit:

constructs an ellipse with its object being the nodes of the same layer subordinate to the name node, determines whether there is a middle layer whose nodes have no nodes in one part, arranges nodes of the same layer on the constructed ellipse in the case that it is determined that there are no layers without nodes in one part, and arranges nodes of the lower layer on the constructed ellipse, constructs a second ellipse in said ellipse, and arranges the nodes of said middle layer on the second ellipse in the case that it is determined that there are layers without nodes in one part.

45. A graphical display apparatus for hierarchical structures according to claim 35 wherein said node arrangement calculation unit, in the case of a plurality of hierarchical structure is connected:

partitions the display area of the display part by the number of unitary hierarchical structures in which the upper layer nodes are independent, arranges on the circumference of an ellipse drawn on the center of each display area in the case of the nodes included in the highest layer of each hierarchical structure, and arranges at nearest positions the nodes of the part connecting the other hierarchical structures in such a way that nodes of the lower layers are arranged on a concentric ellipse larger than the ellipse of the upper layer in the case of the nodes of lower layers.

46. A graphical display apparatus for hierarchical structures according to claim 45 wherein said node arrangement calculation unit determines the position closest to the partition lines of the display area as a base point, and arranges on the base point the nodes the other hierarchical layers or their upper layer ellipses when arranging the ellipses of each layer or when arranging the nodes on the same ellipse.

47. A graphical display apparatus for hierarchical structures according to claim 35 wherein said link connection calculation unit is provided with:

a link branch position calculation unit which branches straight lines issuing from the nodes of the upper layer at a position where they do not overlap with other links, and connects each node of the lower layer.

48. A graphical display apparatus for hierarchical structures according to claim 47 wherein the branch point of said links connects each node of the lower at the point which is located on a straight line from the center of the ellipse where the nodes of said layer are connected to the upper node, and on the straight line issuing from the node of the upper layer to where it is tangent to the ellipse of the lower layer.

49. A computer readable recording medium on which is recorded a hierarchical structure graphical display program for executing on a computer, the program performing the functions comprising:

a data structure analysis function that reads data related to the hierarchical structure of apparatuses and functions corresponding to branch points, relay points, and end points, and analyses the input data, a node arrangement calculation function which carries out calculation of the node arrangement position from the results of analysis of said data structure analysis function by arranging the nodes of the same layer subordinate to the same node on the same ellipse and arranging the ellipses of the same lower layer on a concentric circle larger than the ellipse of the upper layer a link connection calculation function which carries out calculation of the link connections showing the connection relationships of said nodes from the results of the analysis of said data structure analysis function and the node arrangement position of said node arrangement calculation function, and an image generation function which carries out construction of the image for output to the output apparatus by using the results of calculation from said node arrangement calculation function and said link connection calculation function.

50. A computer readable recording medium on which is recorded a hierarchical structure graphical display program according to claim 49 which constructs an ellipse which is the locus upon which nodes are arranged by:

said data structure analysis function determining the ratio of the size of the ellipses of each layer and the ratio of the minor axis and major axis of the ellipse used for node arrangement in said node arrangement calculation function based on the hierarchical structure of the analyzed nodes, and further determining the size of the ellipses of each layer according to the display area, and wherein said node arrangement calculation function is furnished with:

a node arrangement locus calculation unit which constructs an ellipse which is the locus for arranging nodes of the $n^{th}$ layer (n is an integer equal to or greater than 1) based on the value determined by said data structure analysis function, a node position calculation function which arranges the nodes on an ellipse calculated by said node arrangement locus calculation according to the number of nodes subordinate to the same node of the $n^{th}$ layer, and a layer arrangement position calculation unit which carries out calculation of the layer arrangement positions by constructing a locus for the center of ellipses of the $(n+1)^{th}$ layer at a distance where the $n^{th}$ layer and the $(n+1)^{th}$ layer do not overlap on the center of the ellipse of said $n^{th}$ layer, and further said node arrangement locus calculation unit construct ellipses at a predetermined position for the first layer, and constructing an ellipse for the $m^{th}$ layer (m is an integer equal to or greater than 2) whose size depends on the number of arranged nodes, and sets the center at a position depending on the number of nodes arranged on each ellipse of the $m^{th}$ layer calculated by said layer arrangement position calculation unit in the case of layers of the $m^{th}$ layer (m is an integer equal to or greater than 2).

51. A computer readable recording medium on which is recorded a hierarchical structure graphical display program according to claim 49 wherein the ellipse used in order to arrange nodes by said node arrangement calculation unit is a circle.

52. A computer readable recording medium on which is recorded a hierarchical structure graphical display program according to claim 51 provided with:

a node arrangement locus calculation function which calculates the locus on which nodes are arranged by equally partitioning the center angle of a circle upon which nodes are arranged by the number of nodes arranged on the same layer, constructing an inscribed circle in the smallest area formed by this partition line and the display border line, and calculating a circle upon which the nodes are arranged by calculating the radius of the circle upon which nodes are arranged from the distance from the center of the circle to the inscribed circle or the radius of the inscribed circle, a node position calculation function which calculates the position on which nodes are arranged by equally partitioning the center angle according the number of nodes arranged on the circle calculated by said node arrangement locus calculation function, and a layer arrangement calculation unit which calculates the layer arrangement positions by fixing the center of the circle upon which nodes of the first layer are arranged at a predetermined position in the case of the first layer, and in the case of the $n^{th}$ layer (n is an integer equal to or greater than 2), constructing a concentric circle whose radius is the result of adding the radius of the circle of the $(n-1)^{th}$ layer calculated by said node arrangement calculation unit and the radius of said inscribed circle, and determining the intersection of the straight line from the center of said $(n-1)^{th}$ layer to each node of the $(n-1)^{th}$ layer as the center of each circle upon which the nodes of the $n^{th}$ layer are arranged.

53. A computer readable recording medium on which is recorded a hierarchical structure graphical display program according to claim 51 wherein said node arrangement calculation function calculates the radius of the circle upon which nodes are arranged based on the number of nodes in the lower layers.

54. A computer readable recording medium on which is recorded a hierarchical structure graphical display program according to claim 51 wherein said node arrangement calculation function is provided with:

a node arrangement locus calculation function which partitions the center of a circle upon which nodes are arranged according to the ratio of the number of nodes of the lower layer subordinate to each node arranged on the same circle, constructs an inscribed circle in the smallest area formed by the extensions of the largest partition angle and the display border line, and calculates the locus which arranges nodes by constructing a circle upon which nodes are arranged by calculating the radius of the circle upon which nodes are arranged as the length from the center of the circle to the inscribed circle, a node position calculation function which arranges the nodes according the partitioned angle on the circle calculated by said node arrangement locus calculation unit, and a layer arrangement position calculation function which calculates the layer arrangement position by fixing the center of the circle upon which nodes of the first layer are arranged on a predetermined position in the case of the first layer, and in the case of the $n^{th}$ layer (n is an integer equal to or greater than 2), constructing a concentric circle whose radius is the result of adding the radius of the circle of the $(n-1)^{th}$ layer calculated by said node arrangement locus calculation unit and the radius of said inscribed circle, and determining the intersection of the extensions from the center of the circle of said $(n-1)^{th}$ layer to each node of the $(n-1)^{th}$ layer as the center of each circle upon which the nodes of the $n^{th}$ layer are arranged.

55. A computer readable recording medium on which is recorded a hierarchical structure graphical display program according to claim 51 wherein said node arrangement calculation function calculates the radius of the circle upon which nodes are arranged based on the number of layers of the lower layers.

56. A computer readable recording medium on which is recorded a hierarchical structure graphical display program according to claim 51 wherein said node arrangement calculation function is furnished with:

an arrangement locus calculation unit which calculates the locus upon which nodes are arranged, a node position calculation unit which calculates the position upon which nodes are arranged, and a layer arrangement position calculation unit which calculates the arrangement position of the layer, and wherein said node arrangement locus calculation function which calculates the locus upon which nodes are arranged, in the case of the first layer by partitioning the center of the circle upon which nodes are arranged in proportion to the number of layers of the lower layer subordinate to each node positioned on the same circle, constructing an inscribed circle in the smallest area formed by the extensions of the largest partition angle and the display border line, and constructing a circle upon which nodes are arranged by calculating the length from the center of the circle to the inscribed circle as the radius of the circle upon which nodes are arranged, and for the $m^{th}$ layer (m is an integer equal to or greater than 2) by constructing a circle by calculating the radius from the constructed inscribed circle by said layer arrangement position calculation function, said node position calculation unit arranging nodes on the circle calculated by said node arrangement locus calculation according to the partitioned angle function for the first layer, and for the $p^{th}$ layer (p is an integer equal to or greater than 2) partitions the center of the circle constructed by said node arrangement locus calculation function according to the ratio of the number of layers of the lowers layers subordinate to each node arranged on the same circle, and arranges nodes on this circle according to the partitioned angles, and said layer arrangement position calculation function calculates the arrangement position of the layer, by determining the center of a circle upon which nodes of the first layer are arranged at a predetermined position in the case of the first layer, and in the case of the $n^{th}$ layer by constructing an inscribed circle in the area formed by the display border line and said node position calculation unit, and by determining the center of each inscribed circle as the center of each circle upon which nodes are arranged.

57. A computer readable recording medium on which is recorded a hierarchical structure graphical display program according to claim 49 wherein said node arrangement calculation function:

arranges nodes of the same layer subordinate to the same node on the same ellipse when the upper layer nodes are directly connected to the nodes 2 or more layers below, and arranges the nodes of the middle layer where upper and lower nodes are directly connected and there are parts without nodes corresponding to said layer on an ellipse constructed by the function in the arrangement ellipse of the lower nodes.

58. A computer readable recording medium on which is recorded a hierarchical structure graphical display program according to claim 57 wherein said node arrangement calculation function:

constructs an ellipse with its object being the nodes of the same layer subordinate to the same node, determines whether there is a middle layer whose nodes do not have nodes in one part, arranges nodes of the same layer on the constructed ellipse in the case that it is determined that there are no layers without nodes in one part, and arranges nodes of the lower layer on the constructed ellipse, constructs a second ellipse in said ellipse, and arranges the nodes of the middle layer on said second ellipse in the case that it is determined that there are middle layers without nodes in one part.

59. A computer readable recording medium on which is recorded a hierarchical structure graphical display program according to claim 49 wherein, in the case of a plurality of hierarchical structures are connected, said node arrangement calculation function:

partitions the display area of the display function by the number of unitary hierarchical structures in which the nodes of the highest layers are independent, arranges on the circumference of an ellipse drawn at the center of each display area in the case of nodes included in the highest layer of each hierarchical structure, and arranges at nearest positions nodes of the part connecting the other hierarchical structures in such a way that the nodes on the lower layers are arranged on a concentric ellipse larger then the ellipse of the upper layer in the case of nodes of lower layers.

60. A computer readable recording medium on which is recorded a hierarchical structure graphical display program according to claim 59 wherein said node arrangement calculation function determines the position closest to the partition lines of the display area as a base point, and arranges on the base point the nodes which connect with the other hierarchical layers or their upper layer ellipses when arranging the ellipses of each layer or when arranging the nodes on the same ellipse.

61. A computer readable recording medium on which is recorded a hierarchical structure graphical display program according to claim 49 wherein said link connection calculation function is provided with:

a link branch position calculation function which branches straight lines issuing from nodes of the upper layers at a position where they do not overlap with other links, and connects each node of the lower layer.

62. A computer readable recording medium on which is recorded a hierarchical structure graphical display program according to claim 61 wherein said link branch position calculation function connects each node of the lower layer by branching a straight line at a position up to where the straight line issuing from the node of the upper layer meets the ellipse of the lower layer on the straight line connecting the center point of the circle upon which the nodes of the layer are arranged and the upper node, and connecting each node of the lower layer.

\* \* \* \* \*

UNITED STATES PATENT AND TRADEMARK OFFICE
CERTIFICATE OF CORRECTION

PATENT NO. : 6,222,559 B1  Page 1 of 1
DATED : April 24, 2001
INVENTOR(S) : Yoko Asano, Tetsuo Okazaki, Yoshinobu Tonomura and Hiroshi Hamada It is certified that error appears in the above-identified patent and that said Letters Patent is hereby corrected as shown below:

<u>Title page,</u>
Item [30] Foreign Application Priority Data, please change the second foreign priority application no. from "8-284327" to -- 8-284321 --.

Signed and Sealed this

Twenty-sixth Day of February, 2002

Attest:

JAMES E. ROGAN
Attesting Officer  Director of the United States Patent and Trademark Office